(12) United States Patent
Allard et al.

(10) Patent No.: US 7,040,838 B2
(45) Date of Patent: May 9, 2006

(54) HIGH CAPACITY CATCH BASIN FILTRATION SYSTEM WITH ADJUSTABLE DEFLECTOR RING

(75) Inventors: Douglas Paul Allard, Santa Rosa, CA (US); Andrew Charles Wilson, Beecroft (AU)

(73) Assignee: Kristar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 10/017,385

(22) Filed: Dec. 14, 2001

(65) Prior Publication Data

US 2002/0164209 A1    Nov. 7, 2002

Related U.S. Application Data

(63) Continuation-in-part of application No. 09/912,281, filed on Jul. 23, 2001, now Pat. No. 6,872,029, which is a continuation-in-part of application No. 09/909,475, filed on Jul. 19, 2001, now abandoned, which is a continuation-in-part of application No. 09/870,549, filed on May 30, 2001, now Pat. No. 6,551,023, which is a continuation-in-part of application No. 09/384,832, filed on Aug. 27, 1999, now abandoned.

(51) Int. Cl.
*E01C 11/22*    (2006.01)

(52) U.S. Cl. .............................. 405/36; 405/43; 404/4; 210/163; 210/164

(58) Field of Classification Search ............... 404/2, 404/4, 5; 405/38, 43, 50, 36; 210/164, 165, 210/163
See application file for complete search history.

(56) References Cited

U.S. PATENT DOCUMENTS

| 705,447 A | 7/1902 | Sargent |
| 809,201 A | 1/1906 | Lutz |
| 1,507,531 A | 9/1924 | Vaudell |
| 2,432,203 A | 12/1947 | Miller .......................... 182/2 |
| 2,496,757 A | 2/1950 | Sieling ...................... 210/162 |
| 2,497,577 A | 2/1950 | Biggerstaff .................. 182/31 |
| 3,042,210 A | 7/1962 | Hattori ...................... 210/163 |
| 4,174,183 A | 11/1979 | Ferns .......................... 404/26 |

(Continued)

FOREIGN PATENT DOCUMENTS

NZ    299114    8/1996

OTHER PUBLICATIONS

International Search Report.

(Continued)

*Primary Examiner*—Thomas B. Will
*Assistant Examiner*—Alexandra Pechhold
(74) *Attorney, Agent, or Firm*—Howrey, LLP

(57) ABSTRACT

A catch basin filtration system having a filter body dimension to fit within a drain inlet forming a trough or reservoir obstructing at least a portion of the inlet. The filter body is supported by a filter body support dimensioned to cooperatively engage with the interior walls of the inlet and with the filter body to substantially maintain said filter body in a pre-selected shape and position within the inlet. One or more connectors removably connect the filter body to the filter body support. One or more adjustable high fluid flow bypasses prevent the system from backing up and flooding surrounding areas during periods of high fluid flow.

4 Claims, 33 Drawing Sheets

U.S. PATENT DOCUMENTS

| | | | | |
|---|---|---|---|---|
| 4,419,232 A | | 12/1983 | Arntyr et al. | 210/164 |
| 4,594,157 A | | 6/1986 | McGowan | 210/163 |
| 5,062,735 A | | 11/1991 | Gaudin | 404/25 |
| 5,066,165 A | | 11/1991 | Wofford et al. | 405/119 |
| 5,232,587 A | | 8/1993 | Hegemier et al. | 210/162 |
| 5,297,895 A | | 3/1994 | Johnson | 405/41 |
| 5,345,741 A | | 9/1994 | Slater | 52/646 |
| 5,360,284 A | | 11/1994 | Allard | 404/2 |
| 5,372,714 A | | 12/1994 | Logue, Jr. | 210/164 |
| 5,403,474 A | | 4/1995 | Emery | 210/163 |
| 5,405,539 A | | 4/1995 | Schneider | 210/747 |
| 5,480,254 A | | 1/1996 | Autry | 404/2 |
| 5,498,331 A | | 3/1996 | Monteith | 210/170 |
| 5,507,944 A | | 4/1996 | Friedland et al. | 210/155 |
| 5,567,461 A | * | 10/1996 | Lehrer | 426/417 |
| 5,575,925 A | | 11/1996 | Logue, Jr. | 210/747 |
| 5,632,888 A | | 5/1997 | Chinn et al. | 210/163 |
| 5,632,889 A | | 5/1997 | Tharp | 210/165 |
| 5,656,315 A | * | 8/1997 | Tucker et al. | 426/420 |
| 5,702,595 A | | 12/1997 | Mossburg, Jr. | 210/163 |
| 5,720,574 A | | 2/1998 | Barella | 405/52 |
| 5,725,782 A | | 3/1998 | Chinn et al. | 210/767 |
| 5,733,445 A | | 3/1998 | Fanelli | 210/164 |
| 5,744,048 A | * | 4/1998 | Stetler | 210/803 |
| 5,820,762 A | | 10/1998 | Bamer et al. | 210/661 |
| 5,843,306 A | | 12/1998 | Singleton | 210/163 |
| 5,916,436 A | | 6/1999 | Devore et al. | 210/164 |
| 5,935,450 A | | 8/1999 | Benedict | 210/776 |
| 5,958,226 A | | 9/1999 | Fleischmann | 210/165 |
| 5,980,740 A | | 11/1999 | Harms | 210/162 |
| 5,985,157 A | | 11/1999 | Leckner et al. | 210/747 |
| RE36,516 E | | 1/2000 | Lehrer | 426/417 |
| 6,010,622 A | | 1/2000 | Chinn et al. | 210/164 |
| 6,015,489 A | * | 1/2000 | Allen et al. | 210/131 |
| 6,045,691 A | | 4/2000 | McDermott | 210/164 |
| 6,059,964 A | | 5/2000 | Strawser, Sr. | 210/164 |
| 6,059,966 A | | 5/2000 | Brandhofer et al. | 210/232 |
| 6,080,307 A | | 6/2000 | Morris et al. | 210/163 |
| 6,086,758 A | | 7/2000 | Schilling et al. | 210/164 |
| 6,093,314 A | * | 7/2000 | Wilson et al. | 210/99 |
| 6,095,718 A | | 8/2000 | Bohnhoff | 405/52 |
| 6,099,723 A | * | 8/2000 | Morris et al. | 210/170 |
| 6,106,706 A | | 8/2000 | Roy et al. | 210/99 |
| 6,106,707 A | | 8/2000 | Morris et al. | 210/163 |
| 6,132,603 A | * | 10/2000 | Mokrzycki et al. | 210/163 |
| 6,149,803 A | | 11/2000 | DiLoreto, Jr. et al. | 210/164 |
| 6,214,216 B1 | | 4/2001 | Isaacson | 210/162 |
| 6,261,445 B1 | | 7/2001 | Singleton | 210/163 |
| 6,485,639 B1 | * | 11/2002 | Gannon et al. | 210/164 |
| 6,531,059 B1 | | 3/2003 | Morris et al. | 210/164 |

OTHER PUBLICATIONS http://www.epa.gov/region1/steward/ceitts/stormwater/techs/streamguardskimmer.html.

http://www.epa.gov/NE/assistance/ceitts/stormwater/techs/streamguardinsert.html-no date.

\* cited by examiner

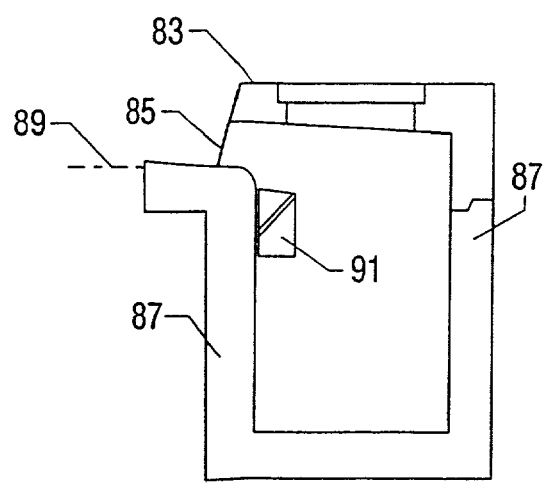
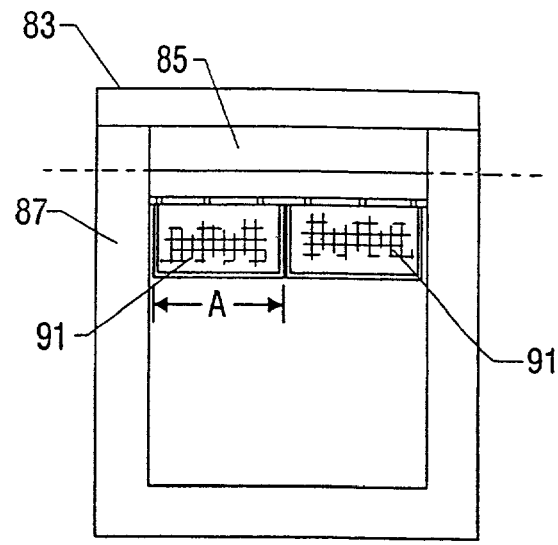
FIG. 17    FIG. 18
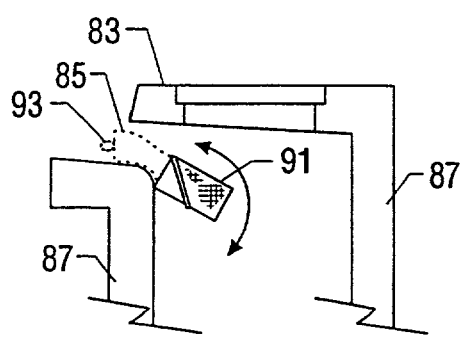
FIG. 19

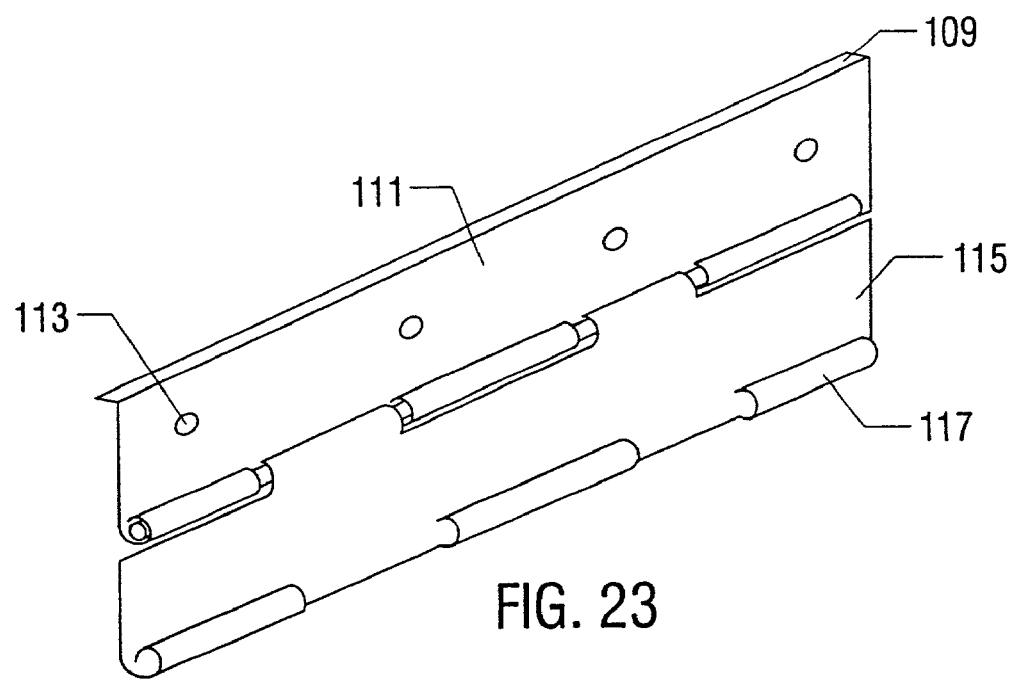
FIG. 23
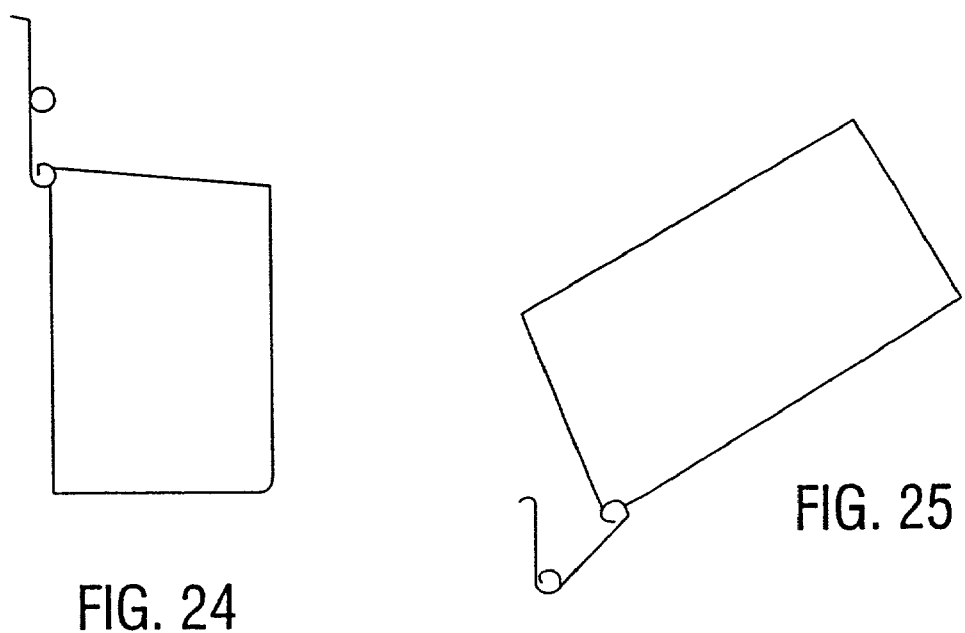
FIG. 24
FIG. 25

HIGH CAPACITY CATCH BASIN FILTRATION SYSTEM WITH ADJUSTABLE DEFLECTOR RING

NOTICE OF RELATED APPLICATIONS

This application is a continuation-in-part of U.S. application Ser. No. 09/912,281 filed on Jul. 23, 2001 now U.S. Pat. No. 6,872,029, which is in turn a continuation-in-part of U.S. application Ser. No. 09/909,475 filed on Jul. 19, 2001 now abandoned, which is in turn a continuation-in-part of U.S. application Ser. No. 09/870,549 filed on May 30, 2001 now U.S. Pat. No. 6,551,023, which is in turn a continuation-in-part of U.S. application Ser. No. 09/384,832 filed on Aug. 27, 1999 now abandoned, each of which is incorporated by reference herein in its entirety.

FIELD OF THE INVENTION

The present invention relates generally to systems for filtering storm water runoff and specifically to drain inlets and structures for use in drain inlets to inhibit the flow of pollutants, debris and other contaminants into drainage systems.

BACKGROUND OF THE INVENTION

Drainage systems for receiving fluid flow are well known in the art. Such systems provide a path for fluid flow from surface areas and often transport the fluid from surface areas directly to the ocean, rivers, lakes, estuaries, streams and the like without regard to the removal of debris, pollutants or other contaminants. For example, because of the Federal Environmental Protection Agency's Clean Water Act, controlling pollution from storm water runoff is receiving ever-increasing attention at all levels of government, Federal, State and local. Federal and state agencies have issued mandates and developed guidelines regarding the prevention of non-point source (storm water caused) pollution that require local governments to act upon or initiate.

Because of the aforementioned mandates, many cities and special districts have developed plans and taken action to prevent storm water pollution. These actions range from those that are educational in nature (labeling storm water inlets with phrases such as "No dumping—Flows into Rivers and Streams") to active measures to remove pollutants. Such measures generally require the installation of equipment for removing contaminants somewhere between where the storm water enters the drainage system and the ultimate body of water receiving the runoff.

Several types of equipment are employed to reduce pollution and contaminants from storm water runoff. Catch basin filtration systems use devices installed at the point that the storm water enters the drainage system. The water flow is directed through an installed adsorbent material that aids in removing contaminants from the storm water while allowing the water to flow into the drainage system. Such a permanently installed catch basin filtration system is disclosed in U.S. Pat. No. 5,720,574. In addition to catch basin filtration systems, oil/water separators are employed. Such systems generally comprise large underground holding tanks that allow silt and pollutants to settle to the bottom of the tank and the water to flow into the drainage system. Other systems also exist to remove contaminants from water runoff. However, these systems are also generally permanent installations that are expensive to install and maintain.

As various maintainable catch basin filtration systems for filtering storm water runoff have been developed additional problems have evolved. An initial problem involves the installation of these systems in the wide variety of drain inlets and catch basins that currently exist. Drain inlets and catch basins have wide variances in dimensions, particularly in overall volume and distance across the mouth of the opening. Accordingly, fixed-dimension filtration systems are thus unable to account for variances in catch basin dimensions. Accordingly, catch basin filtration systems having varying dimensions are desired.

Moreover, because such filtration systems typically require regular maintenance, issues arise such as ease of access and the length of time that a system can operate between cleaning or replacing filter elements or other parts. Access to elements that must be cleaned or replaced is problematic in some systems, such that a heightened burden is placed on those who regularly maintain these systems. In addition, silt, sediment and other debris tend to settle on or around filter elements in many filtration systems, such that the length of time that these elements can effectively filter storm water runoff is significantly reduced. Therefore, catch basin filtration systems having improved accessibility for maintained parts and longer periods of effectively filtering storm water runoff before requiring maintenance are desired.

Another significant problem that has emerged in the development of catch basin filtration systems is the ability of such systems to process large quantities of fluid during peak flow periods without having backups or stoppages that result in localized flooding of surrounding areas. Peak flow periods would include, for example, extreme storm conditions or other flood type conditions. Due to concerns over storm drainage backups that can result in localized flooding, many filtration systems employ some form of a high-flow bypass feature that allows excess fluids to proceed through the drainage system without being filtered during periods of high fluid flow. As a result, these types of filtration systems have an upper limit for the amount of fluid that can be filtered at any given time as well as a maximum capacity for the amount of fluid that can be passed through the system in any event.

In practice, many catch basin filtration systems have proven to be inferior in one or both of these areas, with the result being that the filtering of storm water runoff is inadequate and/or that these systems become backed up and flood the surrounding local area. As some filtration systems have attempted to overcome these problems by increasing the volume of the fluid retaining trough or reservoir in the filtration system, these systems have encountered problems in maintaining the shape of the reservoir during periods of high flow. In these filtration systems, the reservoir tends to expand under the increased weight of the contained fluid, such that the expanded reservoir can fill the entire inner catch basin and partially or wholly block the high flow bypass and other fluid routes. This then results in a backed up drainage system and localized flooding. Accordingly, catch basin filtration systems having increased flow capacity for both filtered flows and high flow bypass flows are desired. In addition, it is desired that the fluid retaining reservoir in such systems substantially retain its overall shape during periods of high flow such that unwanted blockages and flooding are avoided.

In addition, the high flow bypass in many current filtration systems is effectively unable to restrain large objects or "floatables," such as cigarette butts, during high flow periods. These objects typically pass through the filtration and drainage systems unimpeded whenever the high flow bypass is utilized in these systems. Accordingly, catch basin filtration systems that inhibit or restrain large objects or floatables from passing through high flow bypass areas are desired.

An added concern involves the demand for fail-safe high flow bypass functionality in catch basin filtration systems. Many cities, municipalities and other filtration system users prefer that any filtration system failure results in a loss of filtration rather than a clogging or backup in the system that could result in localized flooding. The reliability of the high flow bypass feature in these systems is hence extremely important to many users such that increasingly reliable and even secondary high flow bypasses are desired.

Further concerns include cost and ease of system manufacture, cost and ease of system shipping, and added system flexibility to meet varying performance expectations as well as a wide range of catch basin shapes and sizes. Such performance expectations include broad discrepancies in the level of filtration desired and added control over fluid flow, especially in curbside or unusually shaped catch basins. In addition, one or more prominent locations on the system suitable for advertising or system marking are also desired. Accordingly, what is desired are catch basin filtration systems solving many or all of the foregoing problems that have fewer, cheaper and more manageable parts, that are easier and cheaper to ship, that are adaptable to a broad range of performance expectations and catch basin shapes and sizes, and that have one or more prominent locations for advertising or system marking.

SUMMARY OF THE INVENTION

The present invention is directed to a disposable or re-useable catch basin filtration system that is effective and economical to install and maintain. Generally, the apparatus comprises a filter body dimensioned to fit within an inlet and forming a trough obstructing at least a portion of the inlet. The filter body is supported by a filter body support dimensioned to cooperatively engage with the inlet and the filter body to substantially maintain the filter body in a preselected shape and position with the inlet. One or more connectors removably connect the filter body to the filter body support.

In one embodiment, the filter structure comprises a filter body made of a tough, permeable material, such as a woven geotextile material. The filter body forms a trough that is supported in a drain inlet by a supporting structure, such as a steel frame, to maintain the filter body in the desired shape for receiving fluid flow entering the drain inlet. The filter body allows fluid, such as water runoff, to pass through while inhibiting the flow of debris and sedimentation contained in the runoff through the filter body. In addition, one or more adsorbent containers can be placed in the filter body to remove pollutants or contaminants from fluid flowing through the filter body. For example, the adsorbent containers, such as a permeable pouch, may contain adsorbents for removing hydrocarbons from fluid flowing through the filter body.

In another embodiment, the filter body is supported in the inlet and forms a trough around the perimeter of the inside wall of the inlet. The interior wall of the trough forms a dam that is lower than the outer wall of the trough. Adsorbent pouches can be preferably removably attached, such as by velcro, to the outer wall and the dam of the trough. During periods of fluid flow, such as storm water runoff, the fluid flows into the inlet and enters the filter body. As the level of the water rises in the filter body, it causes the adsorbent pouches to float. As the pouches float, the fluid is exposed to the adsorbent thereby allowing contaminants to be removed from the fluid. When fluid completely fills the filter body, the fluid flows over the dam and into the drainage system.

One feature of the present invention is the ability to easily remove the filter body, the adsorbent pouch, or both, from the inlet. This provides the advantage of easily servicing the filtration system by removing the filter body or adsorbent pouches for cleaning or replacement.

In another embodiment, the catch basin filtration system is adapted to accommodate increased fluid-flow capacities. This embodiment provides increased filtered and bypass flow capacities, a substantially maintained shape of the fluid retaining reservoir, a means to retain floatables during periods of high flow, an adjustable supporting structure, and more readily maintainable components having longer periods of effective operation. This high capacity embodiment comprises a filter body defining a reservoir that is situated within a support basket having large apertures through its walls. This support basket may comprise a netting or geogrid, and is attached to and suspended from a support frame. Support cables combine with the support basket and an adjustable frame to form a filter body support. The filter body is connected to and substantially lines the walls and floor of the support basket. The filter body and frame are spaced apart and serve as an adjustable high flow bypass. Adsorbent containers in the form of elongated booms are removably suspended from the filter body walls in strategic configurations. A debris trap capable of retaining floatables and large debris during periods of high flow extends into the filtration system and rests atop the frame. In addition, stiffening and flow diverting baffles are attached or sewn into the filter body walls to assist in retaining floatables and large debris as well as to provide support to the filter body.

One feature of the present invention is the ability to accommodate basin openings of various dimensions. In a particularly preferred embodiment, various sizes of the support frame, which comprises a rigid inner support ring, support flanges and closure flanges, are employed to accommodate openings of various sizes. For example, the inner support ring can be of any predetermined size. The size of the accompanying support basket, filter body and adsorbent pouches are dimensioned according to the inner support ring. The flanges come in pieces or sections, and can be easily assembled to attach to the inner support ring. Another feature of the present invention is a support system that permits a larger volume of fluid to be retained and processed by the system. In particularly preferred embodiment, support cables traverse the corners and cross the bottom of the support basket and function to hold the basket corners together, as well as to substantially prevent the support basket from bulging or expanding under the load imposed by the fluid and sediment held in the filter body.

Another feature of this embodiment is the adjustable high flow bypass, which exists at exposed large apertures of the support basket that are above the upper edge of the filter body and below the lower edge of the support frame. The walls of the filter body are held in place against the walls of the support basket, and the placement level of the upper edge of the filter body against the support basket may be raised or lowered, thereby respectively raising or lowering the high flow bypass capacity. Adsorbent booms are suspended within the filter body such that these booms float or otherwise become displaced as the filter body fills with fluid, which prevents the buildup of silt or sedimentation on the booms.

In another preferred high capacity embodiment, the catch ban filtration system is also adapted to accommodate increased fluid flows. In addition to also providing increased flow capacities, a substantially maintained shape of the fluid retaining reservoir, a means to restrain floatables and more readily maintainable components, this high capacity embodiment also provides for filtered fluid flow through an initial high flow bypass and for a secondary or ultimate high flow bypass. Also provided are an improved adjustable supporting structure and an adjustable deflector ring capable of being sized to fit a variety of inlets or catch basins. Many elements of this high capacity embodiment are substantially the same or similar to elements of the foregoing high capacity embodiment, including the filter body, optional support basket, support cables, adsorbent booms, and to some extent the debris trap. One notable difference can be found in the hard or firm nature of a portion of the body in the present "hard body" embodiment in contrast to the generally soft nature of the entire body in the foregoing "soft body" embodiment. Other notable differences include the lack of a high flow bypass through the netting of the support basket, and a hard or stiff baffle that is integrally formed with the upper walls of the hard body.

One feature of this hard body embodiment is an improved ability to accommodate inlet or catch basin openings of various dimensions. In a particularly preferred embodiment, support brackets attach to each other, to the (typically concrete) catch basin wall, and to the body of the filtration system. Bolts or screws attach these brackets to the catch basin and to each other, while an upturned edge at a distal end of one of the brackets fits into a slot formed within the body of the filtration system. Through use of elongated holes formed in these brackets, the brackets may be adjusted both vertically and horizontally such that the entire filtration system may be supported and optimally positioned within the catch basin.

Another feature of this hard body embodiment is the filtering ability of an initial high flow bypass. Added to the debris trap are removable filtering screens that filter initial high flows and serve as part of the initial high flow bypass when the fluid level rises into the debris trap. These filtering screens are adjustable in that they may be readily removed for cleaning or replacing, and may come in a variety of filtering levels or coarseness. Holes in the upper walls of the hard body comprise another element of this initial high flow bypass, as initial high flows pass through the filtering screens in the debris trap into a cavity between the debris trap and outer walls, and eventually pass though these upper wall holes.

Another feature of this hard body embodiment is the addition of a secondary or ultimate high flow bypass that is substantially failsafe in the event of extreme fluid flows or failure of other components in the filtration system. This secondary high flow bypass comprises a spillover space around the upper edges of the upper body walls as the filtration system completely fills with fluid, since the entire system is lowered such that its upper edges are substantially below the inlet level of the catch basin. An adjustable deflector ring rests on an upper support surface of one or more support brackets, and is positioned substantially above the upper edges of the upper body walls such that the secondary high flow bypass is not impeded. This adjustable deflector ring is custom sized to fit within its particular catch basin such that the deflector ring substantially extends to all catch basin walls and thereby directs all incoming fluid into the filtration system below.

In a simplified alternative embodiment, one or more simplifications may be made to several elements in the other high capacity embodiments to form a simplified filtration system that is easier and less costly to manufacture and ship. As one simplification, the upper body may be combined with the support basket to form a firm yet permeable larger basket, such that support cables are not necessary. This modified basket comprises wall and floor panels that are hinged to each other. An upper portion of one or more basket walls is then attached to an upper frame or support ring. A filter body is optional, as the level of filtration provided by the firm permeable basket may be sufficient in some cases. In another simplification, the debris trap may be modified and permanently combined with an upper frame or support ring, such that the debris trap is not removable. Debris trap windows and removable screens are optional, especially where an initial high flow bypass is created without these features. Another simplification involves the elimination or combination of support brackets, such that only a wall support bracket remains. This simplified wall support bracket would resemble the wall support bracket of the hard body embodiment, and would directly support one or more flanges that are in turn connected or affixed to an upper frame or support ring of the filtration system. Each of these simplifications may be utilized with one of the prior high capacity embodiments in isolation or in any combination desired as would be understood by one skilled in the art.

In a particularly preferred alternative embodiment for the adjustable deflector ring, the horizontal surface is stepped at regular intervals to provide structural rigidity, to assist in directing fluid and to further facilitate the removal of excess material. Descending flanges modified to slope downward also assist in directing and controlling fluid flow, as does a flow control wall rising from one or more outer edges of the adjustable deflector ring. The flow control wall is an especially useful means for directing fluid flow in some catch basins, particularly those with curbside grates and inlets. In addition to providing the ability to control and redirect fluid flow, the flow control wall or walls are also preferably of a sufficient height and size to place or affix markings, advertisements or promotional materials. Alternatively, such a marking or advertisement may be placed at other locations on the adjustable deflector ring or filtration system, such as on a descending wall.

BRIEF DESCRIPTION OF THE DRAWINGS

FIG. 17 is a side view of a curb inlet having an alternative embodiment of the present invention situated therein.

FIG. 18 is a front view of a curb inlet having an alternative embodiment of the present invention situated therein.

FIG. 19 is a side view illustrating the operation of the alternative embodiment illustrated in FIGS. 17 and 18.

FIG. 23 is a perspective view illustrating one embodiment of a filter body mounting bracket.

FIG. 24 is a side view of the mounting bracket illustrated in FIG. 23.

FIG. 25 is a side view of the mounting bracket of FIGS. 23 and 24 illustrating the operation of the mounting bracket.

DETAILED DESCRIPTION OF THE INVENTION

The present invention relates to drain inlets adapted to receive fluid flow or run-off. Such inlets take a variety of forms, for example curb openings, inlets or drains; drop inlets, combination inlets (e.g., curb inlets combined with drop inlets) and the like. Absent a barrier, fluid will flow unimpeded into the inlet and through the drainage system. Such drainage systems generally empty into a variety of geological formations such as bays, estuaries, rivers, lakes, or underground aquifers. The present invention is directed to a filter assembly that is easily cleaned and reused or easily removed and disposed of as circumstances warrant.

Generally, the present invention comprises a filter body supported by a filter body support. Generally the filter body support will comprise a frame from which the filter body is suspended. The frame is configured to support the filter body in the desired shape and position. In addition, the frame is configured to cooperatively engage with an inlet to hold the filter body in the correct position relative to the inlet. The filter body support also includes any other filter body supporting structures such as brackets and the like that aid in maintaining the filter body in the desired shape and position.

Figure 1:
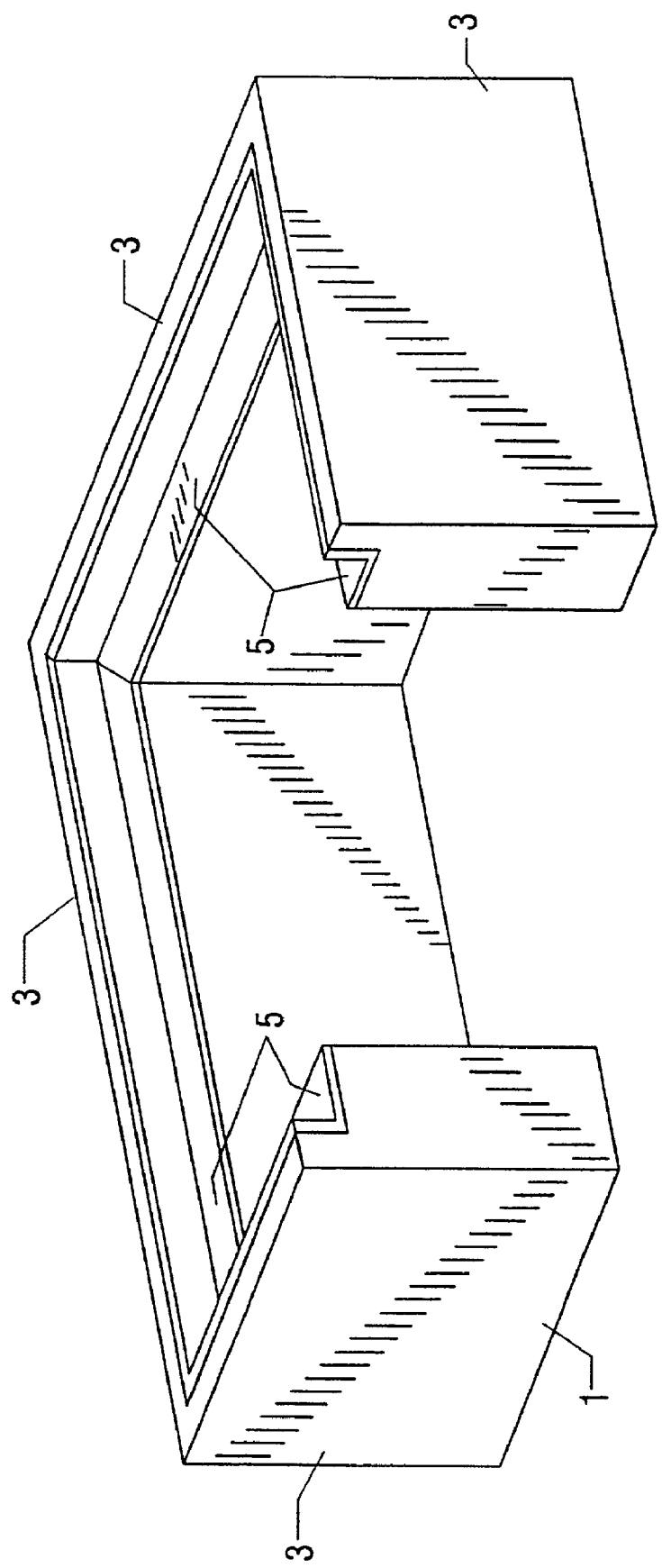
FIG. 1 is a cut-away perspective view of a grate inlet structure.

Referring to FIG. 1, a grate inlet structure 1 is illustrated having sides 3 and upper load bearing surfaces 5. Generally, the grate inlet structure is composed of concrete and situated below the surface such that the top portions of the sides are approximately even with the surface level, for example with a road surface, pavement or the like. A grate (not shown) will typically be situated in the inlet and rest on the load bearing surfaces 5.

Figure 2:
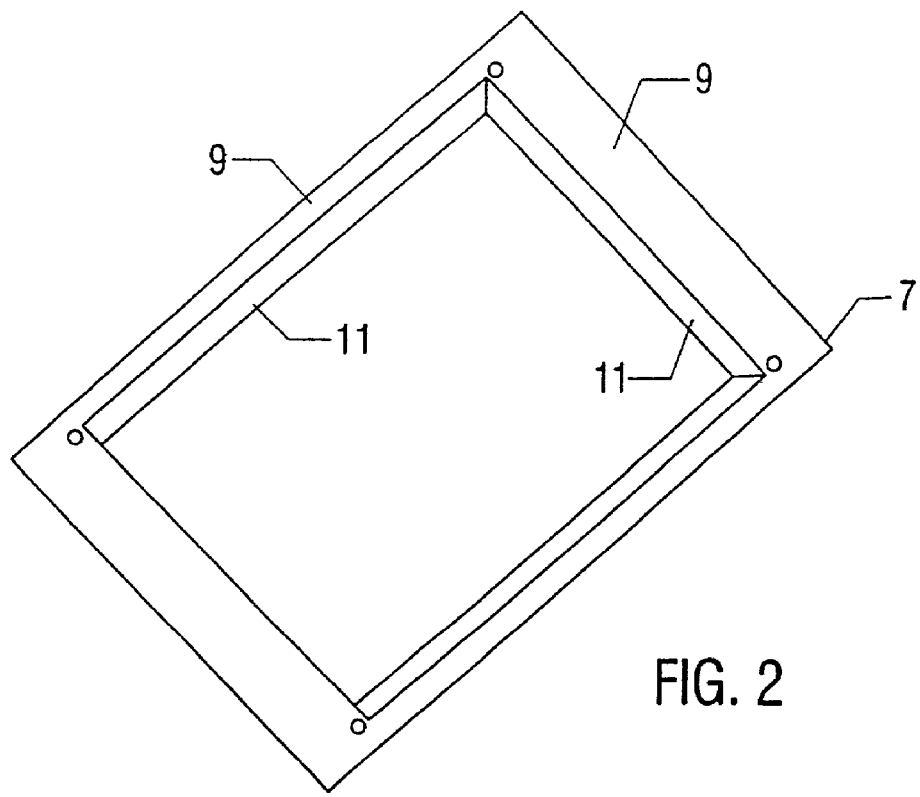
FIG. 2 is a top perspective view of one embodiment of a frame structure of the present invention.
Figure 3:
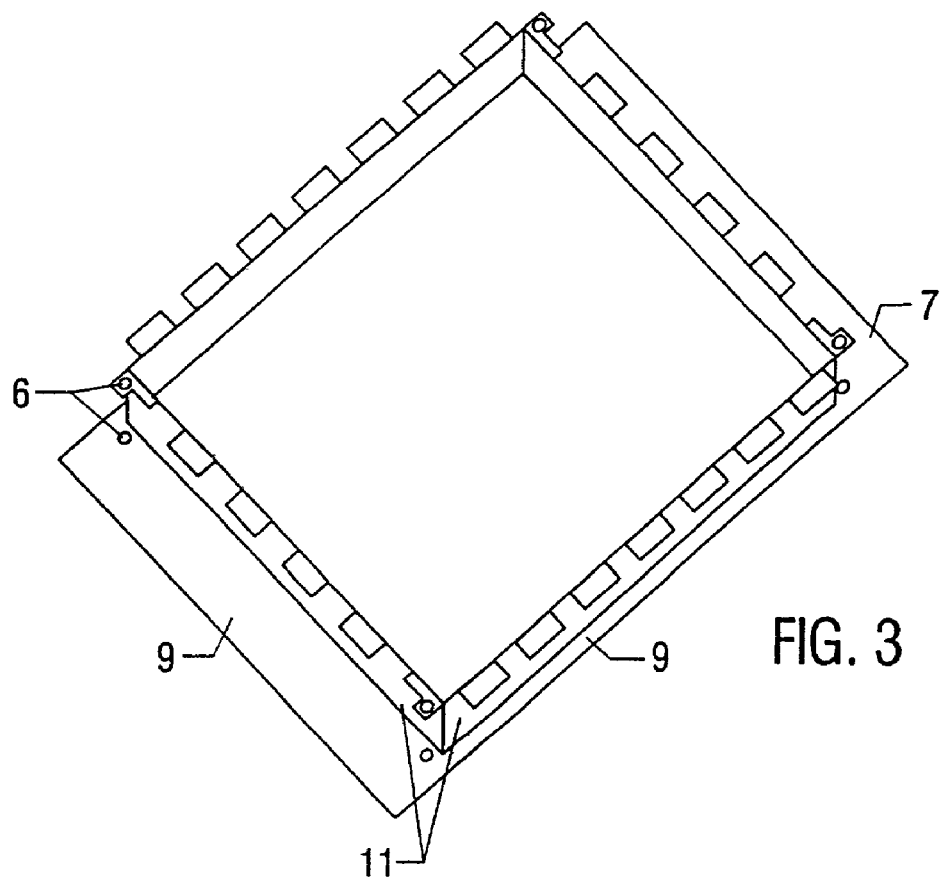
FIG. 3 is a bottom perspective view of the frame structure illustrated in FIG. 2.

Referring to FIGS. 2 and 3, a frame according to one embodiment of the present invention is illustrated. FIG. 2 shows a top perspective view of frame 7 and FIG. 3 shows a bottom perspective view of frame 7. Frame 7 is illustrated having a flange 9 extending perpendicularly from frame wall 11. In practice, frame 7 is situated in the grate inlet structure 1 illustrated in FIG. 1 such that the flange 9 rests on upper load bearing surface 5. The grate (not shown) can then be placed into the grate inlet structure such that the grate rests on top of flange 9 to further secure the frame in place.

Figure 4:
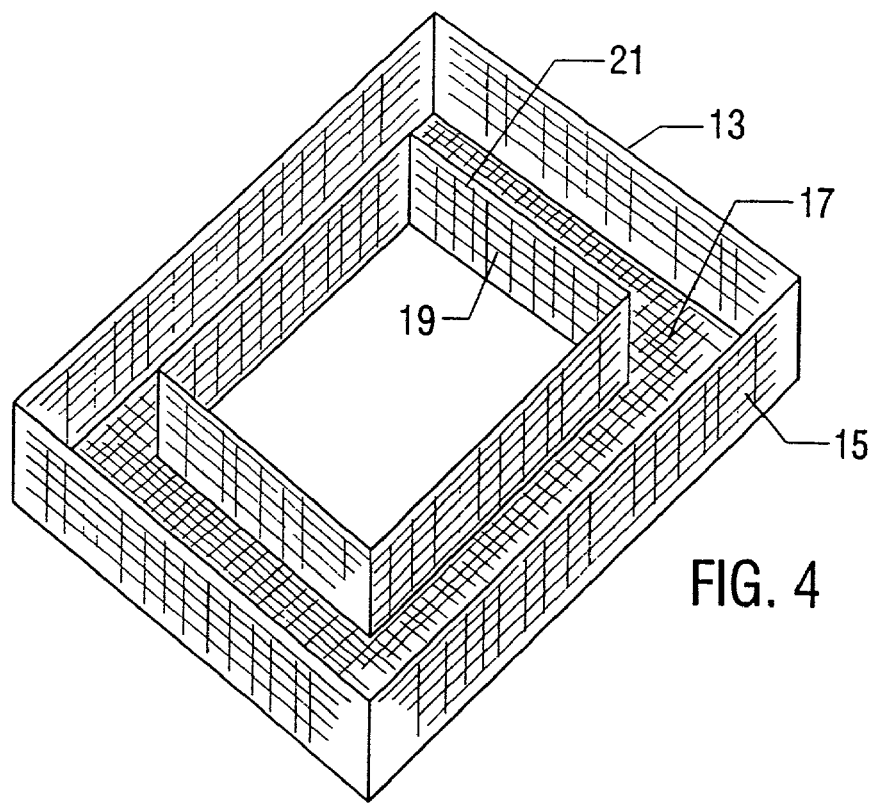
FIG. 4 is a perspective view of an illustration of one embodiment of a filter body of the present invention.

As indicated, the frame serves as at least one portion of the filter body support. Referring to FIG. 4, a filter body 13 illustrating one embodiment of the present invention is shown. As illustrated, filter body 13 comprises a filter body wall 15, filter body floor 17, dam 19 and wier 21. A variety of terms can be used to describe the general shape of the filter body, such as trough, pocket, basket, catch basin and the like.

The filter body captures and substantially retains sedimentation and debris, and so is shaped, as indicated, as a trough. The position of the filter body in the inlet depends on the particular inlet. The filter body may be adjacent the top portion of an inlet or catch basin. It may positioned adjacent a portion of the inside wall of the inlet or around the perimeter of the upper portion of the inlet where it can be maintained.

As indicated, one purpose of the filter body is to capture and substantially retain material carried by a fluid, such as sedimentation and debris carried in water run-off, while letting the fluid itself pass through. Accordingly at least a portion of the filter body is constructed of perforated or porous materials. For example, the entire filter body may comprise such perforated or porous material, or may comprise perforated material in combination with non-perforated material. The perforated or porous material may be constructed of screen, netting, or woven materials such as cloth materials. The type of material used to construct the perforated portions of the filter body may be of any suitable material strong enough for the environment in which the filter will be employed, i.e., strong enough to retain sedimentation and debris contained in fluid flow without breaking. Examples of such materials include plastic or metal screening or netting, sturdy woven materials and the like. In addition, stiffeners may be added to the filter body materials such as metal or plastic strips that can be inserted into sleeves or loops contained in the filter body, or metal or plastic strands woven directly into the filter body material. A particularly preferred material for constructing the filter body is a woven geotextile material such as GEOTEX™ 117 or 111F woven monofilament manufactured by Synthetic Industries, Chattanooga, Tenn. Another particularly preferred material for constructing the filter body is a monofilament polypropylene yarn such as Mirafi Filterweave® 401 manufactured by TC Mirafi of Pendergrass, Ga. Although the size of the perforations is not critical, the perforations should be of a size to accomplish the desired debris or sediment control. Larger openings may be incorporated into the filter body material if desired to allow for a high fluid flow bypass.

As indicated, the filter body may be entirely constructed of a perforated or porous material, or constructed of a combination of porous and non-porous materials depending on the application in which the filter body is to be employed. For example, referring to FIG. 4, the filter body wall 15 may be constructed of a non-porous material, such as a plastic material, such as a plastic film or sheet, or a combination of porous and non-pourus materials. Similarly the dam 19 may be constructed of a non-porous material, or a combination of porous and non-porous materials. The filter body floor 17 will preferably be constructed of a porous material, but may include a combination of porous or non-pourus materials, especially where materials are included in the filter body floor to increase the strength of the structure.

As indicated, stiffening materials may be incorporated into the filter body to add strength and to aid in maintaining the filter body in the desired shape. For example, to add strength and to aid in keeping the dam 19 in the desired shape, especially under fluid flow conditions, stiffening materials can be incorporated into the dam. Particularly preferred is the incorporation of stiffening materials along the periphery of the dam just below the weir 21. The stiffening materials may be of a variety of types, such as metal or plastic strips or rods that can be inserted into sleeves or loops located at strategic points in the filter body. For example, they may be positioned as discussed above along the periphery of the dam 19 below weir 21, or the stiffening materials may be comprised of materials that can be directly woven into the filter body material, such as a metal thread woven into the filter body material.

Figure 5:
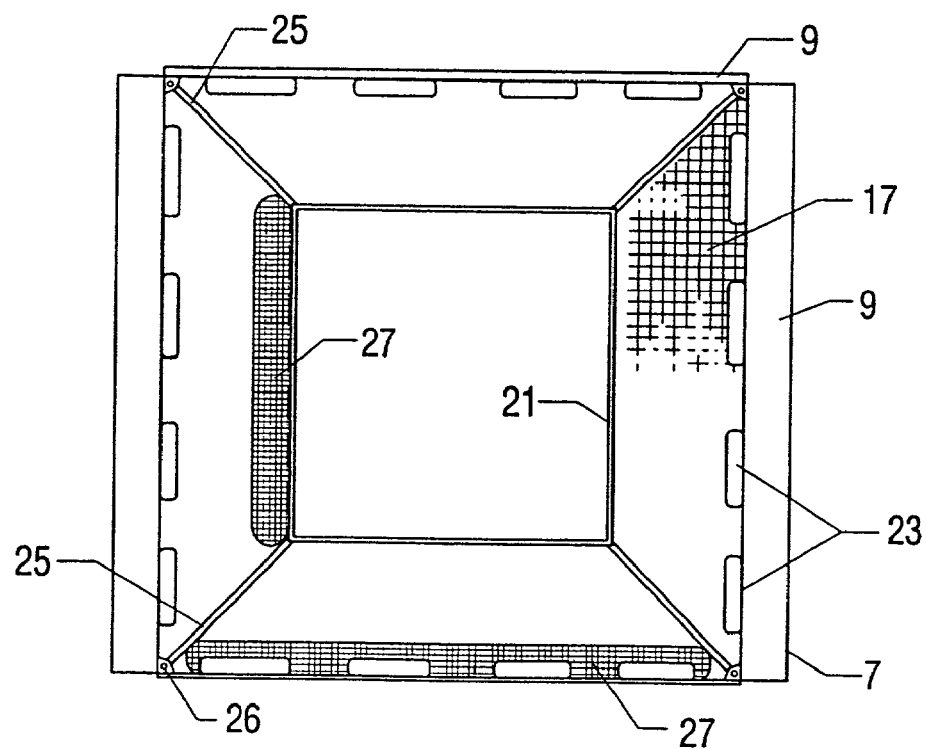
FIG. 5 is a top view of a frame and filter combination according to one embodiment of the present invention.
Figure 6:
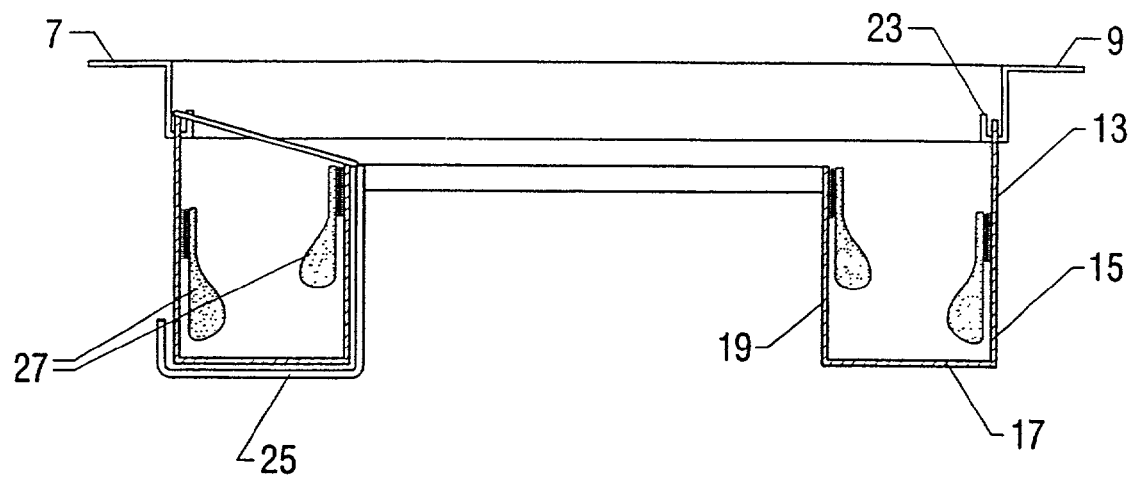
FIG. 6 is a side cut-away view of the frame and filter combination of FIG. 5.

Referring to FIGS. 5 and 6, a top and cut-away side view of one embodiment of the filter body and frame combination is illustrated. The filter body 13 is shown attached to the frame 7 using filter body attachment members 23 such as tabs, ribs, rails or the like. The attachment members 23 (here shown extending inward from the frame) can be inserted into corresponding openings, such as slits, along the upper periphery of filter body wall 15 to suspend the filter body from the frame 7. If desired, corresponding retaining members such as rods, clamps and the like can be attached to the attachment members to further secure the filter body in place. Filter body support brackets 25 are attached at the corners of the frame 7 and extend across the filter body 13, over weir 21, down the dam 19 and under the floor 17 to provide additional support to the filter body and to aid in maintaining the filter body in the desired shape. To assist in maintaining the dam in the desired shape, the bracket may be inserted through loops (not shown) positioned along the weir. The support brackets may be configured in a variety of ways. For example, the brackets may configured to completely traverse the frame to form an X shape. The filter body can then be attached to the brackets using corresponding loops or sleeves located on the filter body.

As indicated, one purpose of the frame is to support the filter body in the drain inlet. Another purpose is to aid in holding open the filter body in the desired shape. The filter body may be attached to the frame using any desirable connecting method such as snaps, screws, rivets, buttons, tabs, hooks, clamps, drawstrings and the like. Preferably, the connector or fastener employed will allow the filter body to be removably engaged with the frame such that the filter body can be replaced when necessary.

The filter body may be attached to the frame at points internal or external of the frame. For example, referring to FIG. 3, the frame 7 is shown having externally mounted attachment members 29 that allow for attachment of a corresponding filter body to the outside of the frame.

One or more adsorbent containers can be attached to the interior of the filter body. Such containers are of a permeable material, such as a net pouch, bag or the like. The adsorbent containers are filled with an adsorbent material. One example of an adsorbent material is an inert inorganic blend of amorphous siliceous material containing sodium, potassium and aluminum silicates. The adsorbent containers can be attached in a variety of ways to the interior of the filter body, such as by clips, snaps, loops, velcro and the like. In a preferred embodiment, the adsorbent containers are removably attached to the interior walls of the filter body such that as the filter body fills with fluid, the adsorbent containers float, exposing the fluid to the adsorbent material contained therein. As illustrated in FIGS. 5 and 6, adsorbent containers 27 are situated along the outer wall of the filter body, and along the interior of the dam.

Figure 7:
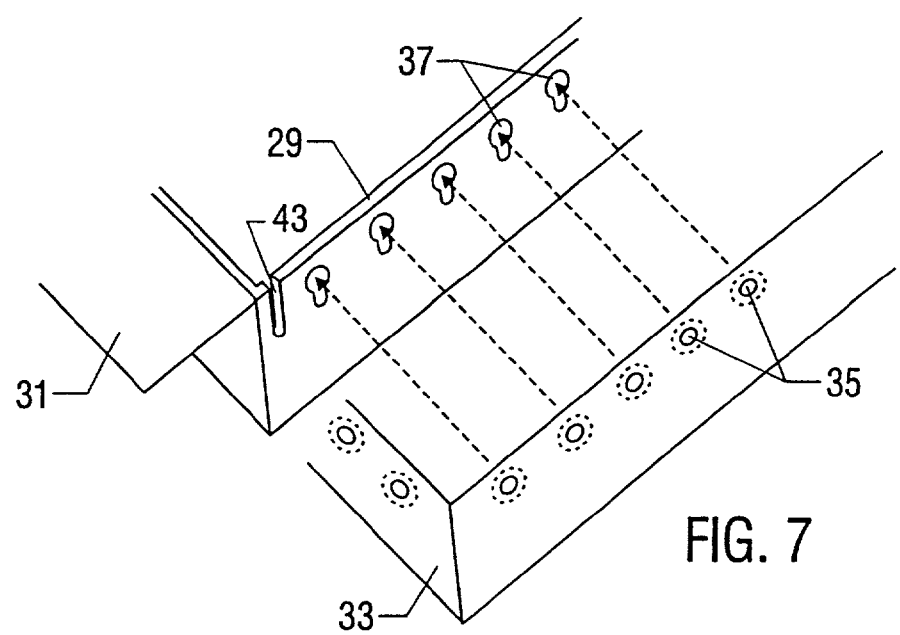
FIG. 7 is a partial perspective view illustrating one embodiment of a filter body and frame mounting system of the present invention.
Figure 8:
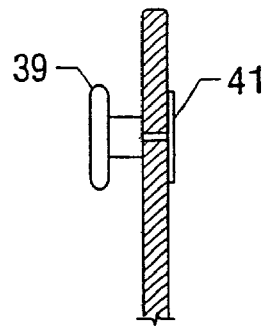
FIG. 8 is a side view of a filter body connector used in the mounting system of FIG. 7.
Figure 9:
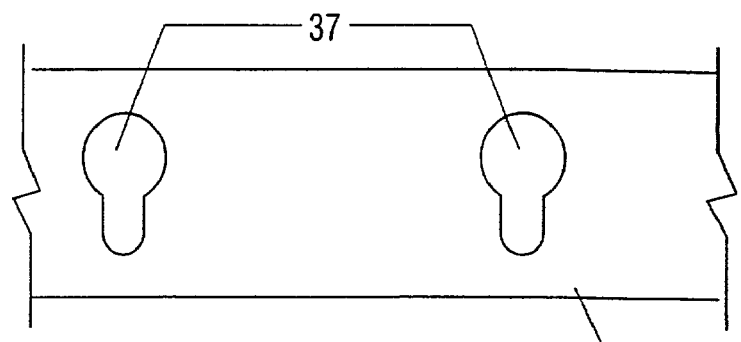
FIG. 9 is a partial side view of a frame for use in the frame mounting system of FIG. 7.
Figure 10:
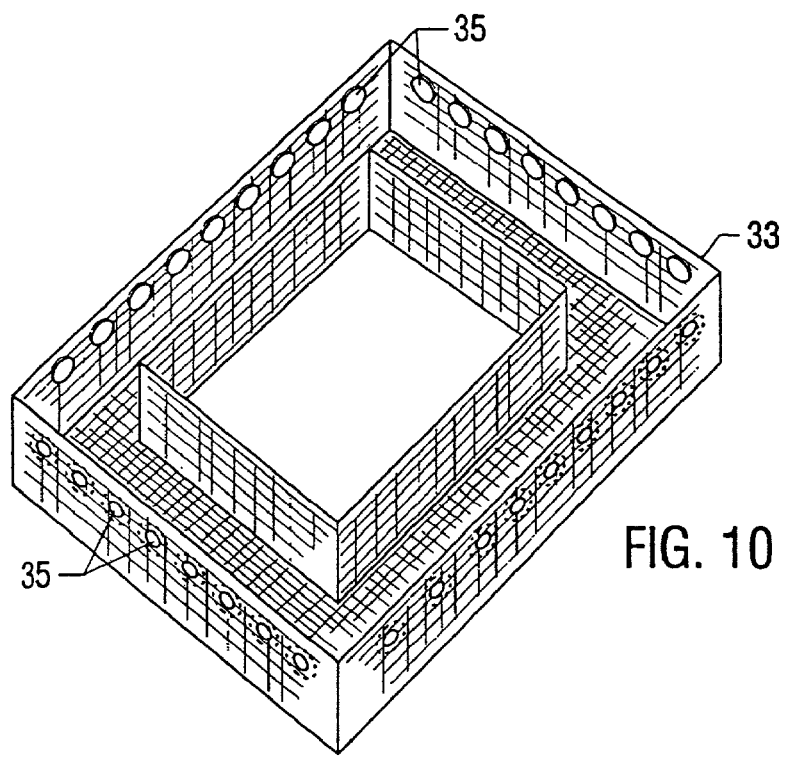
FIG. 10 is a perspective view of one embodiment of a filter body illustrating the filter body connectors of FIG. 8 along the upper periphery of the filter body.

Referring to FIGS. 7–10, an especially preferred filter body attachment method is illustrated. Frame 29 is shown having flange 30. A corresponding filter body 33 is shown having attachment members 35 situated along the periphery of the filter body. The attachment members 35 are designed to fit through corresponding openings 37 situated along the periphery of frame 29. The attachment members can be of any desired shape such that they may extend through the openings and be lodged in place. Preferred attachment members in this embodiment are fasteners such as buttons, tabs, rivets and the like that are configured for corresponding engagement with openings in the frame. Referring more particularly to FIG. 8, an attachment member is illustrated having a frame attachment portion 39 and a filter body attachment portion 41 that extends through the filter body 33 and secures the attachment member to the filter body. Referring more particularly to FIG. 9, the attachment member can then be inserted into corresponding opening 37 in frame 29. The attachment members may be configured such that the filter body is attached to the inside of the frame by, for example, reversing the orientation of the attachment member.

As indicated previously, a support bracket is preferably employed to assist in holding open the filter body in the desired position. Accordingly, a support bracket is dimensioned to cooperatively engage with the filter body to hold it open in the desired shape and to cooperatively engage with the inlet to hold the filter body in the desired position. The support bracket may take a variety of forms. It may be internal of the filter body itself, such as stiffening materials woven into the filter body, such as ribs, rods, and the like. In addition, support brackets may include male and female members slidably engaged with each other to allow adjustment for accommodating inlets, frames and filter bodies of various sizes.

As illustrated in FIG. 3, support bracket attachment points 6 are shown. As illustrated in FIG. 5, the upper end of support bracket 25 is retained in attachment point 26. As illustrated in FIG. 6, the support bracket may be retained by the filter body attachment member 23. In either case, in the embodiments illustrated, the bracket extends across the filter body, down the dam and under the filter body floor, and then extends upward such that the lower end of the bracket 25 can be wedged between the filter body and the wall of the inlet.

Figure 11:
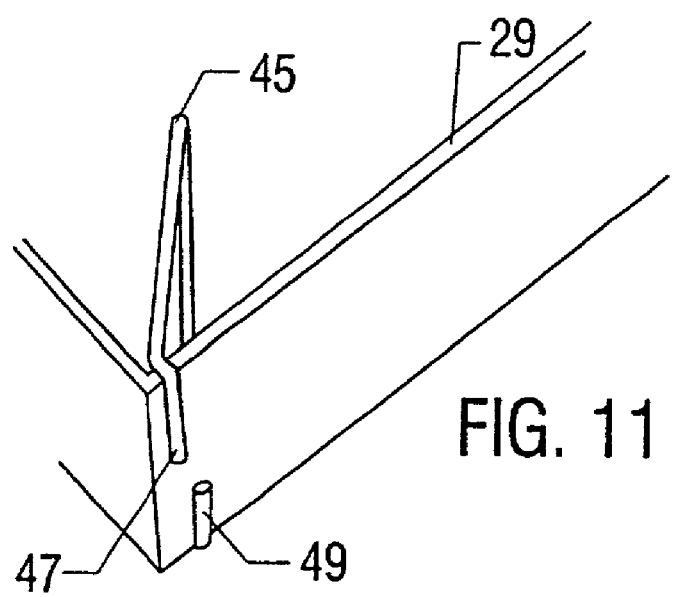
FIG. 11 is a partial perspective view of a frame and one embodiment of a filter body support bracket.

An especially preferred bracket attachment mechanism is illustrated in FIGS. 7 and 11. Referring to FIG. 7, frame 29 has bracket retaining slot 43. Referring to FIG. 11, support bracket 45 is shown having a first end 47 and a second end 49. The upper end rests in slot 43. The lower end extends upward along the outside of the frame 29 and is wedged between the frame and the inside wall of the inlet.

Figure 12:
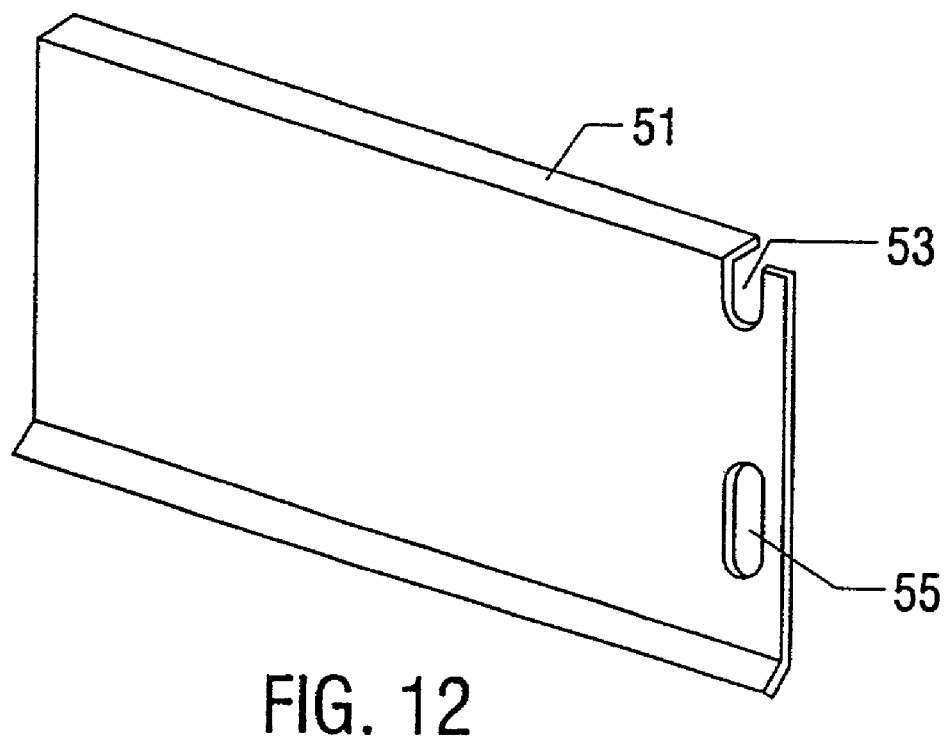
FIG. 12 is a partial perspective view of a frame having an alternative embodiment for attaching a filter body support bracket.
Figure 13:
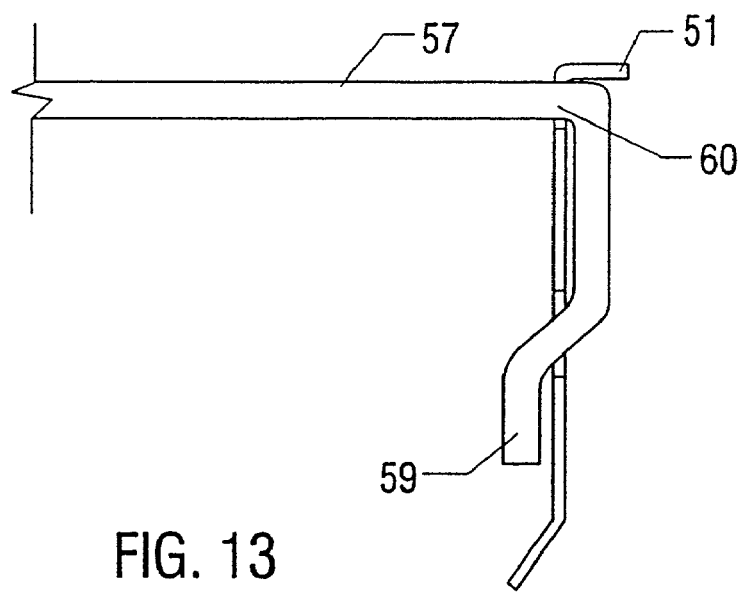
FIG. 13 is a partial side view of the frame of FIG. 12 and an alternative embodiment of a filter body support bracket mounted therein.
Figure 14:
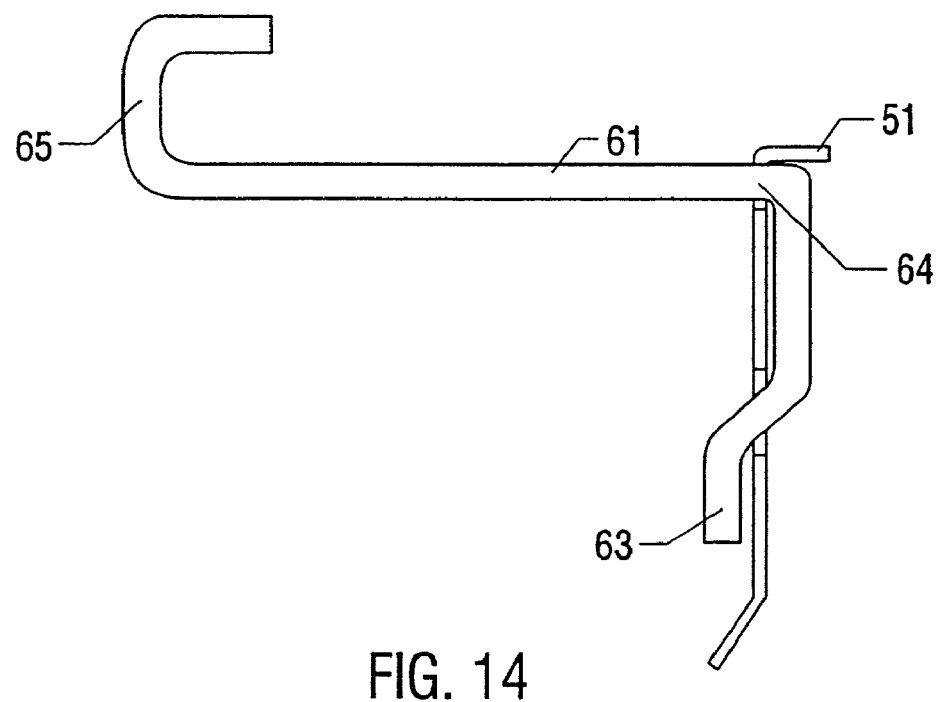
FIG. 14 is a side view of a filter body support bracket mounted in the frame illustrated in FIG. 12.

Referring to FIGS. 12-14, another preferred embodiment is illustrated for attaching a support bracket to a frame. FIG. 12 illustrates a frame 51 having a first opening 53 and a second opening 55. Referring to FIG. 13, a support bracket 57 configured to rest in corresponding openings 53 and 55 is shown wherein a first end 59 of support bracket 57 is inserted into corresponding opening 55. A support bracket mid portion 60 is then inserted into corresponding opening 53. A second end of the support bracket (not shown) may then extend across the filter body and attach to the filter body at strategic locations in order to retain the filter body in the desired shape. A particularly preferred attachment mechanism is illustrated in FIG. 14 wherein a support bracket 61 is illustrated having a first end 63 inserted into a corresponding opening in frame 51 and a support bracket mid portion 64 resting in a corresponding opening also in frame 51. An upwardly oriented second end 65 passes through a filter body attachment member (not shown), such as a loop, to assist in retaining the filter body in the desired open position.

The support bracket may be attached to the filter body at strategic attachment points, such as through a loop situated on the weir. Alternatively, the bracket may be incorporated into the filter body itself, such as sufficiently rigid material woven into the filter body to hold the body open in the desired position, or passed through sleeves in the filter body. In addition, the support brackets may include male and female members slidably engaged with each other such that the brackets can be adjusted to accommodate differences in filter body sizes and to make adjustments in the field where necessary.

Figure 15:
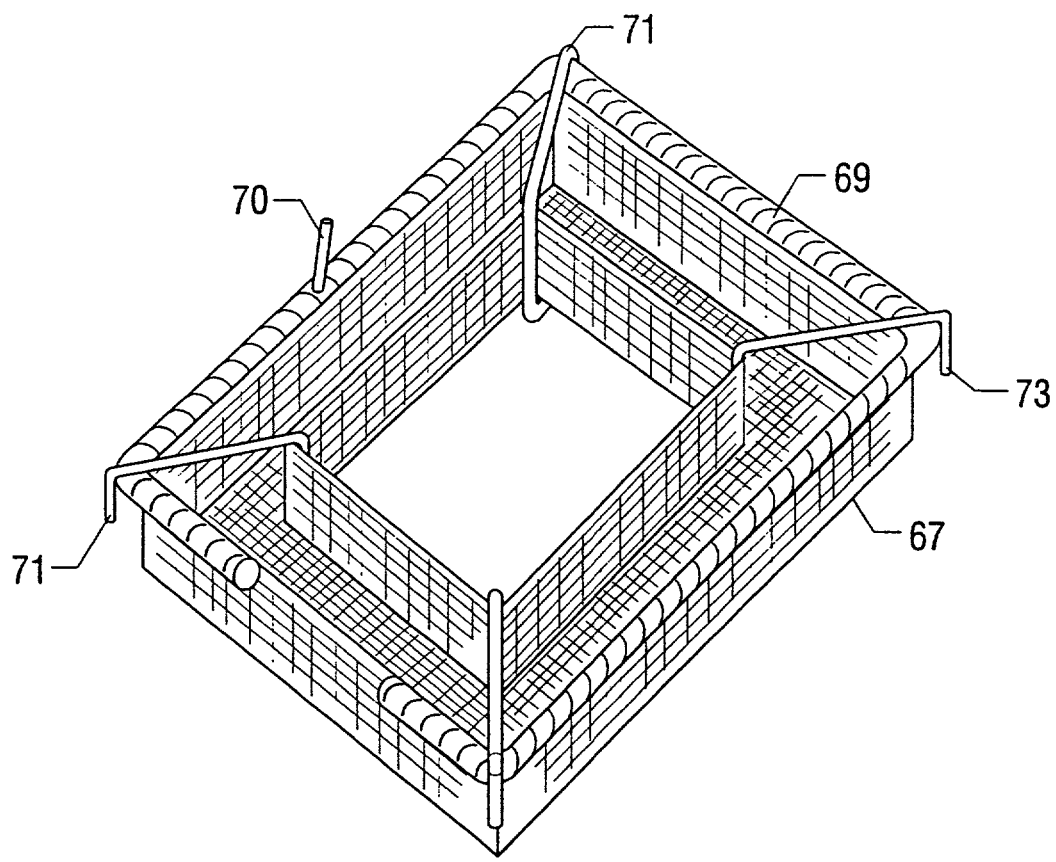
FIG. 15 is a perspective view of an alternative embodiment of a filter body illustrating the use of an inflatable bladder situated along the outer perimeter of the filter body.
Figure 16:
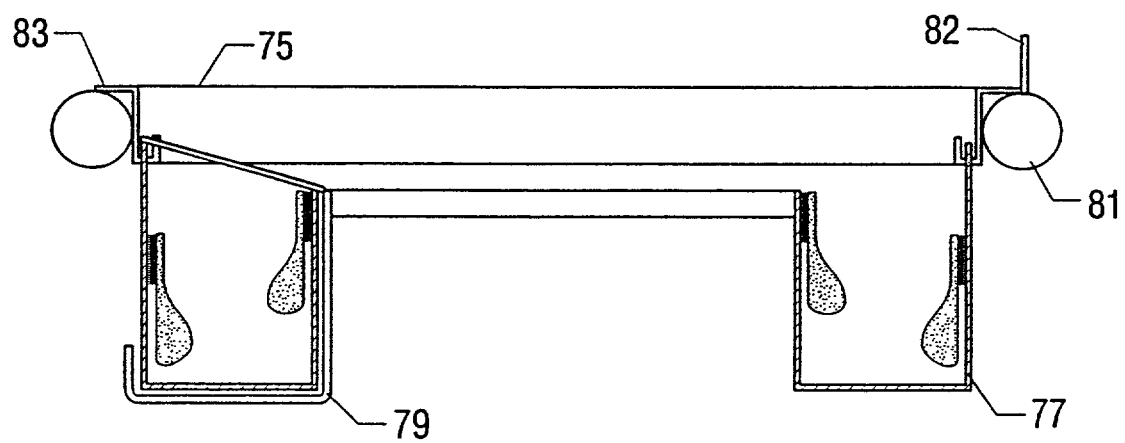
FIG. 16 is a side view of a frame and filter body combination employing an a inflatable bladder situated along the outer perimeter of the frame.

In certain applications it may be desirable to position the filter body in the inlet below the load bearing surfaces (as illustrated in FIG. 1) of the inlet, or in cases where no structure exists in the inlet on which to rest the frame. Referring to FIGS. 15 and 16, an alternative embodiment is illustrated wherein an inflatable member, such as an air bladder is situated along at least a portion of the perimeter of the filter body, either inside or outside of the filter body. The filter body is positioned in the inlet in the desired location and the member inflated such that the member is urged against the inside wall of the inlet, securing the filter body in position. Referring to FIG. 15, a filter body 67 is illustrated having inflatable member 69 extending along the outside perimeter of the filter body. Corner brackets 71 are used in conjunction with the inflatable member to assist in holding the filter body in the desired open position. The inflatable member may be attached to the filter body by any suitable mechanism, such as sewn to the filter body or inserted into loops or sleeves in the filter body. In addition, the support brackets may be inserted into loops or sleeves in the filter body and inflatable member to secure the brackets in place. As discussed above, one or more ends of the support brackets may be secured in place by positioning them between the filter body and the inside wall of the inlet. For example, as illustrated in FIG. 15, end 73 may be positioned such that it extends to the outside of the filter body and the inflatable member. Inflating the member, for example through valve 70, will wedge the support bracket between the inflatable member and the inside wall of the inlet, assisting in securing the support bracket in place.

Referring to FIG. 16, an alternative embodiment is illustrated wherein the inflatable member is used in conjunction with a frame. As shown, frame 75 is combined with a filter body 77 and support brackets 79 as earlier described. An inflatable member 81 is positioned such that it extends along the outside perimeter of the frame such that flange 83 rests on top of inflatable member 81. As earlier described, the inflatable member can be inflated through valve 82 such that the inflatable member is urged against the inside wall of the inlet, thereby securing the frame and filter body in place. In addition to inflating the member with a gas, the member may be inflated with other materials such as an expandable foam material.

FIGS. 17–19 illustrate another embodiment of the present invention installed in a curb inlet. A curb inlet 83 is illustrated having curb opening 85 and curb inlet wall 87. Generally, the lower portion of the opening 85 corresponds to the level of the surface 89 adjacent the curb inlet, such as pavement. One or more filter body members 91 extend along the inside surface of wall 87 adjacent the curb opening 85. At least a portion of fluid or debris flowing into opening 85, such as water run-off, will pass through one or more of the filter bodies 91 disposed in the inlet. As illustrated more particularly in FIG. 19, filter body member 91 can be rotated upwards and the filter body itself turned inside out, such as by pulling upwards on a loop 93 disposed within the filter body, in order to remove solids retained within the filter body member.

Figure 20:
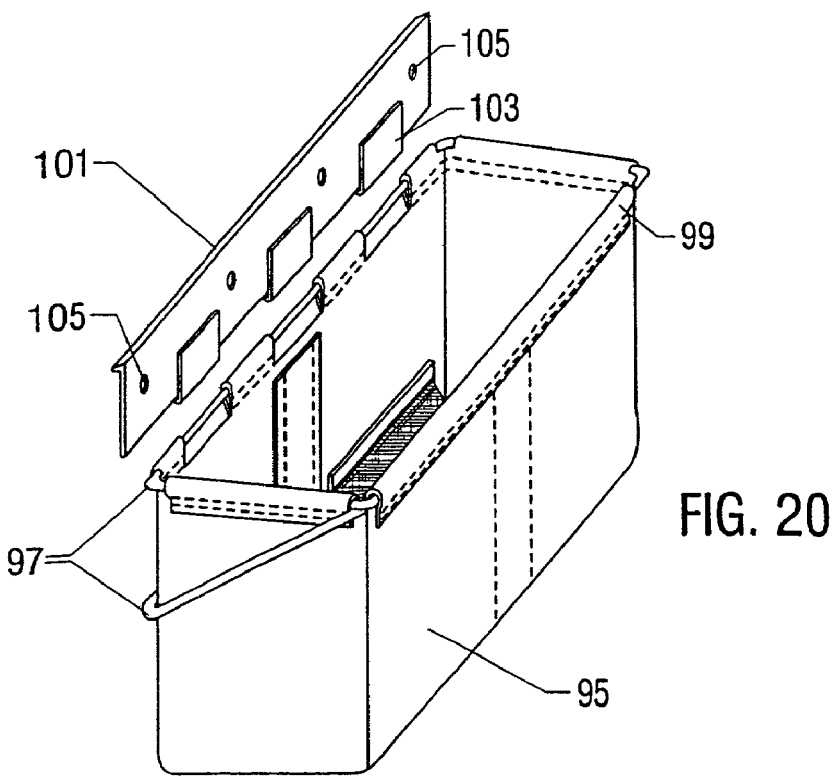
FIG. 20 is a perspective view of a frame and filter body combination illustrating an alternative embodiment of the present invention.
Figure 21:
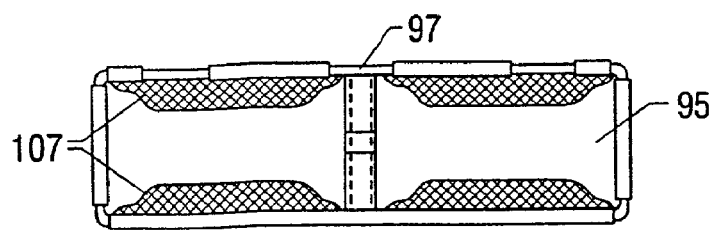
FIG. 21 is a top view of the embodiment illustrated in FIG. 20.
Figure 22:
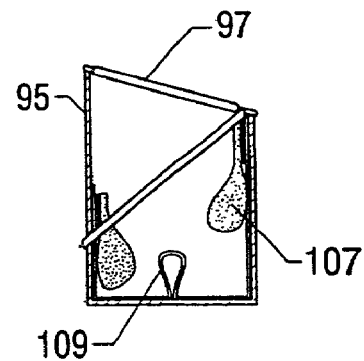
FIG. 22 is a side view of the embodiment illustrated in FIG. 20.

In general, the filter body member comprises a filter body, a frame adapted to hold the filter body in the desired position, and one or more attachment members for attaching the filter body to the frame and the frame and filter body to the inlet. FIGS. 20–22 illustrate a particularly preferred filter body member for use in a curb inlet. A filter body 95 is attached to frame 97 using sleeves 99 through which the frame is passed. A frame attachment member 101 is adapted for attaching the frame and securing the attachment member to the inside wall of a curb inlet. As illustrated, frame attachment member 101 is illustrated having frame mounting members 103 for securing the frame 97 to the frame attachment member. Openings 105 are included in the frame attachment member for anchoring the frame attachment member to the inside wall of the curb inlet. Referring more particularly to FIGS. 21 and 22, the filter body 95 includes one or more filter members 107. The filter members are designed to hold filtration media as previously described, and can comprise any suitable permeable container such as pouches, pockets and the like. A loop 109 may be incorporated into the filter body to assist in pulling the filter body member up and inside out to facilitate removal of solids, to remove and replace filter members, or to replace the filter body.

FIGS. 23–25 illustrate a particularly preferred frame attachment member. Frame attachment member 109 is shown having an upper wall mounting member 111 and openings 113 to facilitate anchoring the frame attachment member to the inside wall of a curb inlet. A lower frame mounting member 115 having frame attachment members 117 rotatably attaches the frame to the frame attachment member. Frame mounting member 115 is rotatably attached to upper wall mounting member 111. The frame attachment member acts as a double hinge, as illustrated more particularly in FIGS. 24 and 25. During cleaning or removal of the filter body, the filter body is pulled upward and rotated relative to both the lower frame mounting member 115 and the upper wall mounting member 111.

Other contemplated embodiments of the present invention are particularly preferred for accommodating increased fluid flow by maintaining the catch basin shape during periods of high fluid flow, and providing a means to retain floatables while the high-flow bypass is in use. These embodiments can also employ an adjustable supporting structure, allowing ease of maintenance and longer periods of use before requiring maintenance.

Figure 26:
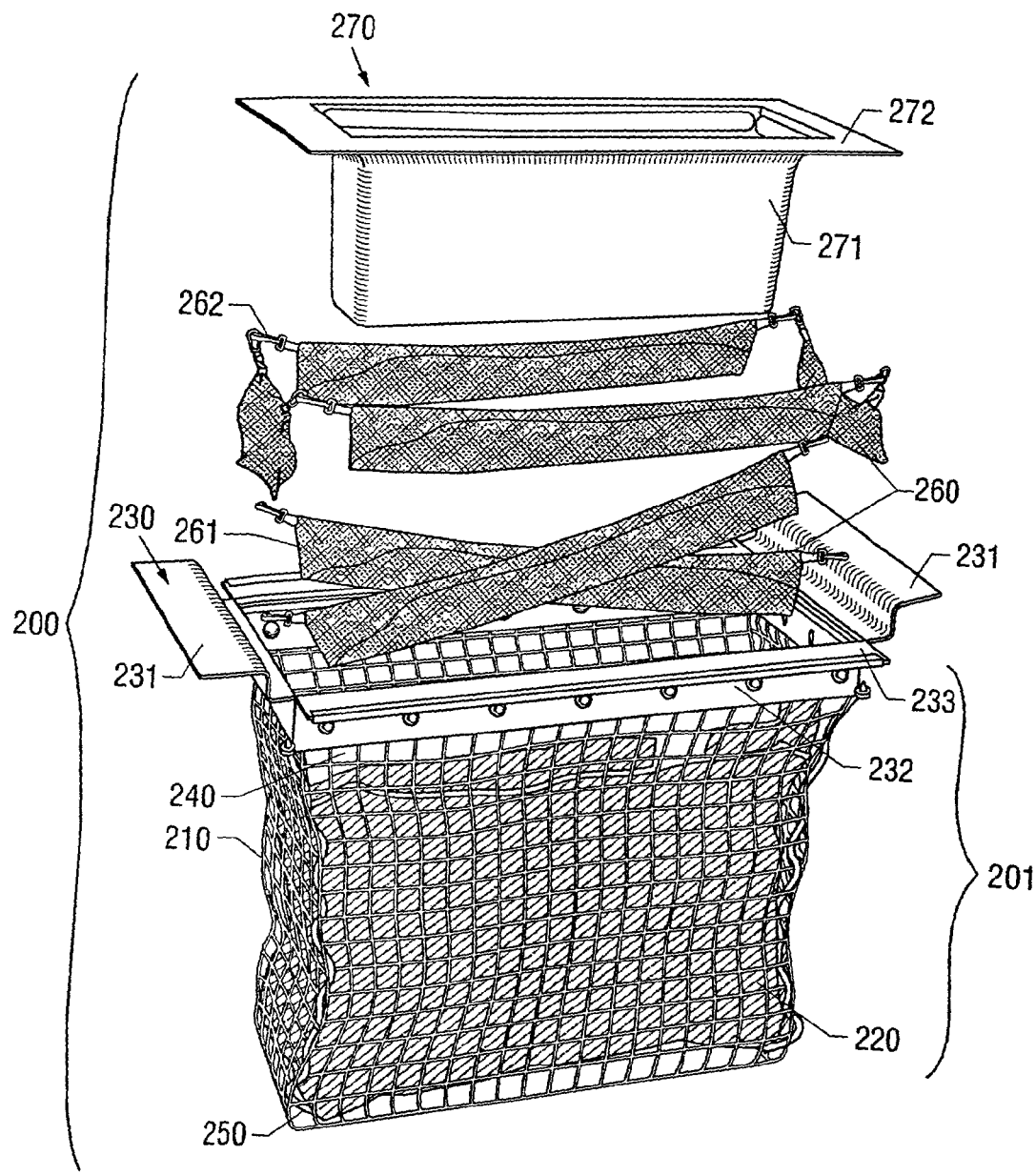
FIG. 26 is a partially exploded view of a preferred high capacity embodiment of the present invention.

Referring to FIG. 26, a partially exploded view of a high capacity catch basin filtration system according to a preferred embodiment of the present invention is illustrated. Although a four-walled generally rectangular or box-shaped filtration system is depicted, other shapes having a different number of walls or shapes, such as generally circular or oval shapes, are also contemplated. High capacity filtration system 200 generally forms a reservoir 201 for collecting and filtering fluid flow or storm water runoff. The outer walls and floor of this reservoir are formed by outer body or support basket 210, which comprises a portion of the filter body support, while the inner walls and floor of the reservoir are formed by filter body 220. Support basket 210 contains a plurality of large holes for passing fluid, and is preferably made of geogrid or other suitably strong netting. Because the support basket is preferably made of geogrid or netting that is relatively flexible in comparison with metal, hard plastic, fiberglass, and other stiffer materials, this embodiment can be referred to as a "soft body" embodiment for ease of reference.

Again referring to FIG. 26, support basket 210 is attached to and suspends from a lower portion of support frame 230, which also comprises a portion of the filter body support. As in the foregoing embodiments, support frame 230 includes one or more support flanges 231 for use in supporting the entire filtration system against a load bearing surface within an inlet structure or catch basin. Support frame 230 also includes inner support ring 232 and may include closure flanges 233. Filter body 220 is attached to and lines the walls and floor of support basket 210 in the general shape of a reservoir. The upper edge of filter body 220 is spaced apart and below frame 230, such that a high flow bypass 240 directly through support basket 210 is created between filter body 220 and support frame 230. In addition to support basket 210 and support frame 230, support cables 250 also comprise a portion of the filter body support. Support cables 250 traverse and connect the walls of support basket 210, preferably along the corners between basket walls, and also attach to support frame 230, preferably at inner support ring 232.

Adsorbent containers or booms 260 are removably attached to the interior of filter body 220 in various formations and in a variety of strategic locations. As shown in the preferred embodiment illustrated in FIG. 26, a first pair of adsorbent booms 261 are suspended from the internal walls of filter body 220 such that they traverse the floor of filter body 220 to form an X shape. In addition, a separate set of four adsorbent booms 262 are also suspended from the internal walls of filter body 220 such that each suspended boom rests against the floor and a respective wall of filter body 220. Removable debris trap 270 comprises walls 271 extending into the reservoir created by support basket 210 and filter body 220, such that large objects and floatables are retained within the debris trap whenever the water level inside the reservoir rises above the lower edge of the debris trap walls. An inner portion of support frame 230 is adapted to support flange 272 of debris trap 270, which rests loosely atop the support frame such that the entire debris trap is readily removable from the rest of filtration system. Typically, an inlet grating (not shown) will rest atop at least support frame 230 at one or more support flanges 231, and possibly atop debris trap flange 272 as well, to secure the entire filtration system in place within a drain inlet or catch basin.

Figure 27:
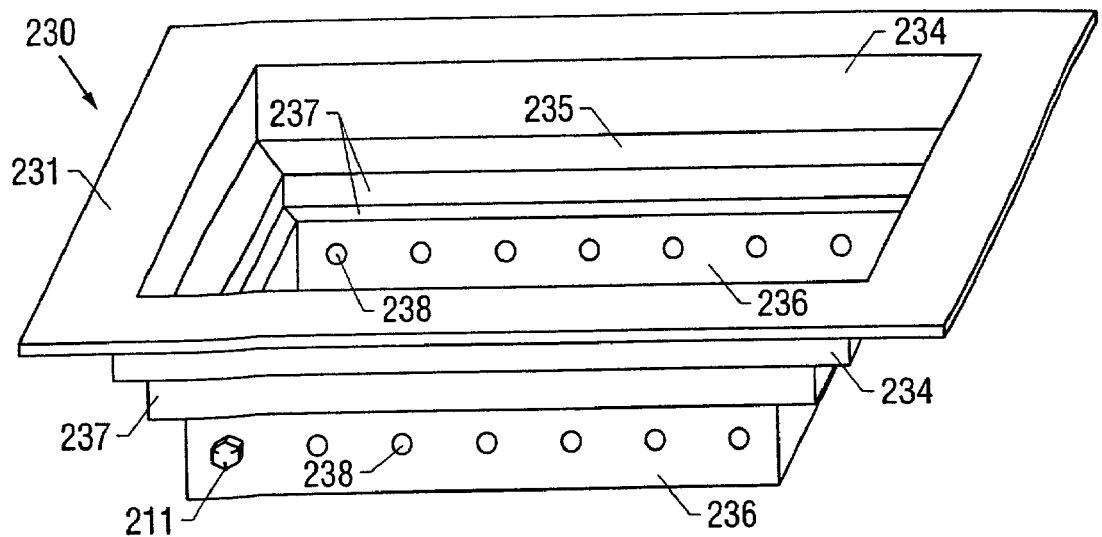
FIG. 27 is a perspective view of the support frame illustrated in FIG. 26.
Figure 28:
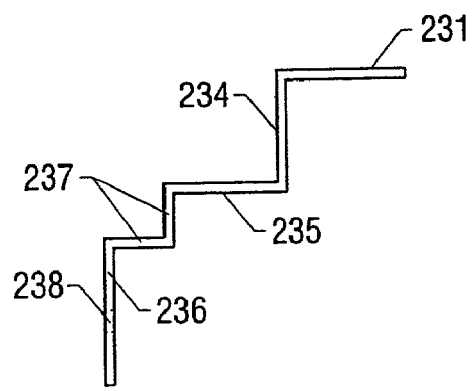
FIG. 28 is a side cross-sectional view of the support frame illustrated in FIG. 27.

Referring to FIGS. 27 and 28, one embodiment of frame 230 of the high capacity filtration system illustrated in FIG. 26 is shown. FIG. 27 shows a perspective view, while FIG. 28 shows a side cross-sectional view of support frame 230. Similar to the frame depicted in FIGS. 2 and 3, support flange 231 extends generally perpendicularly from upper frame wall 234 such that it can rest on a load bearing surface within a drain inlet (not shown) and thereby support the entire filtration system. Support surface 235 extends generally perpendicularly and inward from upper frame wall 234, and provides a load bearing surface capable of supporting the debris trap as described above. Lower frame wall 236 can extend generally perpendicularly from support surface 235, or additional generally perpendicular wall and surface segments 237 may intervene.

In addition to providing support for the debris trap at a support surface, forming the frame as shown to include multiple bends, flanges, surfaces, walls, and the like serves to stiffen and strengthen the frame such that it is more resistant to torsional forces and better able to support an increased load imposed by the reservoir. Frame 230 may be formed from, for example, 16 gauge stainless steel, a hard plastic, or any other suitable material capable of bearing the load imposed by a reservoir filled with fluid and built up sediment. Regularly spaced holes 238 are formed in lower frame wall 236 to facilitate attachment of the support basket to the support frame. As illustrated in FIG. 26, steel bolts 211 may be used to attach the support basket to the support frame at these regularly spaced holes. Any other acceptable connecting method may also be used to attach the support basket to the support frame, such as snaps, screws, rivets, buttons, tabs, hooks, clamps, drawstrings and the like. A connector that renders the support frame readily removable from the support basket is not necessary, as the support frame and support basket tend to be permanent elements of the overall filtration system that do not require regular maintenance. Accordingly, a relatively permanent connecting method such as the bolts illustrated in FIG. 26 is appropriate.

Figure 29:
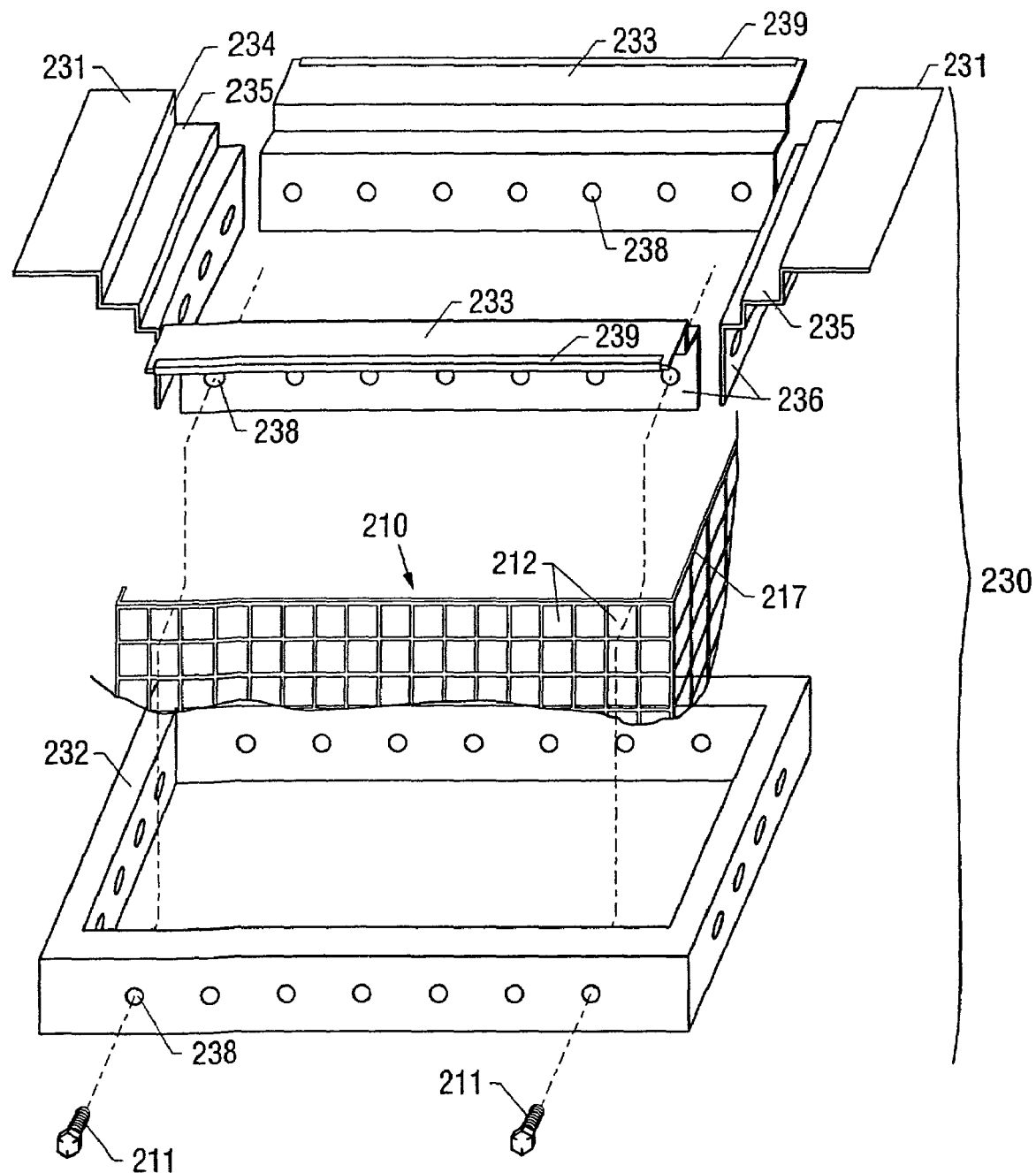
FIG. 29 is an exploded view of the support frame embodiment illustrated in FIGS. 26–28.

Referring to FIG. 29, a particularly preferred embodiment of support frame 230 of the filtration system illustrated in FIG. 26 is shown in an exploded view. A foundation for support frame 230 is established by inner support ring 232, which both supports and defines the sizes of the support basket, filter body, adsorbent pouches and support and closure flanges. Inner support ring 232 comprises four metal segments or bars, which are preferably welded together to form a singular rigid box or ring. This inner support ring may alternatively be cast or formed by any other acceptable method as is known in the art. Inner support ring 232 is sized at a dimension less than the internal diameter of the inner catch basin such that high flow bypass and filtered fluids are allowed to flow between the filtration system and the walls of the catch basin.

Inner support ring 232 preferably locates and connects to one or more flange segments. In a preferred embodiment, the inner support ring connects to two pairs of separate flanges comprising a total of four separate flange segments. A pair of support flange segments 231 attach to inner support ring 232 at opposing sides of the support ring, while an optional pair of closure flange segments 233 attach to the inner support ring at its other pair of opposing sides. Alternatively, four support flange segments may be used, with one segment attaching at each side of the inner support ring. Bolts 211 attach inner support ring 232 to each flange segment at regularly spaced holes 238 in the support ring and in the lower wall 236 of each flange segment. Each flange segment preferably attaches to the inside of the inner support ring, such that the outer wall of the inner support ring can be seen around its circumference. In addition, the support basket (not shown) is positioned between the inner support ring and each flange segment before bolting is accomplished. Other acceptable connecting methods may also be used to attach the flange segments to the inner support ring, such as snaps, screws, rivets, buttons, tabs, hooks, clamps, drawstrings and the like.

The cross-section of each support and closure flange segment is shaped similarly to the cross-section of the entire support frame in the foregoing embodiment, as illustrated in FIG. 28. Each closure flange segment 233, however, typically does not require either the support flange 231 or upper frame wall 234 sections. As in the above embodiment, support flanges 231 extend generally perpendicularly from upper frame walls 234 such that these support flanges can rest on a load bearing surface within a drain inlet and thereby support the entire filtration system. Accordingly, support flanges 231 support inner support ring 232, which in turn supports the rest of the filtration system, including closure flanges 233. Closure flanges 233 do not carry any load, and function to close any gap that exists between the outside of the filtration system and the inside walls of the catch basin. Because they serve to close any gaps and prevent fluid from avoiding the filtration system, closure flanges 233 preferably comprise gaskets 239 attached to and running along an outer edge to form a substantial seal against the catch basin wall. As in the foregoing embodiment, support surfaces 235 extend generally perpendicularly and inward from upper frame walls 234, and provide a load bearing surface capable of supporting the debris trap.

As indicated, catch basin filtration systems that are capable of accommodating the dimensions of various drain inlets and catch basins are desired. The present embodiment permits dimensional flexibility in the formation of the system. Inner support rings come in a wide variety of sizes, and may even be custom made as necessary, such that a particular inner support ring may be selected for a given drain inlet or catch basin. Flange segments of appropriate dimensions are then attached to each side of an inner support ring to comprise a support frame that will fit into the given catch basin.

Figure 30:
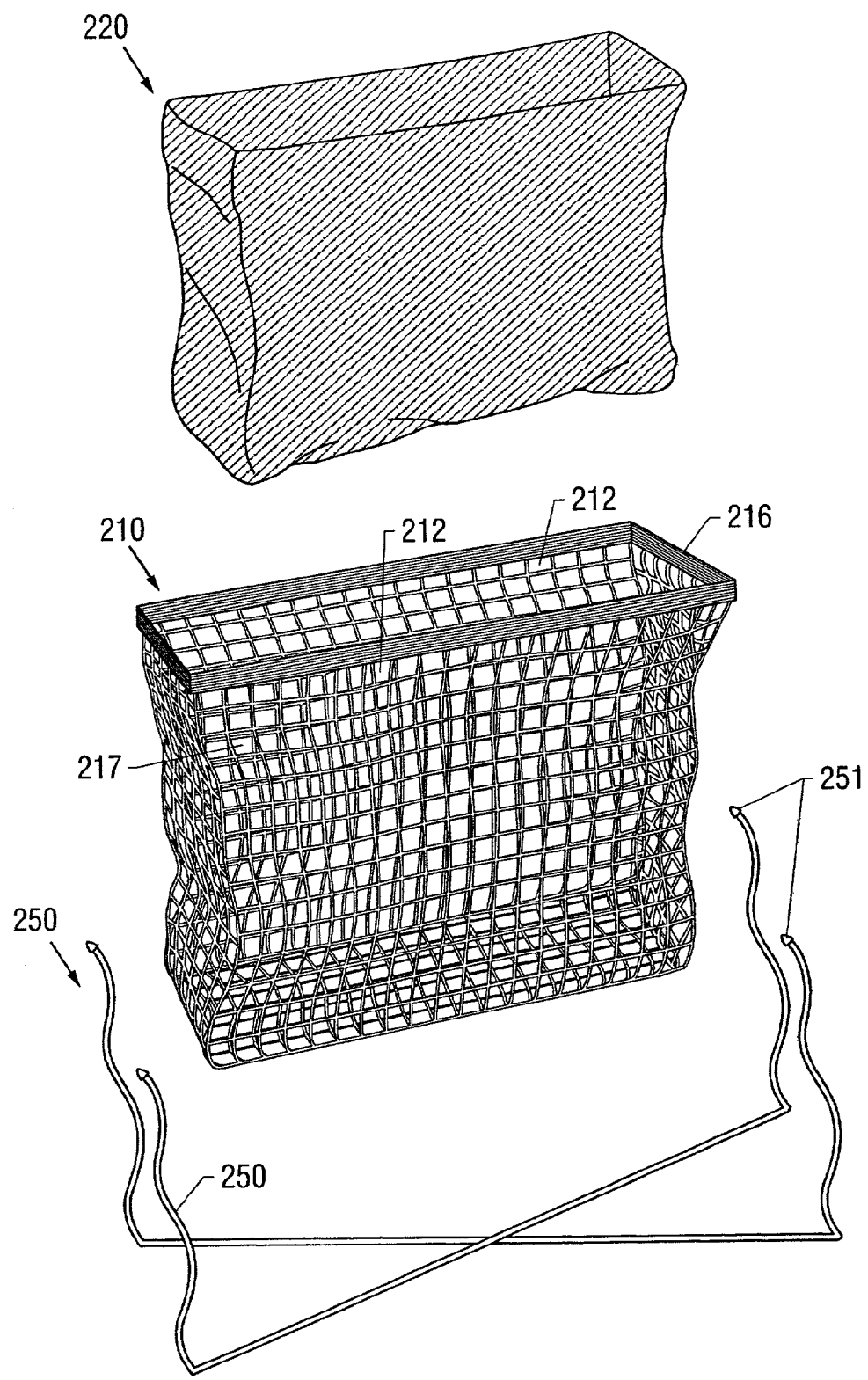
FIG. 30 is an exploded view of the support cables, support basket and filter body used by the embodiment illustrated in FIG. 26.

As indicated, the frame can serve as at least one portion of the filter body support. Referring to FIG. 30, a support basket 210 comprising another portion of the filter body support is illustrated in an exploded view with respect to filter body 220 and support cables 250. Support basket 210 is preferably constructed and positioned such that any fluid passing through filter body 220 must then pass through the support basket. Support basket 210 is also preferably constructed and positioned with respect to filter body 220 such that the support basket passes fluid at a rate equal to or greater than the rate at which the filter body passes fluid. In this manner, the rate of fluid passage through the filter body will then be the more predominant factor in determining the rate at which the reservoir fills with fluid. Accordingly, support basket 210 should contain a plurality of large holes or openings 212 such that fluid flow is not restricted through the support basket.

Support basket 210 is preferably constructed of a material having sufficient strength to support the load imposed by a reservoir filled with fluid, and is preferably constructed from a relatively large holed netting or geogrid, as illustrated in FIG. 30. Such netting or geogrid may be made of, for example, cloth, plastic, metal, wire mesh, or any other sufficiently strong material. In a particularly preferred embodiment, support basket 210 is made from a nylon geogrid manufactured under the designation "Tensor BX-1100" by Earth Technologies, Inc. of Atlanta, Ga. Support basket 210 as depicted in FIG. 30 is generally rectangular or box-shaped, although any other shape generally defining a reservoir is also contemplated. Support basket 210 may be prefabricated into its reservoir defining shape, or the walls and floor of the reservoir may be individually formed and then fastened together via stitching, clamps, ties, tabs, ribs, rails, or the like.

Figure 31:
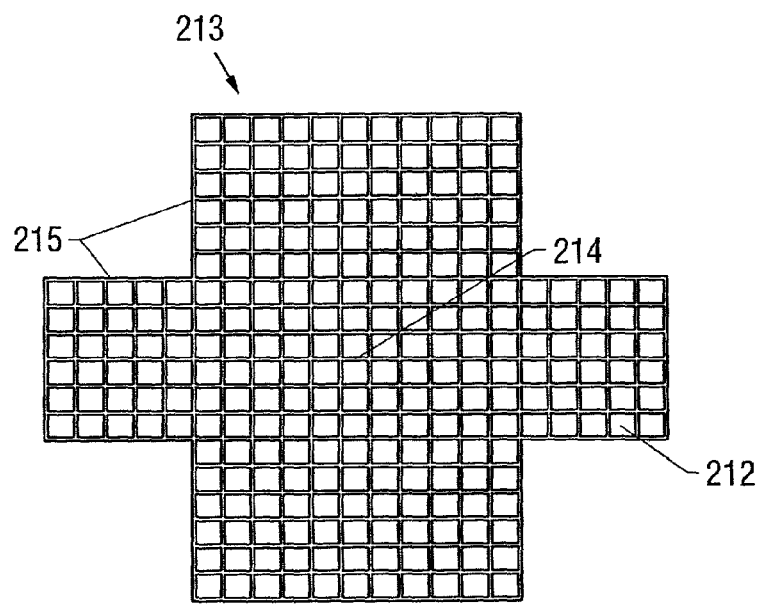
FIG. 31 is a top view of a preferred pattern used to form both the support basket and the filter body of the present invention.

In an especially preferred embodiment, support basket 210 is formed by first cutting or otherwise separating the geogrid or basket material in a cross shape 213, as illustrated in FIG. 31. The center section 214 of the cross defines the support basket floor, while each adjoining section 215 defines a respective wall of the support basket. All adjoining sections 215 are bent, folded or otherwise pulled upward to form the four walled box-shaped support basket as depicted in FIGS. 26 and 30. The integrated wall to floor intersections of this embodiment are advantageously stronger than if each section were made separately and then connected. Adjoining sections 215, which form the basket walls, are then fastened to one another as described above. In a preferred method of fastening adjoining sections 215, support cables 250 are positioned in the corners of the support basket and are woven in and out of the large openings 212 in the adjoining sections, in order to join these sections together to form the support basket.

Referring to FIG. 30, a relatively closed fringe or cuff 216 defines the upper edge of support basket 210 around its open perimeter. Although the direct attachment of lower netting or mesh portion 217 of support basket 210 to the support frame is contemplated, cuff 216 serves to facilitate and strengthen this attachment. It is thus preferable that cuff 216 comprise more material than is typically found in the lower netting or mesh portion 217 of support basket 210. In fact, because cuff 216 rests flush against the lower wall of the support frame when fastened to the support frame, as shown in FIG. 26, it is not necessary for cuff 216 to contain large holes or a net like structure as in lower netting 217. Cuff 216 may be integrally formed with the rest of support basket 210, or alternatively may comprise a separate strip of material that is then fastened to the netting or geogrid material to form the support basket. In one such embodiment, cuff 216 may comprise a length of woven nylon or other suitably strong material that is folded over the upper edge of lower netting 217 and is then glued, melted welded, stapled, or otherwise attached to the lower netting by any suitable means. Bolts may then be used to attach cuff 216 to the lower wall of the support frame, although any other suitable attachment means will suffice. Cuff 216 may also advantageously contain holes to accommodate bolts or other attachment means for attaching support basket 210 to support frame 230.

In a particularly preferred embodiment, as illustrated by the exploded view of FIG. 29, lower netting or mesh portion 217 is clamped between inner support ring 232 and the lower walls 236 of the support flanges 231 and closure flanges 233. Bolts 211 or other equivalent attachment means then pass through inner support ring 232 and lower walls 236, as well as through a plurality of the large openings 212 inherent in the lower netting or mesh portion 217. Appropriate tightening of bolts 211 and the accompanying nuts and washers then provides force sufficient to clamp the netting between the lower walls of the frame segments and the inner support ring, such that the support basket is held in place during the operation of the filtration system. Positioning the bolts or other fastening means through the netting that is clamped between the foregoing elements provides additional support to the netting and support basket as well. As indicated, both frame 230 and support basket 210 are relatively permanent elements of the filtration system such that any other permanent means of attaching these two elements to each other would also be appropriate. Depending on the actual materials of construction for either element, such attachment means may include welds, rivets, screws, glue, snaps, clamps, staples, stitching or the like.

As indicated, the support frame and support basket both serve as portions of the filter body support. Referring again to FIG. 30, support cables 250 comprising another portion of the filter body support are illustrated. Support cables 250 may be formed from any suitably strong material such as, for example, a composite metal wire with a protective plastic coating. A nylon strap or other suitable device may also be used to function as support cable 250. Because support basket 210 is made of a relatively soft geogrid, netting or mesh type of material, the walls of the support basket tend to expand or bulge outward as the reservoir created by the support basket and filter body fills with fluid. As indicated, the excessive load imposed by the increased volumes of high capacity catch basin filtration systems can result in the expansion of the fluid retaining reservoir, which in turn may result in partially or wholly blocked fluid drainage routes, thereby causing a backed up system and drain inlet. Accordingly, support cables 250 are provided to assist in substantially reducing reservoir expansion under increased loads, such that the overall shape of the reservoir is substantially maintained.

Support cables 250 are positioned generally outside support basket 210 and traverse the walls and bottom of the support basket, preferably along the corners between basket walls and across the bottom in a crossing pattern. These support cables function in part to transfer load from the bottom to the corners and/or sides of the filter body. Each support cable 250 is preferably attached to the inner support ring such that the distal ends 251 of each support cable attach at diagonally opposite inner support ring corners. As illustrated in FIG. 30, this results in an X pattern across the bottom of a four-walled box-shaped support basket, with preferably two cables crossing each other diagonally across the bottom. For circular support baskets or those with additional walls, additional support cables may be added such that these support cables then cross each other in a star, asterisk or other pattern across the bottom of the support basket. Although crossing the support cables across the bottom of the basket is believed to provide maximum support, running the support cables in a pattern such that they do not cross each other may also provide advantageous support. As discussed above, it is especially preferable that the support cables be positioned at the intersections of support basket wall segments, in order to perform the additional function of connecting these wall segments by weaving in and out of the openings in each.

Figure 32:
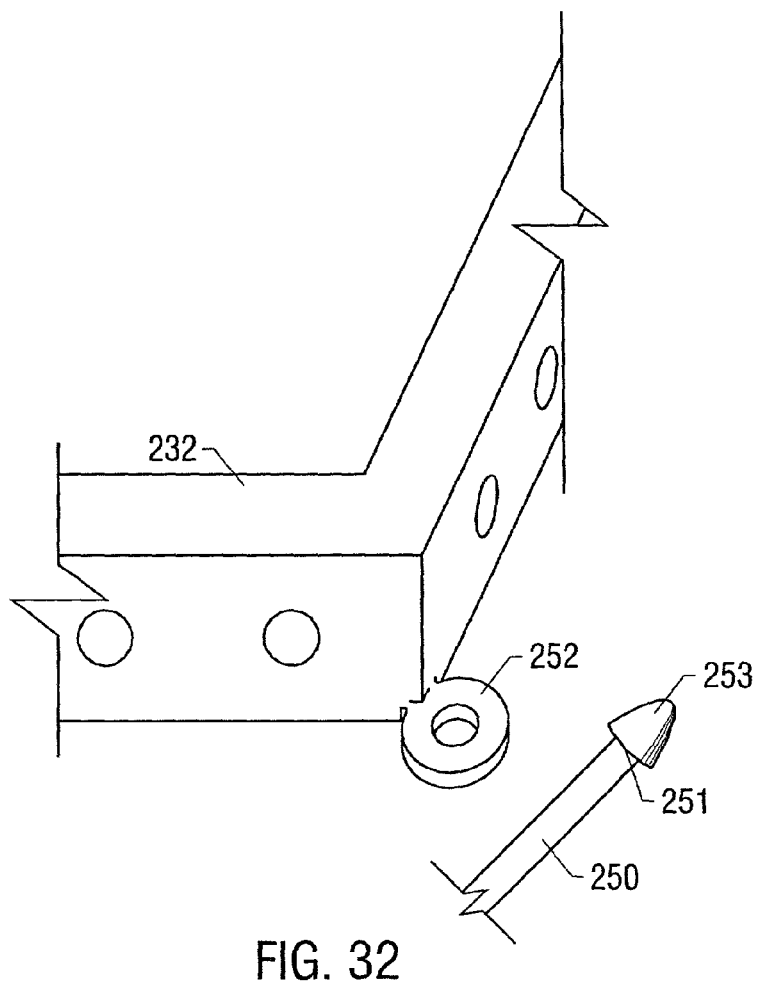
FIG. 32 is a perspective view illustrating one embodiment for attaching a support cable to the frame structure.

The distal ends 251 of the support cables may be attached at the inner support ring, or alternatively the lower frame wall, via any appropriate attachment means, such as welds, rivets, screws, glue, snaps, clamps, staples, stitching or the like. A particularly preferred attachment means is illustrated in FIG. 32. An integrally formed metal loop 252 extends from an outer corner of inner support ring 232 and is adapted to receive a distal end 251 of support cable 250. The support cable is threaded through loop 252 and a hardened tip 253 is then clamped or welded onto distal end 251 such that the end cannot slip back through loop 252. Alternatively, distal end 251 may comprise any type of formation or fitting (not shown) that permits threading in one direction through a loop or opening, but not back in the other direction once threaded.

Figure 33:
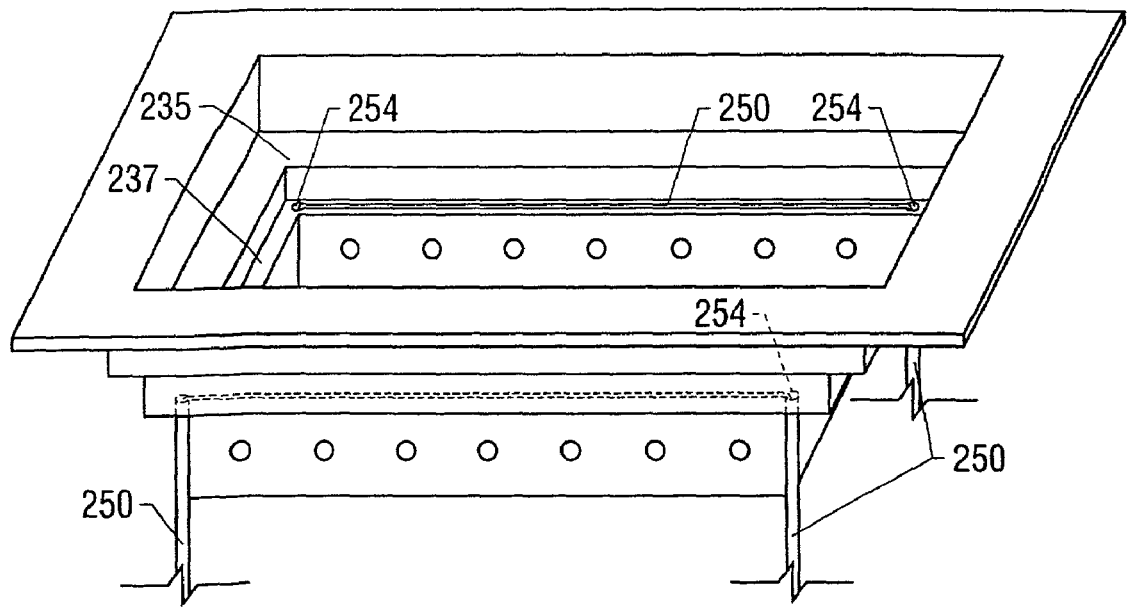
FIG. 33 is a perspective view illustrating an alternative method of attaching a support cable to the frame structure.

In another embodiment, it is contemplated that one or more support cables 250 pass through one or more optional holes or openings 254 in a support surface 235 or other surface 237 of support frame 230, as illustrated in FIG. 33. After rising through one such optional hole 254, portions of cable 250 may then run along and above support surface 235 or other surface 237 before dropping back down though another optional hole 254. Under this embodiment, it would thus be possible to utilize one elongated cable that runs along many or all wall-to-wall corners, crosses itself at the bottom of the support basket and traverses portions of the upper side of a frame support surface. Preferably, the distal ends of such an elongated cable would then meet once the cable has traversed the desired number of wall-to-wall corners, such that the ends may attach to each other or to the frame or other stable attachment source at a specific location.

Referring again to FIG. 30, filter body 220 is illustrated as a generally rectangular or box-shaped reservoir. As indicated in the foregoing embodiments, a variety of terms can be used to describe the general fluid retaining shape of filter body 220, such as trough, pocket, basket, catch basin, reservoir and the like. This filter body is substantially similar in nature to the filter body described in the foregoing embodiments in several respects. One purpose of the filter body is to capture and substantially retain sediment, debris and other material carried by storm runoff or other fluid, while permitting the fluid itself to pass through. Accordingly, at least a portion of the filter body is constructed of perforated or porous materials. In a preferred embodiment, the entire filter body 220 is comprised of such porous material in order to maximize the capacity of filtered flow through the filtration system. As in the foregoing embodiments, the perforated or porous material may be constructed of screen, netting, woven cloth, or other appropriate filtering materials that are strong enough to withstand the load imposed by accumulated sediment, debris, and/or a filled catch basin reservoir. A particularly preferred material for constructing the filter body is a woven geotextile material made of monofilament polypropylene yarns such as Mirafi Filterweave® 401 manufactured by TC Mirafi of Pendergrass, Ga. The size of the perforations or openings in the filter body material may vary as desired to meet varied demands for filtered fluid flow capacity and retention of particular particle sizes.

As indicated, the entire filter body may be constructed of perforated or porous material, or alternatively constructed of a combination of porous and non-porous materials depending on a particular application, such as a desire for controlled or no fluid flow from specific filter body locations. The entire filter body will typically be made from porous material, and may be fabricated as a complete unit or may be formed by combining and fastening together several walls and a floor from the same or various materials as needed. In one embodiment a sufficient amount of porous or filtering material is formed into four walls and a floor, which are then fastened to each other at corners such that a filter body comprising a box-shaped reservoir is created, as illustrated in FIG. 30. Alternatively, as illustrated in FIG. 31, a similar method of cutting or otherwise separating the filter body material into a cross shape 213 may be used. Analogously to the method used in forming the support basket, the center section 214 of the cross defines the filter body floor, while each adjoining section 215 defines a respective wall of the filter body. All adjoining sections 215 are bent, folded or otherwise pulled upward to form the four walled box-shaped filter body reservoir, as depicted in FIGS. 26 and 30. Under any piece connecting alternative, the pieces of filtering material are preferably tightly stitched or sewn together to minimize the amount of fluid that might pass through the mating of the individual pieces. Other suitable means for connecting the individual pieces may also be used including, for example, buttons, rivets, tabs, snaps, loops, velcro, glue, clamps and the like.

Figure 34:
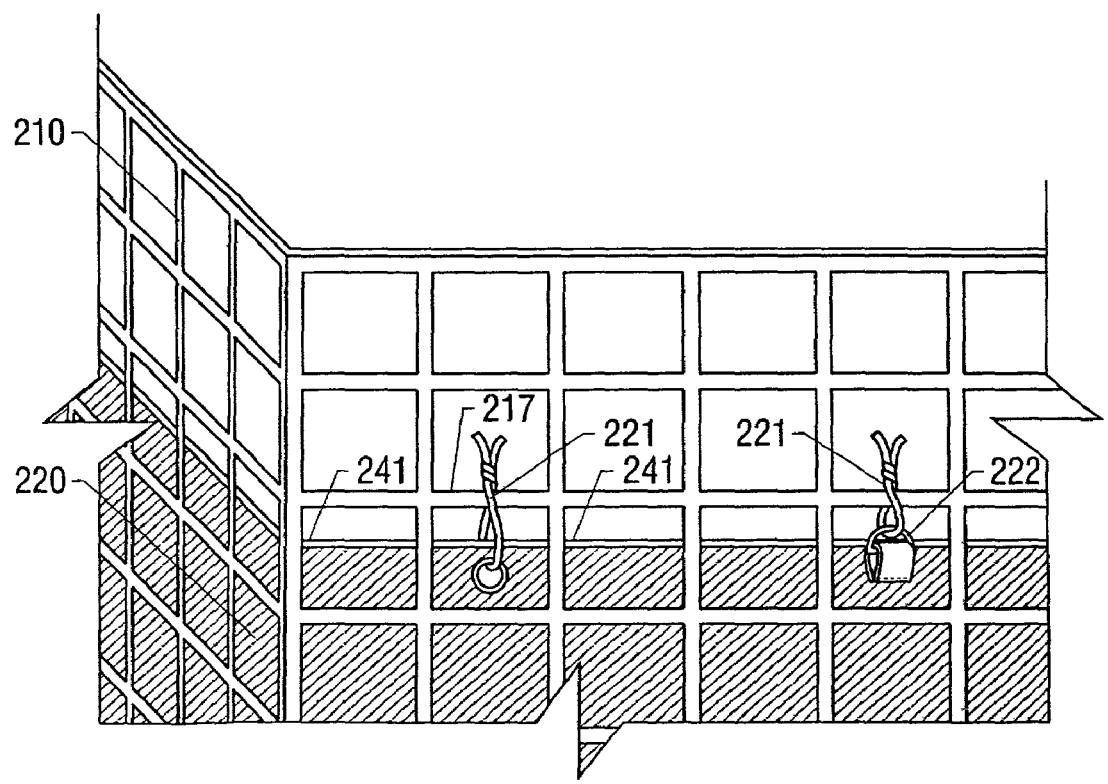
FIG. 34 is a partial perspective view illustrating the tabs connecting the filter body to the support basket.

As illustrated in FIGS. 26 and 30, filter body 220 generally lines the walls and floor of support basket 210 such that the filter body substantially takes the shape of the support basket. This is especially true as the filtration system and reservoir begin to fill with fluid. Referring to FIG. 34, appropriate connection means are used to attach the filter body to the support basket. Any suitable means for connecting the walls of the filter body to the walls of the support basket may be used, including tabs, snaps, button, rivets, loops, clamps, staples, and the like. In one embodiment, a plurality of connecting tabs 221 pass through small holes around the upper edge 241 of filter body 220 and close around the filter body and sections of the lower netting or mesh portion 217 of support basket 210. In a particularly preferred embodiment, the small holes around the upper edge of the filter body are forgone in favor of "D-rings" 222, which comprise hoops made of plastic or other similar material. D-rings 222 are preferably connected to small nylon straps or loops, which are sewn onto the walls of the filter body near upper edge 241, and are preferably located on the outer wall of the filter body. Connecting tabs 221 then pass through D-rings 222 and close around a section of the geogrid or lower netting 217 to connect filter body 220 to support basket 210.

The filter body generally fits within, is supported by, and takes the shape of the support basket, such that the floor of the support basket provides a substantial amount of the support required by the filter body. Accordingly, connecting tabs 221 or other appropriate connection means do not necessarily need to support the bulk of the vertical load imposed by a filled filter body. A primary purpose of the connecting tabs or other appropriate connection means then is to ensure that the filter body remains against the walls of the support basket and does not, for example, inappropriately cave inward toward the center of the reservoir.

Figure 35:
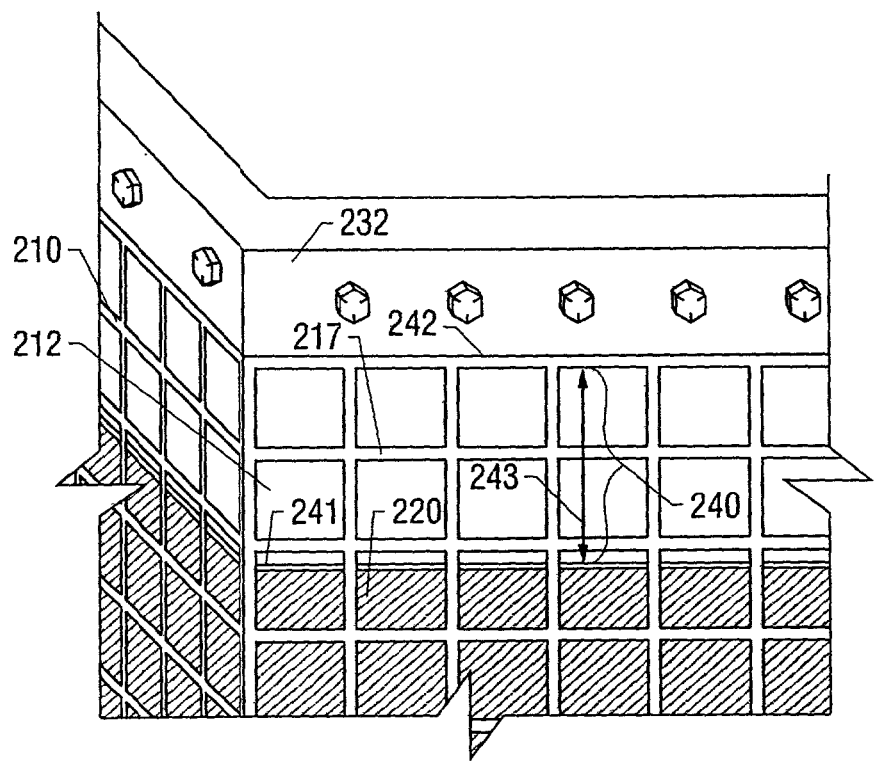
FIG. 35 is a partial side perspective view of the high flow bypass formed by the spaced distance between the frame structure and filter body.

As indicated, it is highly desirable for any catch basin filtration system to have a high flow bypass feature so that storm water runoff may pass through the drainage system and not back up and flood the surrounding areas during heavy storms or other periods of high fluid flow. Referring to FIG. 35, a readily adjustable high flow bypass of the preferred embodiment is illustrated in detail. Upper edge 241 of filter body 220 is spaced some distance below bottom edge 242 of inner support ring 232 (or lower frame wall 236 in the absence of an inner support ring), exposing some of the large openings 212 of lower netting 217 of support basket 210. This spaced distance 243 where the netting of the support basket is not lined or covered by the filter body substantially serves to define high flow bypass 240 through the support basket. Spaced distance 243 is preferably identical around the circumference of support basket 210, although customization of the high flow bypass in order to advantageously direct or block bypass flow in certain directions is contemplated. As the filter body fills with fluid, all porous walls and/or floor of the filter body will pass fluid at a particular combined rate. Should fluid flow be so high that the filter body fills with fluid faster than this combined rate at which fluid is able to pass through the filter body, excess fluid will eventually spill over the upper edge 241 of filter body 220. This excess fluid then readily passes through the relatively large and exposed openings 212 in lower netting 217 between upper edge 241 and lower edge 242 within the spaced distance 243 comprising high flow bypass 240.

Under extreme flow conditions, it is possible that a high flow bypass 240 created by the spaced distance 243 between edges 241 and 242 will be inadequate. Extreme flows may require a greater surface area of exposed lower netting 217 in order to pass the required amount of fluid without generating a system backup that may result in local flooding. As seen in FIG. 35, spaced distance 243 is adjustable such that catch basin filtration systems that may be exposed to extreme flow conditions can accommodate such a flow. Spaced distance 243 is adjusted by raising or lowering upper edge 241 of filter body 220 with respect to support basket 210, whereby the capacity of the high flow bypass is then altered. As should be readily apparent, any increase in the capacity of the high flow bypass will decrease the capacity of filtered flow, while a decrease in the high flow bypass capacity will conversely increase the filtered flow capacity.

Figure 36:
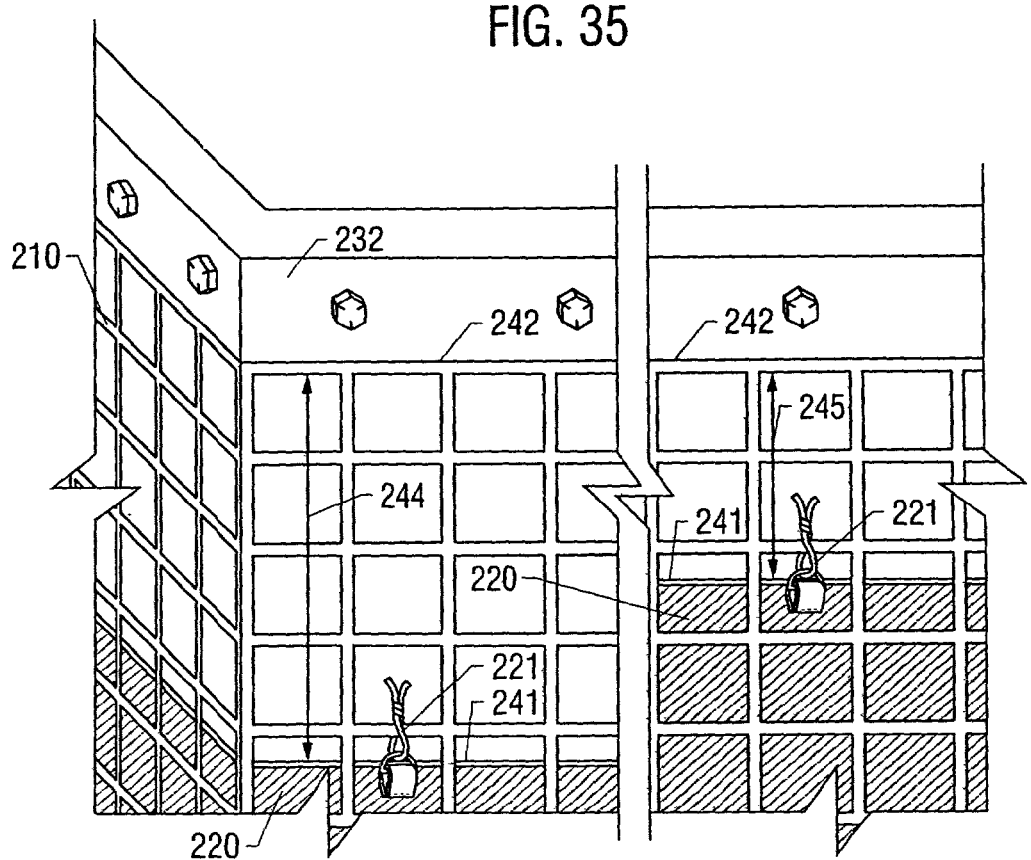
FIG. 36 is another partial side view illustrating various settings for the adjustable high flow bypass.

As illustrated in FIG. 36, upper edge 241 may be lowered to create a large spaced distance 244 if extreme or excessively high flows are anticipated or need to be averted at all costs. Conversely, upper edge 241 may be raised to create a standard or shortened spaced distance 245 if extreme flows are not a local issue and maximum filtered flow is desired at the expense of high flow bypass capacity. Similar connection means may be used to connect the filter body to the support basket, for example connecting tabs 221, regardless of the level at which the upper edge of the filter body attaches to the support basket. A high, low or standard initial level for upper edge 241 with respect to lower edge 242 can be set, and this level may then be readily altered in order to adjust the high flow bypass as necessary. If adjustment is desired, connecting tabs 221 are preferably cut off and discarded, and new ones are then used to reattach the filter body at a new position on the support basket.

Figure 37:
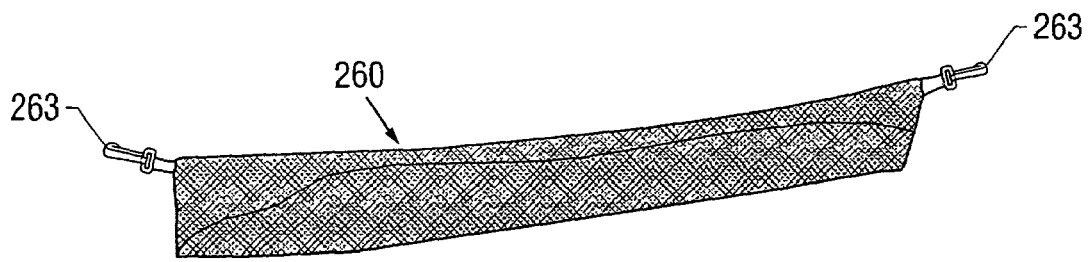
FIG. 37 is a perspective view of a removably suspendable adsorbent boom.

Referring to FIG. 37, a single adsorbent boom 260 is illustrated. Boom 260 preferably resides within filter body 220 and comprises an adsorbent container that is substantially similar to container 27 as described in a foregoing embodiment. As indicated, it is desirable that adsorbent containers such as boom 260 or container 27 float or become otherwise displaced when the filter body fills with fluid. Silt, sediment and debris tend to settle and build up on the floor of the filter body or on any other static surface within the filter body or reservoir. Adsorbent containers that remain static and in place tend to accumulate silt and sediment rather quickly, such that these containers then lose their effectiveness as a filtering agent and must be maintained more often.

Boom 260 is advantageously removably attached to and suspended from one or more inner walls of filter body 220 by clips 263 or other appropriate attachment means. In a particularly preferred embodiment, loops or "D-rings" identical or similar to those used to connect the filter body to the support basket are used. These D-rings are preferably sewn onto the inner walls of the filter body at an anchoring location between the filter body floor and upper edge. This anchoring location preferably occurs at a wall to wall corner of the filter body, and preferably allows boom 260 to rest against the floor and/or one or more walls of the filter body during periods of little or no flow. In addition, this anchoring location is ideally positioned such that boom 260 will float at or near the fluid surface as the filter body fills with fluid, but such that boom 260 can never rise above upper edge 241, so as not to impede the high flow bypass during periods of high flow. Alternatively, boom 260 will at least rise or depart some distance from the floor and/or walls of the filter body even if not at the fluid surface.

As the boom floats or otherwise moves away from the floor and/or walls of the filter body, silt and sediment pass by and settle at the bottom of the filter body. In addition, the movement of the boom as it floats or otherwise moves or shifts facilitates the rinsing away of any silt buildup that may have accumulated on the boom during periods of light flow. In this manner, silt and sediment accumulate on the floor of the filter body rather than on the boom, such that the boom remains an effective filtering agent for a longer period of time. Boom 260 is preferably clipped into place via clips 263 at each end of the boom, which attach to D-rings attached to nylon loops sewn onto the filter body walls, or attached by other appropriate means such that it is readily removable for purposes of system maintenance. Boom 260 is readily removed from the filtration system during maintenance, and is then either discarded or cleaned for further use.

Figure 38:
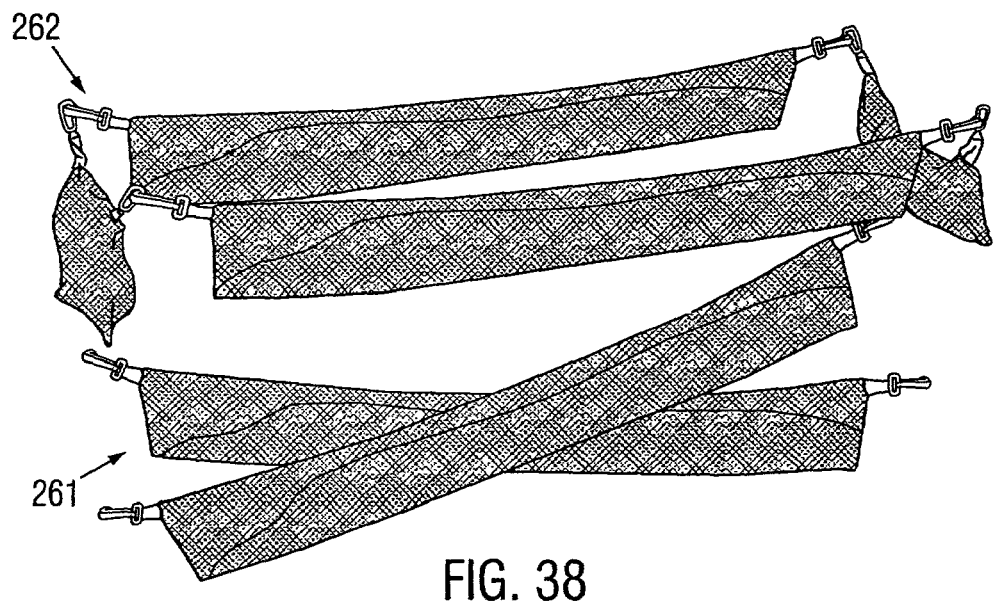
FIG. 38 is a perspective view of two separate configurations comprising multiple adsorbent booms of FIG. 37.

Booms can be very effective in providing additional filtration of oils and other chemical compounds, and are preferably installed in strategic configurations in order to maximize their exposure to storm runoff or other processed fluid. Examples of two such configurations are illustrated in FIG. 38. First configuration 261 comprises a pair of booms in an X formation. This pair of booms preferably rests at the floor of the filter body such that a substantial amount of passing fluid will be exposed to either or both booms before passing through the filter body floor. Both booms are clipped at each end to D-rings attached at diagonally opposed wall-to-wall corners of the filter body such that these booms are effectively suspended within the filter body while also being at rest on the filter body floor. As indicated, these suspended booms will rise or float as the filter body fills with fluid, such that silt and sedimentation wash off and do not accumulate on these booms.

Second configuration 262 comprises one boom situated along each wall of the filter body. For this particular filter body this results in 4 booms, which are suspendably clipped at each end to adjacent wall-to-wall corners such that each boom rests against a filter body wall. Each boom may also rest against the filter body floor and, as in the configuration above, each suspended boom will rise or float as the filter body fills with fluid. While configuration 261 tends to expose its booms to fluid before the fluid passes through the filter body floor, configuration 262 is designed such that fluid becomes exposed to its booms before the fluid passes through the walls of the filter body. Although not all fluid passing through the filtration system will become exposed to one or more booms in this manner, the oils and chemicals that these booms primarily target tend to float. These configurations of booms then have been found to be extremely effective in removing the bulk of oils and chemicals from storm runoff or other fluid flows. Other configurations of booms are also contemplated, and other such configurations that may be advantageous should be readily apparent to one skilled in the art.

As indicated, it is also desirable to retain large objects or other floatable types of debris, for example cigarette butts, while the high flow bypass is in use. By definition, a high flow bypass permits excess fluid to pass through the system without being filtered during periods of high flow. Although this outcome is generally acceptable when compared to the alternative of backed up drain inlets, many filtration systems are unable to effectively restrain even large objects when their high flow bypass is in use.

Figure 39:
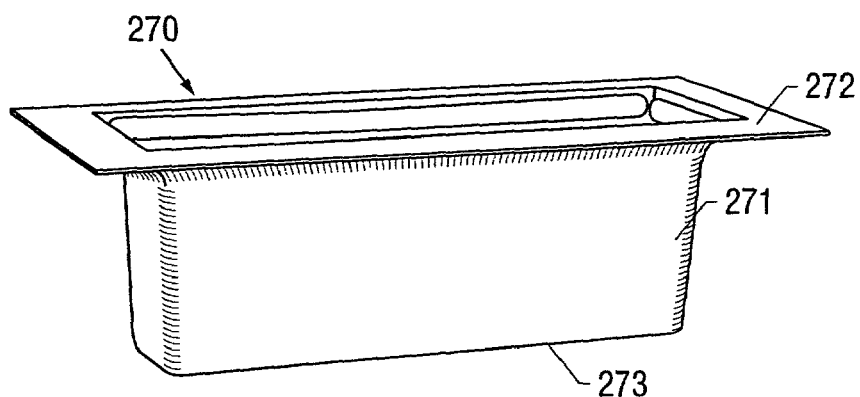
FIG. 39 is a perspective view of a removable debris trap.

Referring to FIG. 39, a removable debris trap capable of restraining large objects and other floatables is illustrated. Removable debris trap 270 is constructed such that it can withstand the banging and poking that may result from large objects entering the drain inlet, for example garbage or small tree branches. This debris trap is thus preferably fabricated from steel, hard plastic, fiberglass, or a wide variety of suitably rigid materials. Debris trap 270 comprises walls 271 that extend substantially into the reservoir of the filtration system. Walls 271 preferably extend to a depth beyond the lowest possible or practical fluid level for a large high flow bypass setting. Since the primary function of the debris trap is to restrain large objects and floatables, it is preferable that the water level of the system be above lower edge 273 of the debris trap whenever the high flow bypass is in use. Particularly deep walls are not necessary, such that the wall length of the debris trap may vary in order to account for especially high or especially low capacity settings for the high capacity bypass.

Outer flange 272 of debris trap 270 is adapted to rest atop an inner support surface of the frame with little or no attachment means, such that the debris trap is readily removable for, among other reasons, improved accessibility of the rest of the system during maintenance. Minimal attachment means such as snaps or velcro may be used, if desired. Typically, a drain inlet grate will rest on top or just above the debris trap such that the debris trap is generally held or kept in place. In addition, because debris trap 270 generally rests loosely atop the inner support surface, the debris trap is displaceable and can rise as sediment and debris build up within the filter body. Should excessive amounts of sediment or debris accumulate within the filter body within a short period of time or, alternatively, should the filtration system not be maintained for a sustained period, built up sediment and debris will eventually push up against the lower edge 273 of debris trap 270. This feature prevents the filtration system from causing backups and flooding should inordinate amounts of silt and sedimentation build up and block most or all of the filter body from filtering fluid.

As periods of high fluid flow come and go, it becomes possible for large objects and floatables to go below the lower edge of 273 of the debris trap as the water level recedes, and then rise again outside the debris trap walls 271 during future periods of high flow. Additional means may be used to redirect fluid flows such that these large objects and floatables do not tend to pass through the large netting holes comprising the high flow bypass at a later period of high flow.

Figure 40:
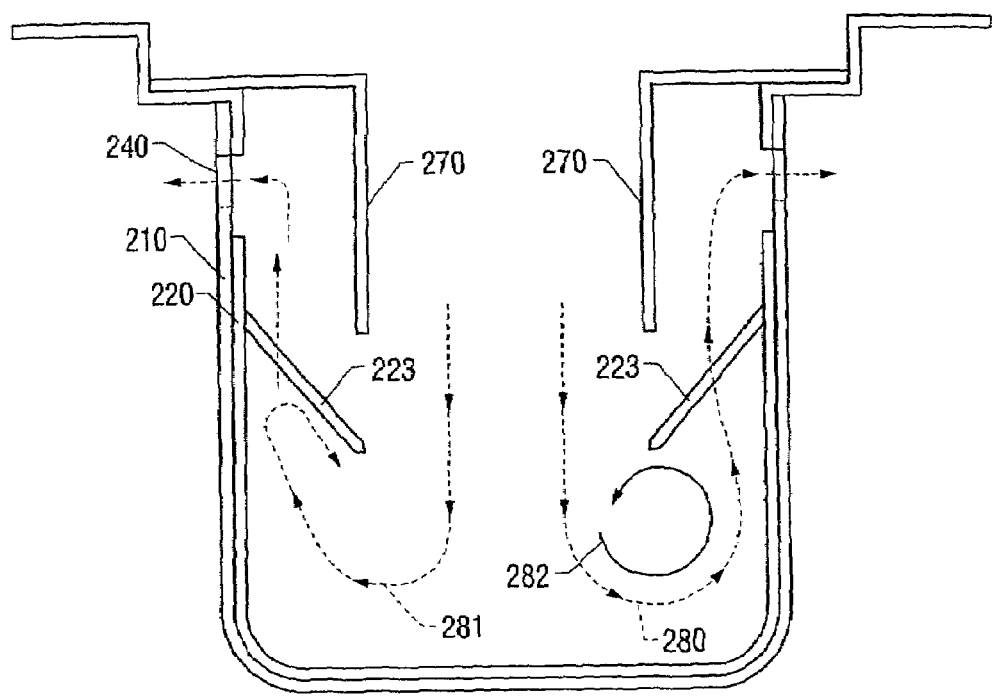
FIG. 40 is a side cross-sectional view of an assembled and operational preferred embodiment of the present invention.

Referring to FIG. 40, a cross-sectional view of an entire filtration system according to a preferred embodiment is illustrated. One or more baffles 223 are created in the filter body at strategic locations such that fluid flow is redirected away from the walls of the filter body at these locations. In a particularly preferred embodiment, one baffle is positioned part way up the interior wall of the filter body and extends completely around all inner walls of the filter body. This baffle can be continuous or can also be in segments that may or may not be connected to each other at the ends. Baffle 223 preferably angles downward from the filter body wall such that it generally redirects flows climbing the filter body wall back toward the center of the support basket floor. The general flow pattern 280 of this system has incoming fluid passing down and through the debris trap toward the floor of the filter body, then away toward the walls of the filter body and up the filter body walls toward the high flow bypass. With baffle 223 in place, the redirected flow 281 is forced away from the filter body wall, around the baffle, back toward the filter body wall, and then up toward and out the high flow bypass. While the passing fluid is generally capable of traversing this route, large objects and floatables are usually unable to do so. Such debris typically flows in a generally circular pattern 282 below the baffle level rather than traversing and rising up and over the baffle.

Figure 41:
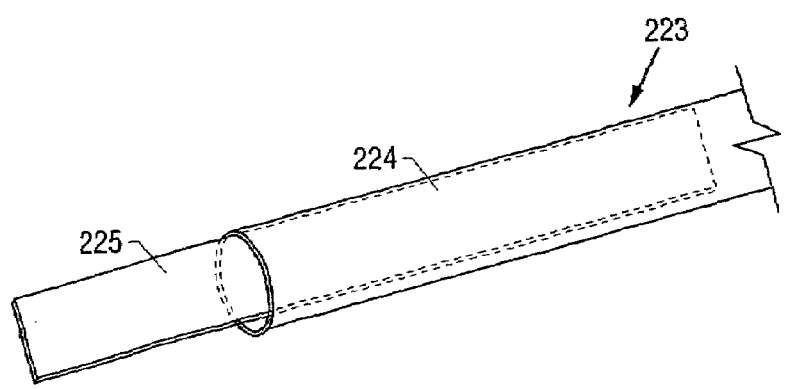
FIG. 41 is a partial perspective view of a baffle and filter body wall combination.

Referring to FIG. 41, the baffle or baffle sleeve 224 may be formed in a variety of ways, as may be readily appreciated. In one embodiment, baffle 223 is made from a baffle sleeve 224 comprising the same or similar material of the filter body, which is then sewn onto the filter body wall. In a particularly preferred embodiment, baffle sleeve 224 is formed by folding the filter body wall onto itself during the construction of the filter body. Stitches, staples or other appropriate means may then be used to keep baffle sleeve 224 in place. A long piece of plastic or other stiffener 225 is preferably inserted into baffle sleeve 224 in order to create a baffle with an appropriate level of positioning stiffness. Baffle 223 preferably extends around the entire circumference of an inner wall of the filter body, and is typically broken into segments such that one segment attaches to each wall of the filter body. As with the walls of the filter body, these baffle segments are attached at the corners via stitching, staples, or other appropriate attachment means. An added benefit is that baffle 223 provides additional stiffness to the filter body in general, such that the filter body is better able to retain its shape even during periods of low or no fluid flow.

Another particularly preferred embodiment of the present invention also accommodates increased fluid flow, maintains the shape of the reservoir during periods of high fluid flow, employs a readily adjustable supporting structure and provides a means to retain floatables while the high flow bypass is in use. In addition, this embodiment also employs a separate and distinct secondary high flow bypass, which provides increased system reliability against potential clogging and localized flooding under a variety of conditions and circumstances.

Figure 42:
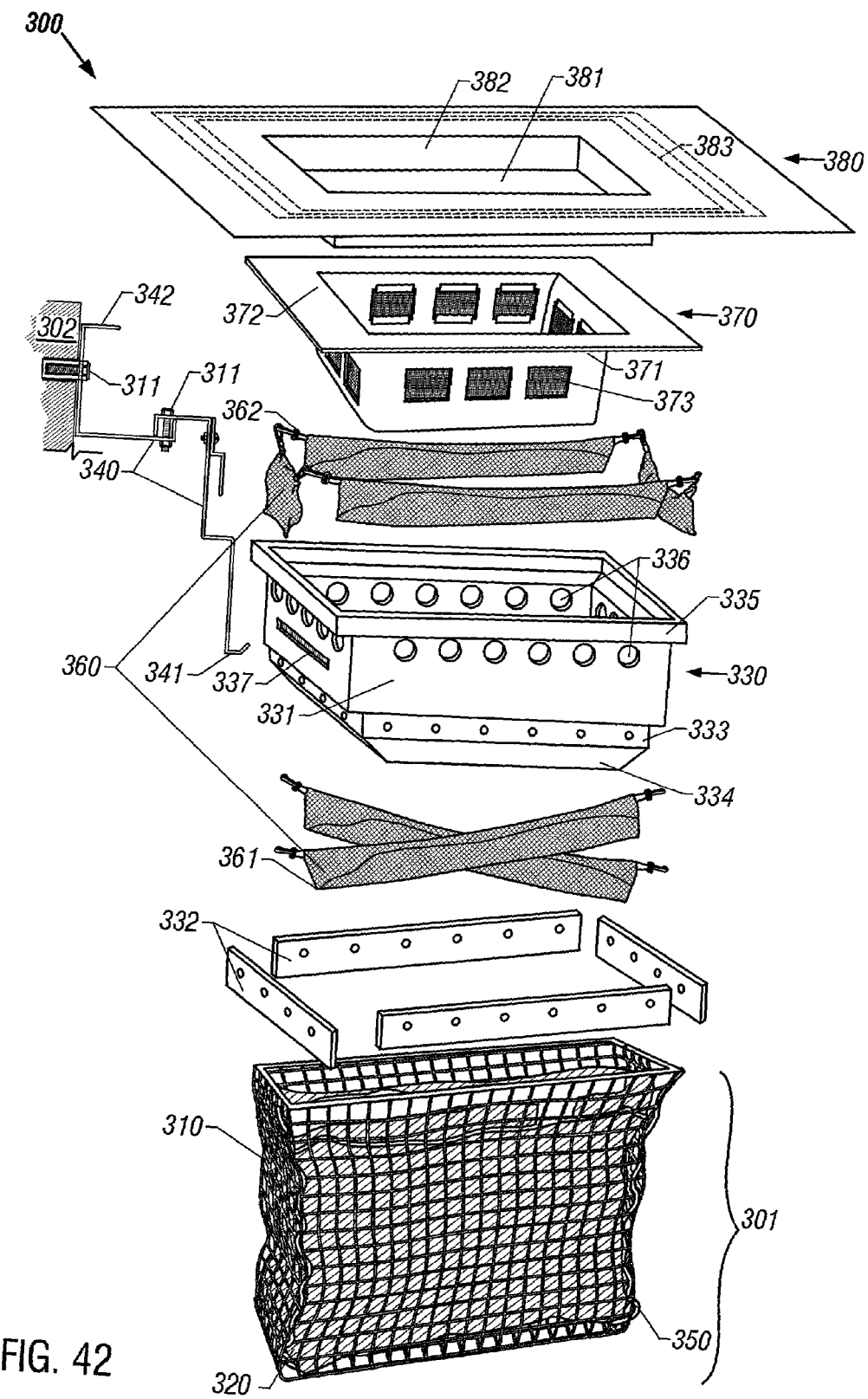
FIG. 42 is a partially exploded perspective view of another preferred high capacity embodiment of the present invention.
Figure 43:
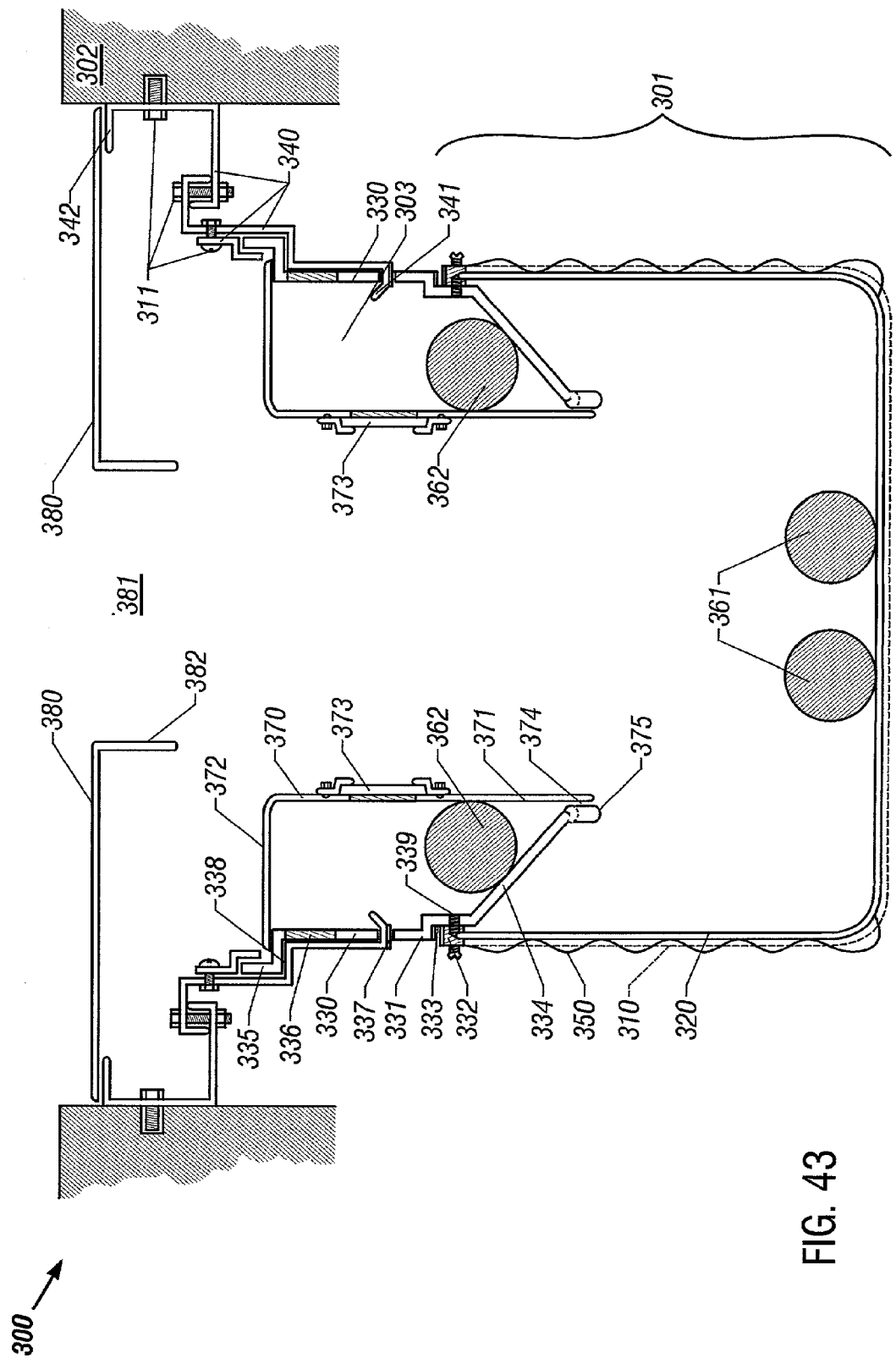
FIG. 43 is a side cross-sectional view of an assembled version of the preferred high capacity embodiment shown in FIG. 42

Referring to FIGS. 42 and 43, a high capacity catch basin filtration system according to another primary preferred embodiment of the present invention is illustrated. FIG. 42 shows high capacity filtration system 300 in a partially exploded perspective view, while FIG. 43 gives a side cross-sectional view of an assembled version of the same preferred high capacity embodiment shown in FIG. 42. Although a four-walled generally rectangular or box-shaped filtration system is depicted, other systems having a different number of walls or shapes, including generally circular or oval shapes, are also contemplated. High capacity filtration system 300 generally forms a reservoir 301 comprising a filter body 320 at its bottom for collecting and filtering fluid flow or storm water runoff. Upper body 330 comprises a portion of the filter body support, is open to accommodate fluid flow at opposing ends and comprises one or more walls 331 around its circumference. Upper body 330 is preferably made from any hard or rigid material, such as metal, hard plastic or fiberglass for example, and is preferably integrally formed or alternatively welded or otherwise fused at its wall-to-wall corners. Because upper body 330 is preferably formed from a hard or rigid material, this embodiment can be referred to as a "hard body" embodiment for ease of reference.

Again referring to FIGS. 42 and 43, filter body 320 generally forms the walls and floor of reservoir 301, and is substantially similar to filter body 220 of the foregoing soft body embodiment. Filter body 320 is supported by and suspends from upper body 330 either alone or in conjunction with an optional support basket 310, which is substantially similar to support basket 210 of the foregoing soft body embodiment. Should optional support basket 310 be used, filter body 320 preferably lines the walls and floors of the support basket such that the support basket provides added support to the walls and floor of the filter body. Both filter body 320 and optional support basket 310, if used, are attached directly to upper body walls 331 by one or more attaching strips 332. One or more upper body walls 331 preferably contain a recess 333 along a lower wall portion to facilitate attachment of the filter body and optional support basket to the upper body. One or more baffles 334 extend downward and inward from the bottom edge of upper body 330, and are preferably integrally formed with the rest of the upper body. In addition to upper body 330 and optional support basket 310, support cables 350 may also comprise a portion of the filter body support. Support cables 350 are substantially similar to support cables 250 of the foregoing soft body embodiment, and connect to a lower portion of upper body 330.

Adsorbent containers or booms 360 are substantially similar to booms 260 of the foregoing soft body embodiment, and are similarly removably attached in various formations and in a variety of strategic locations. As shown in the preferred embodiment illustrated in FIGS. 42 and 43, a first pair of adsorbent booms 361 are suspended from the internal walls of filter body 320 such that they traverse the floor of the filter body to form an X shape. One or more separate sets of four adsorbent booms 362 are suspended from and along either the internal walls of filter body 320 and/or, alternatively, from the internal walls of upper body 330. Removable debris trap 370 is similar to debris trap 270 of the foregoing soft body embodiment in that it similarly comprises walls 371 such that large objects and floatables are retained within the debris trap during periods of high fluid flow. An upper edge 335 of upper body 330 is adapted to support flange 372 of removable debris trap 370, which rests loosely atop the upper body such that the entire debris trap is readily removable from the rest of filtration system. Baffles 334 of upper body 330 preferably extend to meet debris trap walls 371 such that cavity 303 is loosely formed between upper body walls 331, baffles 334, debris trap walls 371 and debris trap flange 372. Removable screens 373 are situated within debris trap walls 371 and comprise a portion of an initial high flow bypass capable of filtering fluid during periods of high fluid flow. One or more bypass holes 336 formed in upper body 330 comprise another portion of this initial high flow bypass, as excess fluid passes through the removable screens, collects in the cavity formed between the upper body, baffles and debris trap, and passes through the bypass holes. Should the initial high flow bypass be insufficient or fail, the entire high capacity filtration system 300 is sufficiently lowered within the inlet or catch basin such that an ultimate or secondary high flow bypass is formed around the top of upper body 330 and removable debris trap 370.

One or more sets of adjustable support brackets 340 also comprise a portion of the filter body support, as these support brackets support the load of the entire high capacity filtration system 300. Adjustable support brackets 340 connect to inner catch basin wall 302 (typically concrete) and to each other via bolts or screws 311, and ultimately end in upturned edges 341 that hook into one or more slots 337 formed in one or more upper body walls 331. These adjustable support brackets are adapted to permit both vertical and horizontal repositioning of the entire filtration system as desired. Although only one set of adjustable support brackets is illustrated in FIG. 42, sets of these support brackets preferably come in pairs that are bolted to opposing catch basin walls and are hooked into slots in opposing upper body walls, as depicted in FIG. 43.

Adjustable deflector ring 380 rests against upper support surface 342 of one or more support brackets 340 such that the deflector ring is positioned between the drain inlet and the tops of upper body 330 and removable debris trap 370. Adjustable deflector ring 380 comprises a center hole 381 with descending flanges 382 dimensioned and situated such that all incoming fluid is directed through debris trap 370 and into the filtration system. A series of grooves 383 facilitates the custom resizing of the deflector ring such that the adjusted deflector ring substantially extends to all inner walls of the catch basin. Adjustable deflector ring 380 is positioned a sufficient distance above upper body 330 and debris trap 370 such that operation of the secondary bypass beneath the deflector ring is unimpeded. Because customizations and adjustments to this hard body embodiment are primarily made via the support brackets and deflector ring, as discussed in more detail below, it is not necessary for many parts of this system to come in a wide variety of shapes and sizes. Accordingly, the debris trap, upper body, adsorbent booms, attaching strips, filter body and support basket may all come in one standardized size and configuration that is capable of fitting a wide variety of catch basins.

Many aspects of filtration system elements such as support basket 310, filter body 320, support cables 350 and adsorbent booms 360 may be identical or substantially similar to the analogous elements that have already been described in the foregoing soft body embodiment. For example, optional support basket 310 contains a plurality of large holes for passing fluid and is preferably made of geogrid or other suitably strong netting. One important distinction to note is that this hard body embodiment does not comprise a high flow bypass through optional support basket 310 or directly above the upper edge of filter body 320. Debris trap 370 is also similar in basic nature to its soft body embodiment counterpart, although debris trap 370 has been substantially altered through the addition of removable screens in its walls as described below. Accordingly, the functionality, materials and formation methods of these and other filtration system elements are substantially similar to their foregoing analogous counterparts unless stated otherwise in the following detailed descriptions.

Figure 44:
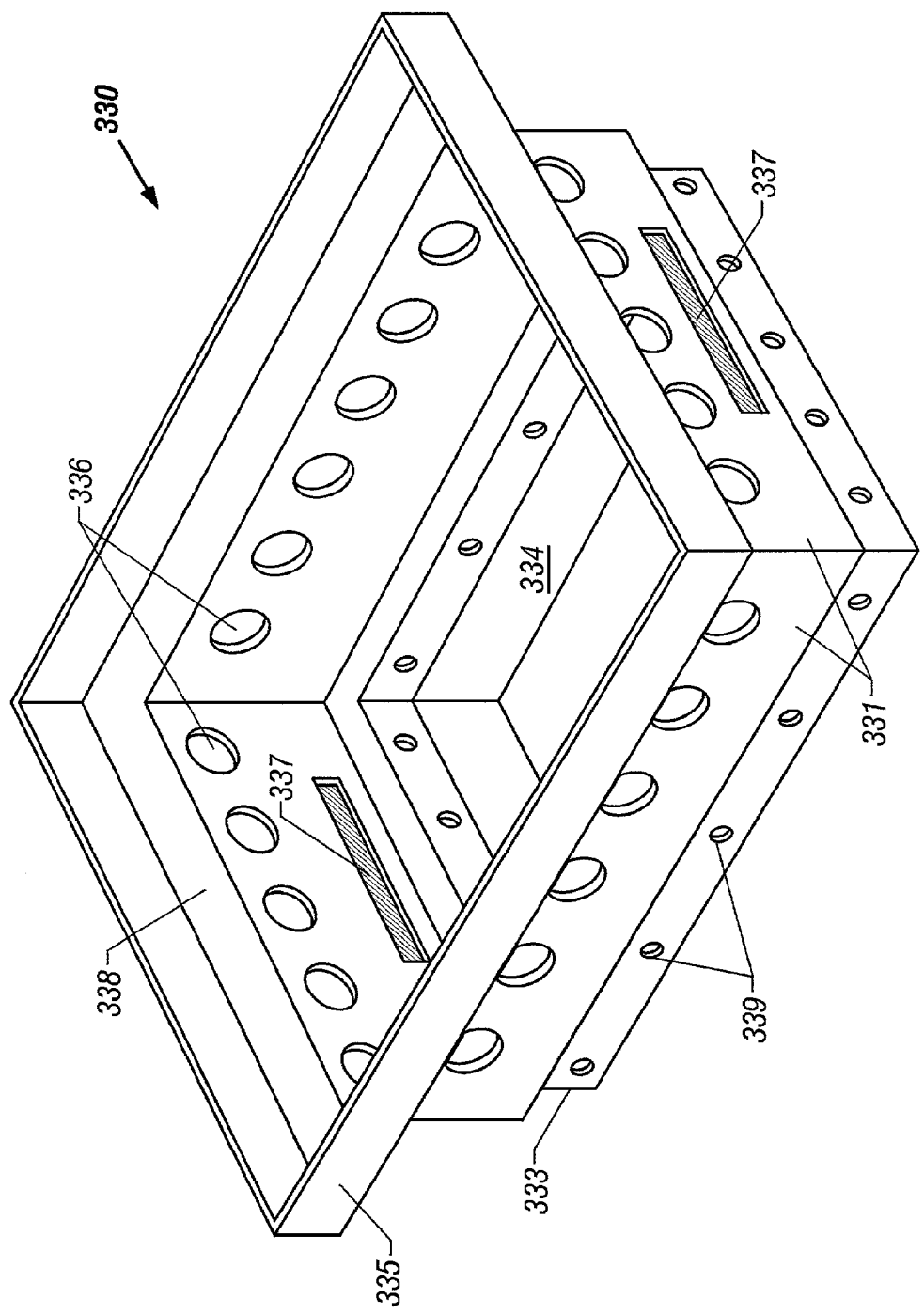
FIG. 44 is a perspective view of a preferred embodiment of the upper body illustrated in FIGS. 42 and 43.

Upper body 330 is positioned and adapted, and is preferably open at its top and bottom, to operate in conjunction with debris trap 370 to deliver fluid into reservoir 301. Referring to FIG. 44, a particularly preferred embodiment of upper body 330 of the hard body high capacity filtration system depicted in FIGS. 42 and 43 is shown in perspective view. A support ledge 338 is formed along at least a portion of upper edge 335 of upper body 330 to support debris trap flange 372, and this support ledge preferably traverses the entire circumference of upper edge 335. Outer support flanges for the upper body are not necessary, since the upper body is supported by one or more support brackets that hook into one or more slots 337 in the upper body. Slots 337 comprise elongated horizontal openings formed through one or more walls 331 of upper body 330, and are adapted to receive the hooked or upturned edge of a support bracket therethrough. Slots 337 are preferably dimensioned such that fluid escape through any portion of the slots not filled by the support brackets is minimized or eliminated. Further minimization or elimination of such fluid loss through these slots, through use of gaskets (not shown), caulks or other sealants, for example, may be readily understood by those skilled in the art. In any event, slots 337 are preferably located at a sufficient height within the filtration system such that fluid loss through these slots, if any, occurs at a point only slightly before operation of the initial high flow bypass takes effect.

Referring to FIGS. 43 and 44, bypass holes 336 comprise a portion of the initial high flow bypass. As fluid enters the system faster than it can be filtered through the floor and walls of the filter body, the fluid level in the system rises accordingly. As the fluid level rises, reservoir 301 can be said to include upper body 330 to the extent that the upper body does not pass fluid at its lower portion. Most excess fluid will eventually reach bypass holes 336 by first passing through removable screens 373 in debris trap 370 to enter cavity 303, although a relatively small amount of fluid may also rise up between baffle 334 and debris trap wall 372 to enter this cavity. Excess fluid that passes through bypass holes 336 has preferably been filtered through debris trap screens 373 and has been exposed to adsorbent booms 362 along upper body walls 331. Bypass holes 336 are formed in an upper portion of upper body walls 331, preferably at or above the level of slots 337. These bypass holes may be formed in each upper body wall or on alternating walls, and are sized and replicated as desired for appropriate high flow bypass needs.

Recess 333 is formed at a lower portion of upper body walls 331 to facilitate in the attachment of filter body 320 and optional support basket 310. This recess preferably traverses the entire circumference of the upper body such that the upper edges of the filter body and optional support basket may be more conveniently attached against the upper body. Attaching strips 332 facilitate this attachment, and preferably firmly clamp and substantially seal the filter body to the upper body such that unprocessed fluid is unable to escape the filtration system at this junction. Attaching strips 332 preferably comprise metal, plastic or hard rubber bars, and may comprise multiple sections as desired or may alternatively comprise a single strip or ring either integrally formed or assembled as would be readily apparent to one skilled in the art. Holes 339 in recess 333 may be preformed to accommodate bolts, screws, rivets, or other like fasteners to aid attaching strips 332 in attaching the filter body to upper body 330. As in the foregoing slots 337, minimization or elimination of fluid loss through this junction may be made through use of gaskets (not shown), caulks or other sealants, for example, which will be readily understood by those skilled in the art.

One or more baffles 334 extend downward and inward from the bottom of recess 333 at the bottom edges of upper body walls 331. These baffles extend toward the center of the filtration system and redirect fluid flow similarly to baffles 223 of the foregoing soft body embodiment. Baffles 334, however, are preferably integrally formed with the rest of the upper body such that they are "built-in" to the upper body and do not require a sleeve or other encumbrances as in the foregoing soft body embodiment. As with recess 333, upper edge 335 and support ledge 338, baffle 334 preferably comprises a single integrated baffle that traverses the entire circumference of upper body 330 at its lower edge. The bottom edge of baffle 334 preferably extends but does not connect to debris trap walls 371, and gap 374 between these elements is minimized such that fluid flow between the bottom edge of the baffle and the debris trap is minimized or eliminated. Baffle 334 remains unattached or, alternatively, loosely attached to debris trap walls 371 such that the debris trap may be readily removed from the system. The bottom edges of debris trap walls 371 are preferably located at roughly the same level as the bottom edge of baffle 334, and one or more gaskets or flaps 375 may attach to the bottom edge of either component to assist in closing off gap 374 and minimizing fluid flow therethough.

In a particularly preferred standardized embodiment, upper body 330 is comprised of one-quarter inch thick hard molded plastic and is generally rectangular in shape, measuring eighteen by thirty inches around its outer diameter and twelve inches in height from upper edge 335 to the bottom of flange 338. Two slots 337 for accommodating support brackets are formed in the upper body walls 331, one at each eighteen-inch wide end wall. Each slot extends through its wall and is preferably fourteen inches long by one-quarter inch tall. Bypass holes 336 are two and one-half inches in diameter and are spaced five inches apart around the circumference of upper body walls 331. Baffle 334 extends inward at a 45-degree angle with respect to upper body walls 331 and has a height of four inches, leaving eight inches of height for the remainder of the upper body. This standardized embodiment can be used in a variety of inlets or catch basins, as adjustments may be made to adjustable support brackets 340 in most cases. Although dimensions have been given for a particularly preferred standardized embodiment, numerous other variations and dimensions can be discerned from the foregoing, such that the given dimensions in no way limit the scope of the present invention.

In a simplified alternative embodiment, upper body 330 may be combined with support basket 310 to form a simplified filtration system that is easier and less costly to manufacture and ship. Such a combination could be made from a sufficiently firm material that also permits the passage of fluid, for example a stainless steel mesh, such that support cables 350 would not be necessary. This firm material, hereinafter a stainless steel mesh for purposes of this description, could be made to form the floor and one or more walls of the filtration system. Although all shapes are contemplated for this embodiment of the filtration system, one particular example comprises a square or rectangular floor panel and four wall panels of stainless steel mesh, such that a box shaped filtration system could be formed. One side of each wall could be attached to one side of the floor via connectors such as hinges, snaps, screws, rivets, buttons, tabs, hooks, clamps, loops or the like, and would be preferably attached such that the wall is hinged to the floor. In this manner, each wall is attached to the floor and can be positioned substantially upright relative to the floor to form a basket capable of filtering fluid, but can also be folded substantially flat on top of the floor for shipping purposes. Each wall can be set into a substantially upright position by affixing an upper portion of the wall to an upper frame or support ring at or near the point of installation of the filtration system. Although stainless steel mesh is used here for purposes of discussion, it is contemplated that any other sufficiently firm material capable of passing fluid can also be used to form the walls and floor of the basket in this simplified alternative embodiment.

Figure 51A:
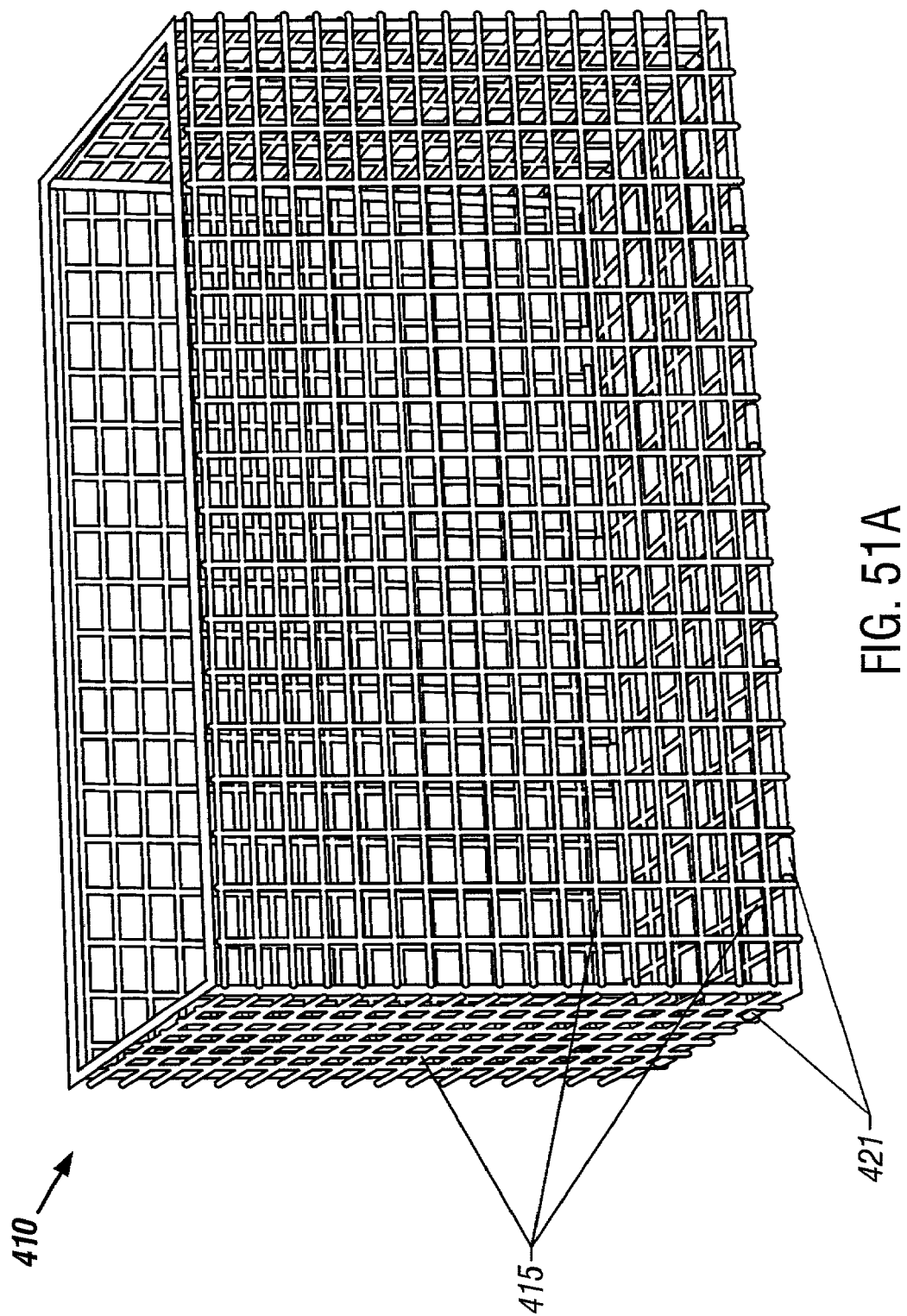
FIGS. 51a through 51c are perspective views of simplified alternative embodiments for various aspects of the filtration system.

Filter body 320 would be optional in this simplified alternative embodiment, as a user may only desire filtration at the rougher level provided by the stainless steel mesh, which may be comprised of any one of a variety of mesh grades for differing filtration levels. Of course, if filter body 320 is selected, then it could be attached to the walls of the basket such that an initial high flow bypass would be formed above its upper edge and through the stainless steel mesh, similar to that described in the soft-bodied embodiment above. Bypass holes 336 at the top of this combined alternative embodiment would also be optional, as the actual mesh grade of the stainless steel mesh may be all that is needed for an initial high flow bypass. Other items such as baffles and adsorbent containers are also optional and may be incorporated into this embodiment as well. An example of this simplified alternative embodiment is illustrated in FIG. 51*a*, wherein stainless steel mesh panels 415 comprise the walls and floor of basket 410, and metal clips 421 connect and hinge the wall panels to the floor panel. Although the optional filter body is not shown here, it is understood to be similar to that which is shown in FIGS. 26 and 42.

Figure 45:
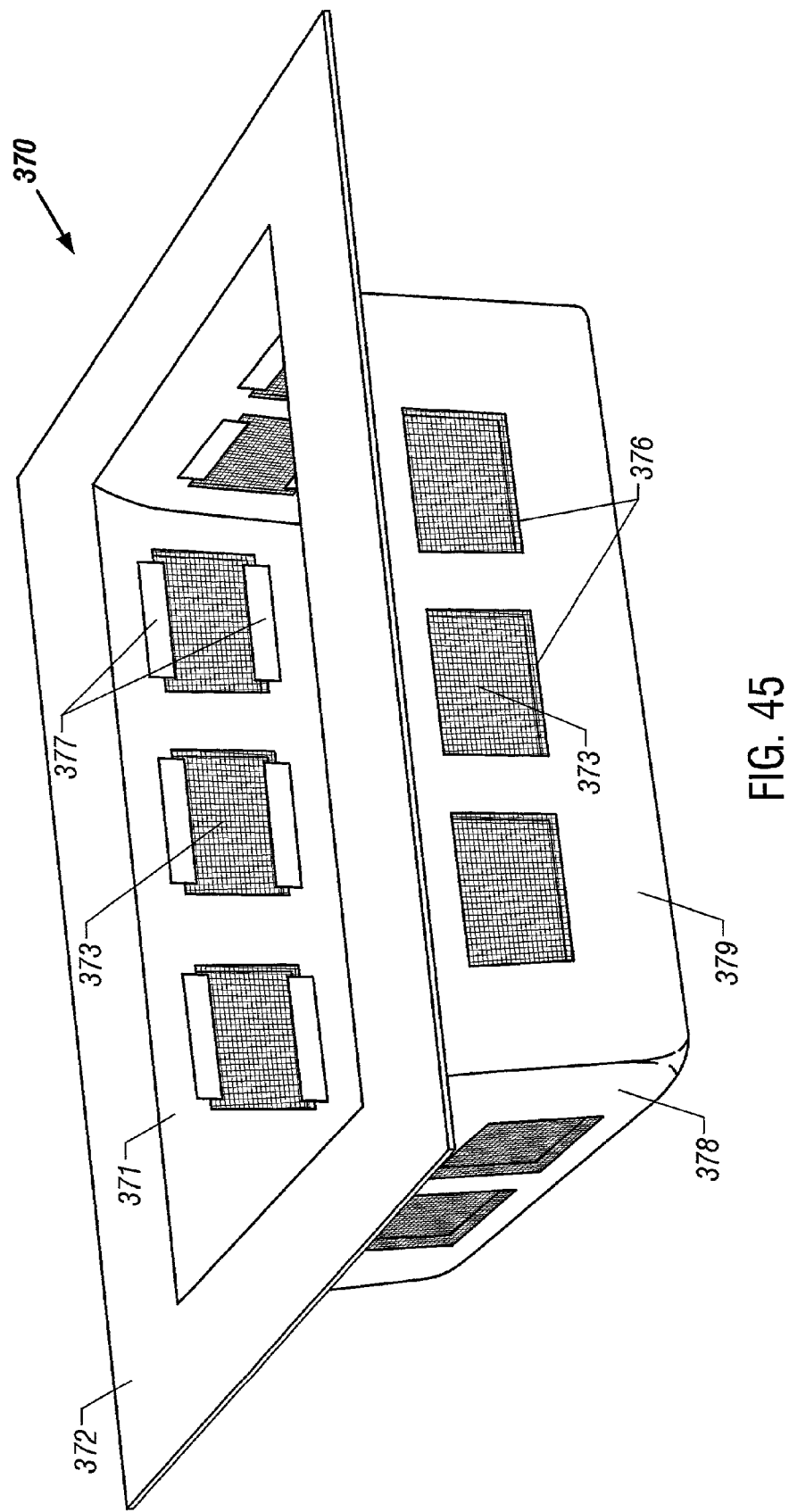
FIG. 45 is a perspective view of the removable debris trap illustrated in FIGS. 42 and 43.

Referring back to the primary embodiment and now referencing FIG. 45, a particularly preferred embodiment of removable debris trap 370 is illustrated. Removable debris trap 370 may optionally comprise handles (not shown) attached or built into its flange or walls to facilitate removal of the debris trap from the filtration system. In operation, the debris trap acts in concert with the upper body baffle or baffles to direct fluid flows and restrain floatables and other large debris. Once floatables or large debris enter the filtration system through the top of the debris trap, these items are held within the system and are not permitted to exit via the initial high flow bypass. These collect in the debris trap and/or reservoir and can typically only exit the system through system maintenance or during operation of the secondary high flow bypass. Debris trap 370 comprises one or more windows 376 containing removable screens 373, which comprise a portion of the initial high flow bypass. During periods of high flow, excess fluid rises into the debris trap and removable screens 373 filter this excess fluid into the cavity formed between the debris trap, baffle and upper body. In this manner, some level of filtration is applied to fluid that passes through the initial high flow bypass of this embodiment.

Removable screens 373 may come in varying densities such that the filtration level through these screens can be set as coarse or as fine as desired, although a filtration level coarser than that of filter body 320 is preferred. A particularly preferred material for constructing these removable screens is a stiff open mesh of wire or injection molded plastic, such as the type manufactured by Howard Wire of Hayward, Calif., for example. Accordingly, fluid passing through this hard body embodiment can be filtered at two separate and distinct filtration levels during initial bypass mode: a primary relatively fine level through the filter body and a secondary relatively coarse level through the initial high flow bypass. In addition, while filter body 320 is a relatively permanent element of the filtration system and thus has a set level of filtration, screens 373 are readily removed and/or replaced such that the filtration level through these screens may be adjusted as needed. Should a particular locality have a problem with cigarette butts, for example, extremely coarse screens 373 can be inserted into debris trap windows 376 such that the capacity of the initial high flow bypass is maximized while cigarette butts are still restrained during initial bypass mode.

Screen brackets 377 are affixed to debris trap walls 371 at either an inside or outside location, and these screen brackets function to hold screens 373 firmly in place against windows 376 while still allowing the screens to be removed and cleaned and/or replaced. These screen brackets are preferably positioned and adapted such that screens are able to slide in and out of place with relative ease during insertion or removal, while the same screens are held firmly in place against debris trap windows during system operation. Screen brackets 377 may be screwed, riveted or bolted onto debris trap walls 371, or affixed by any other appropriate means. In a particularly preferred embodiment each window 376 is three inches high by four inches wide, and one to two windows are formed in each shortened end wall 378 of rectangular debris trap 370 while three to four windows are formed in each elongated side wall 379. Windows and screens may be added or enlarged, however, in order to increase the capacity of the initial high flow bypass as desired.

Figure 51B:
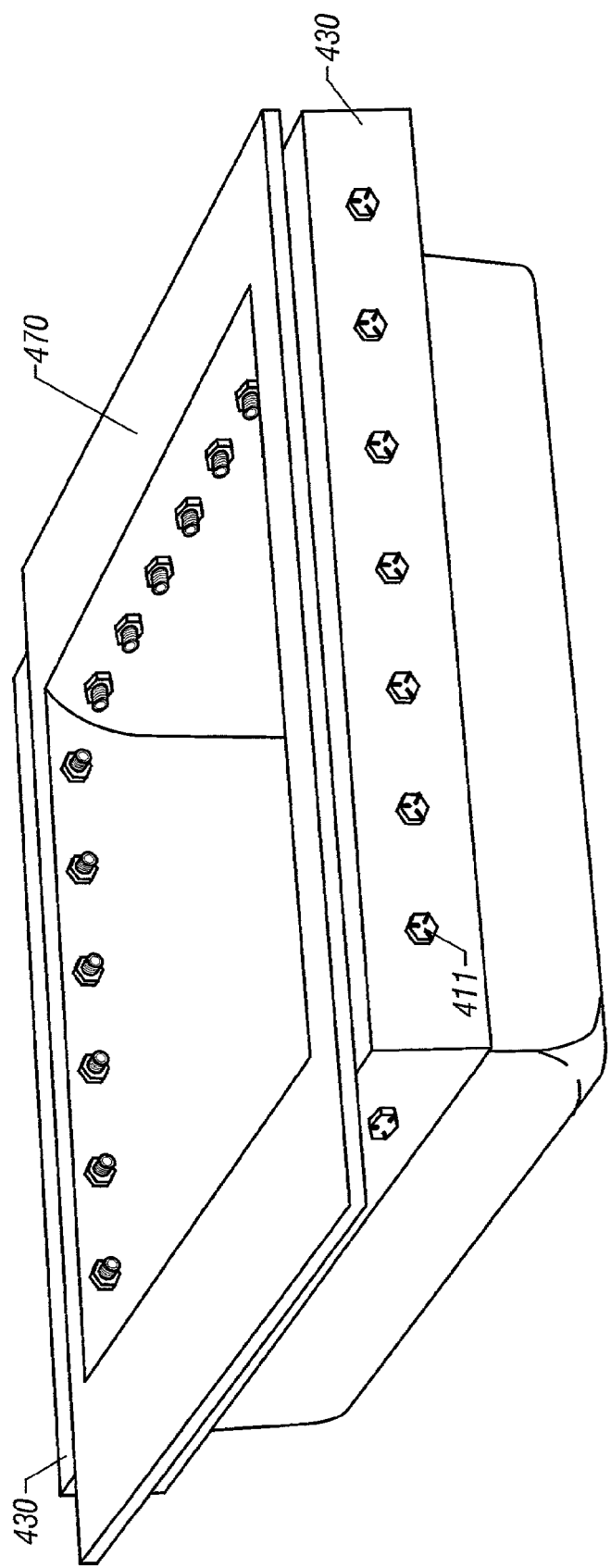

In a simplified alternative embodiment, debris trap 370 may be combined with an upper frame or support ring, such as that which is denoted as 230 or 232 in FIG. 26. Unlike the primary embodiment, this modified debris trap would not be removable, and would preferably be integrally formed with, welded to or otherwise permanently attached to an upper frame or support ring to form a one piece component. Windows 376 and removable screens 373 would be optional in this alternative debris trap, especially where they are not needed to create an initial high flow bypass, as this would again contribute toward a simplified filtration system that is easier and less costly to manufacture and ship. As previously noted, an upper portion of one or more walls of this simplified alternative embodiment could be attached to the upper frame or support ring. An example of this simplified alternative embodiment is illustrated in FIG. 51b, wherein the upper frame or support ring 430 is combined as one piece with modified debris trap 470. Although bolts 411 are shown as the means for attaching the upper portion of the walls to the support ring, any other comparable attaching means would also be suitable for this purpose.

Referring back to the primary embodiment and now referencing FIG. 44, an ultimate or secondary bypass 304 is created should the initial high flow bypass comprised primarily by screens 373 and bypass holes 336 either fail or prove to be insufficient. Secondary bypass 304 is formed above and around the outer circumference of upper body 330 and removable debris trap 370, and only becomes operational when the entire filtration system fills with fluid. At that point, excess fluid spills over upper edges 335 of upper body 330 and into the surrounding catch basin. Should the initial high flow bypass be insufficient or fail, the entire filtration system is sufficiently lowered within the inlet or catch basin such that large quantities of fluid can spill over the upper edges and flow between upper body 330 and deflector ring 380. In a particularly preferred embodiment, the cumulative cross-sectional area around the outer circumference of the upper body and between the upper body and deflector ring is greater than the open cross-sectional area of the grate or inlet to the catch basin. In this manner, the secondary high flow bypass should always be capable of passing any incoming fluid under any flow conditions, such that the filtration system under this hard body embodiment will typically not be responsible for any drainage backup or localized flooding of surrounding areas.

Figure 46:
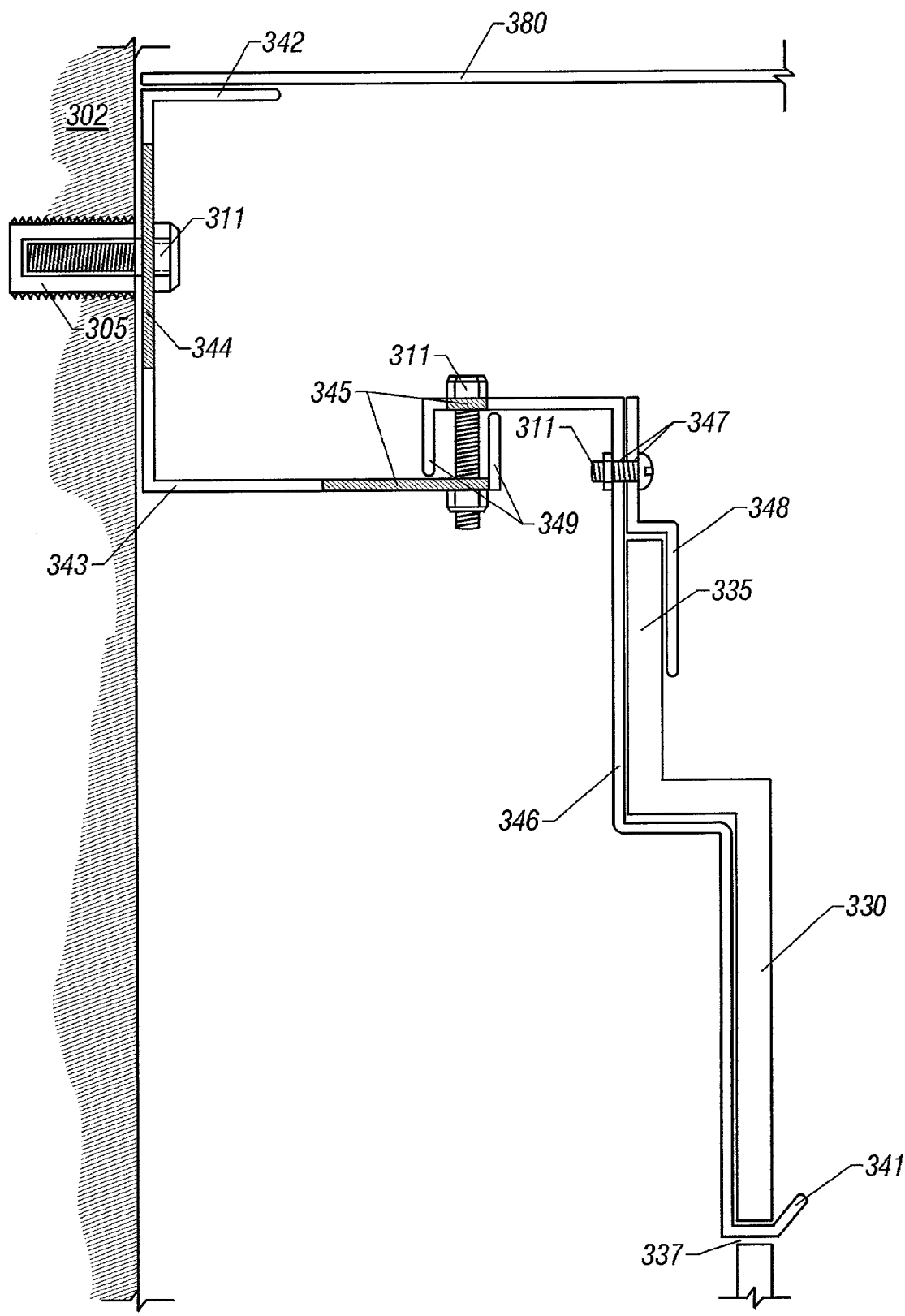
FIG. 46 is a side cross-sectional view of one assembled set of adjustable support brackets of FIGS. 42 and 43 illustrating the operation of the support brackets.

The entire filtration system is positioned within the catch basin via one or more sets of adjustable support brackets, which are illustrated in greater detail in FIGS. 46 through 49. Referring to FIG. 46, one assembled set of adjustable support brackets is shown in cross-sectional view attaching to a catch basin wall and supporting an upper body and deflector ring. These adjustable support brackets contain various elongated slots and holes for accommodating bolts, screws, rivets or other like attaching means, such that the entire filtration system can be optimally positioned within the catch basin both vertically and horizontally by shifting or sliding one or more support brackets. Wall support bracket 343 generally comprises an upper side containing upper support surface 342, a vertical side containing vertically elongated slots 344, and a lower side containing horizontally elongated slots 345. Filter body support bracket 346 generally comprises an upper side containing horizontally elongated slots 345, a vertical section generally conforming to the contour of upper body 330 and containing connecting holes 347, and upturned edge 341 at its distal end. Retainer clip 348 generally comprises an upper side containing connecting holes 347 and a lower side for keeping upper edge 335 of the upper body in place. Each of the wall support bracket, filter body support bracket and retainer clip is preferably the same length or depth, and in a particularly preferred embodiment these three elements are all formed from 12-gauge stainless steel and all have a length of thirteen and one-half inches.

Figure 47A:
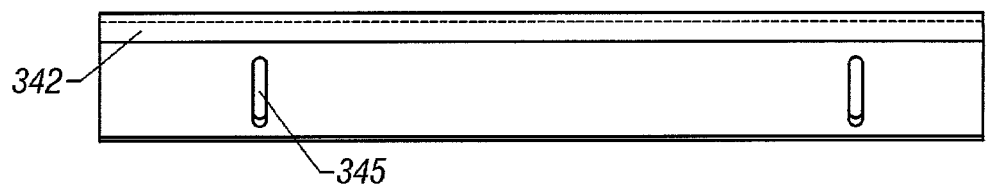
FIG. 47 is a set of top, front, and side views of the wall support bracket illustrated in FIG. 46.
Figure 47B:
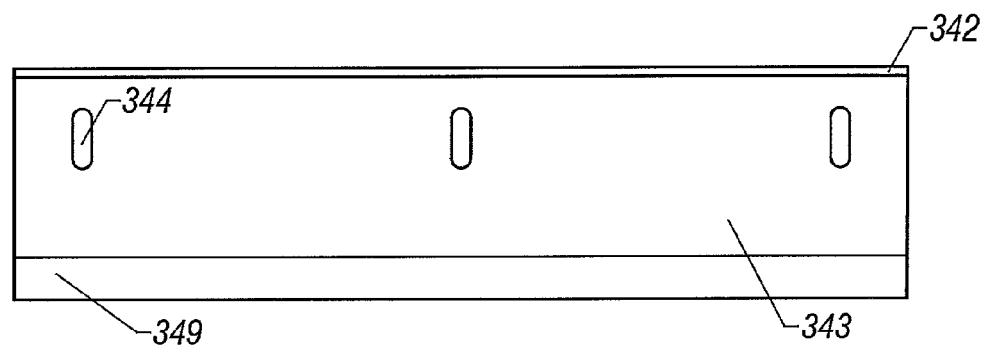
Figure 47C:
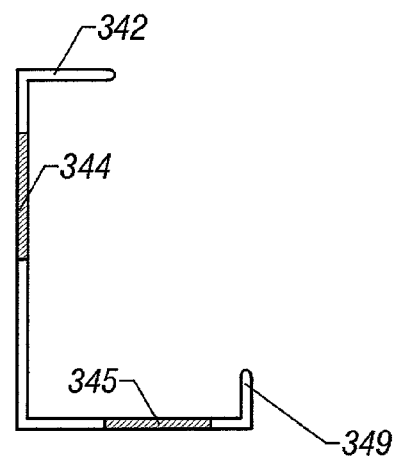

Wall support bracket 343 is illustrated in greater detail by the top, front, and side views shown in FIG. 47. Referring to FIGS. 46 and 47, wall support bracket 343 comprises upper support surface 342, which is adapted to support adjustable deflector ring 380. One or more vertically elongated slots 344 are formed in wall support bracket 343 and are adapted to accommodate bolts 311 for attaching the wall support bracket to inner catch basin wall 302. Inner catch basin wall 302 will typically be made of concrete, such that concrete anchors 305 should also be used to facilitate this attachment, as will be readily understood by one skilled in the art. Because vertically elongated slots, rather than simple holes, are formed within the wall support bracket, the bracket may be raised or lowered with respect to the catch basin wall before the bolts are firmly tightened. By raising or lowering the wall support bracket before firmly bolting it in place, the vertical positioning of the entire filtration system will be raised or lowered accordingly. After initial system installation, future vertical repositioning of the filtration system may also be accomplished if needed by loosening the bolts, sliding the wall support bracket as desired and re-tightening the bolts. Although elongated slots that permit vertical adjustments are preferred, slots 344 may alternatively be formed as simple holes within wall support bracket 343. One or more horizontally elongated slots 345 are also formed in wall support bracket 343 and are adapted to accommodate bolts for attaching the wall support bracket to filter body support bracket 346.

Figure 48A:
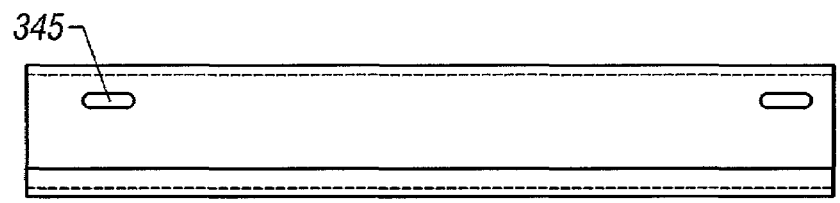
FIG. 48 is a set of top, front, and side views of the filter body support bracket illustrated in FIG. 46.
Figure 48B:
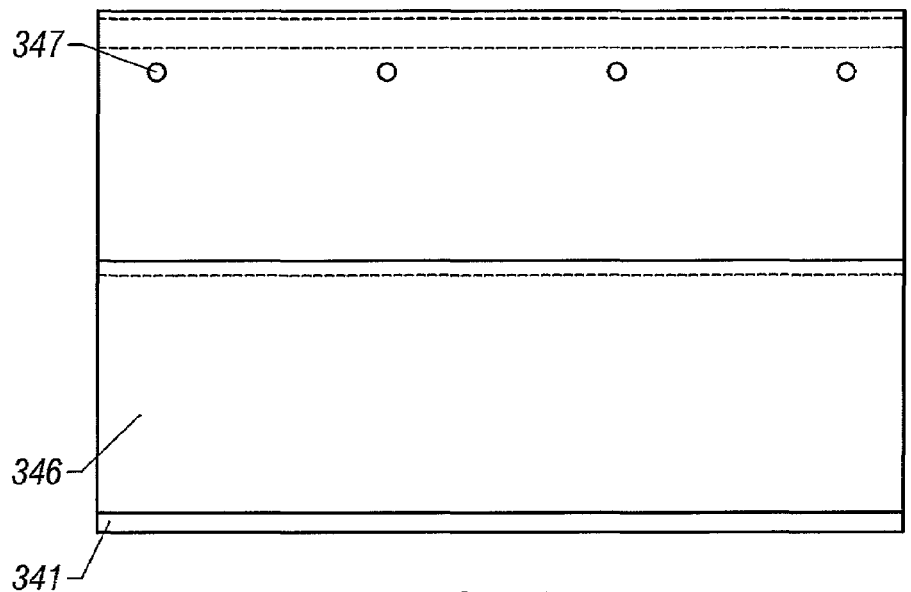
Figure 48C:
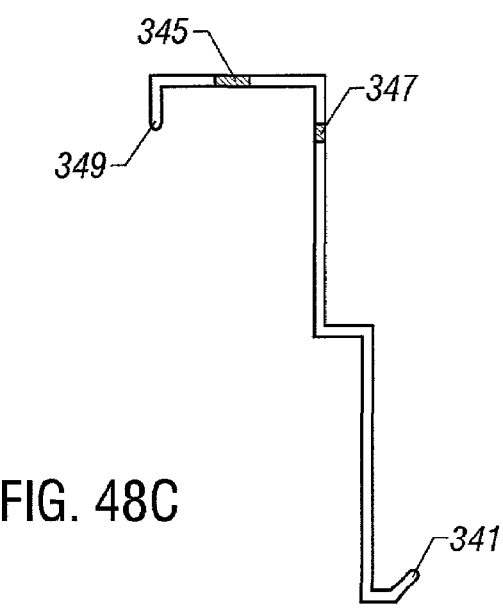
Figure 49A:
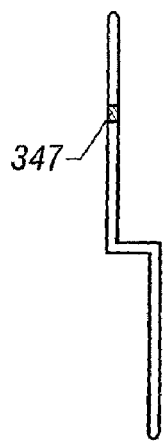
FIG. 49 is the front and side views of the retainer clip illustrated in FIG. 46.
Figure 49B:
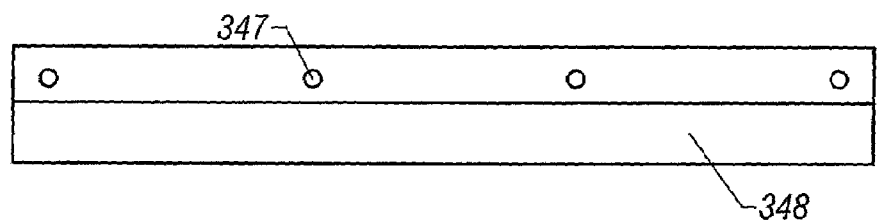

Filter body support bracket 346 is illustrated in greater detail by the top, front, and side views shown in FIG. 48. Referring to FIGS. 46–48, one or more horizontally elongated slots 345 are also formed in an upper side of filter body support bracket 346 for attaching this bracket to wall support bracket 343. As in the vertical positioning flexibility achieved by the vertically elongated slots described above, the horizontally elongated slots in both the wall support bracket and the filter body support bracket provide flexibility in the horizontal positioning of the filtration system within the catch basin. The horizontally elongated slots in both the wall support bracket and filter body support bracket preferably complement each other such that the slots in one bracket are aligned along the width of the catch basin while the slots in the other bracket are aligned along the length of the catch basin. In this manner, the filtration system can be positioned along the width of the catch basin through the elongated slots aligned in one direction and along the length of the catch basin through the elongated slots aligned in the other direction. Although FIGS. 46–48 depict a support bracket set with the horizontally elongated slots in wall support bracket 343 aligned depthwise toward the upper body and the horizontally elongated slots in filter body support bracket 346 aligned lengthwise alongside the upper body, it will be readily appreciated that reversal of these slot alignments will result in an equally functional support bracket system. These horizontally elongated slots permit a standardized filtration system to fit in a wide variety of catch basins having differing dimensions. Should a catch basin be relatively narrow, for example, the support brackets can slide toward each other in each bracket set before tightening the bolts, such that the filter body support bracket is positioned closer to the narrowed catch basin walls.

Referring again to FIGS. 46–48, the connecting ends of both wall support bracket 343 and filter body support bracket 346 are preferably turned upward at right angles with respect to the remainder of the respective end portions to form right-angled edge segments 349. The distal ends of each right-angled edge segment 349 preferably contacts the opposing support bracket such that an elongated open-ended "box" is formed through which connecting bolts 311 extend. This arrangement permits additional load to be transferred between support brackets and thus provides added support at this bracket to bracket junction. Referring specifically to FIGS. 46 and 48, filter body support bracket 346 comprises at its other end upturned edge 341, which inserts into slot 337 of upper body 330. Upturned edge 341 preferably extends perpendicularly from the remainder of filter body support bracket 346 through upper body 330 and ultimately turns upward again once it has passed completely through the upper body. This hook-like formation provides support to upper body 330 and the remainder of the filtration system, while also substantially preventing the upper body from inadvertently slipping or sliding off of the filter body support bracket. In a particularly preferred standardized embodiment, upturned edge 341 extends perpendicularly from filter body support bracket 346 for one-quarter inch before ultimately turning upward again, right-angled edge segment 349 at the end of each support bracket is one-half inch in height, and both the upturned edge and the right-angled edge segment extend along the entire length of the filter body support bracket.

One or more connecting holes 347 are preferably formed in filter body support bracket 346 and are adapted to accommodate bolts or screws for attaching the filter body support bracket to retainer clip 348. Retainer clip 348 is illustrated in greater detail by the front and side views shown in FIG. 49. Referring to FIGS. 46–49, one or more matching connecting holes 347 are also preferably formed in retainer clip 348 for attaching the retainer clip to filter body support bracket 346. Retainer clip 348 thus attaches at its upper portion to filter body support bracket 346, and at its lower portion holds upper edge 335 of upper body 330 against the filter body support bracket. The retainer clip preferably holds the upper body snugly in place against the support brackets, such that the perpendicular segment connecting the upper and lower portions of the retainer clip is preferably of a length substantially similar to the thickness of the upper body. In a particularly preferred standardized embodiment, both the upper portion and lower portion of retainer clip 348 are one inch in length, while the perpendicular segment connecting these portions is one-quarter inch in length.

Figure 51C:
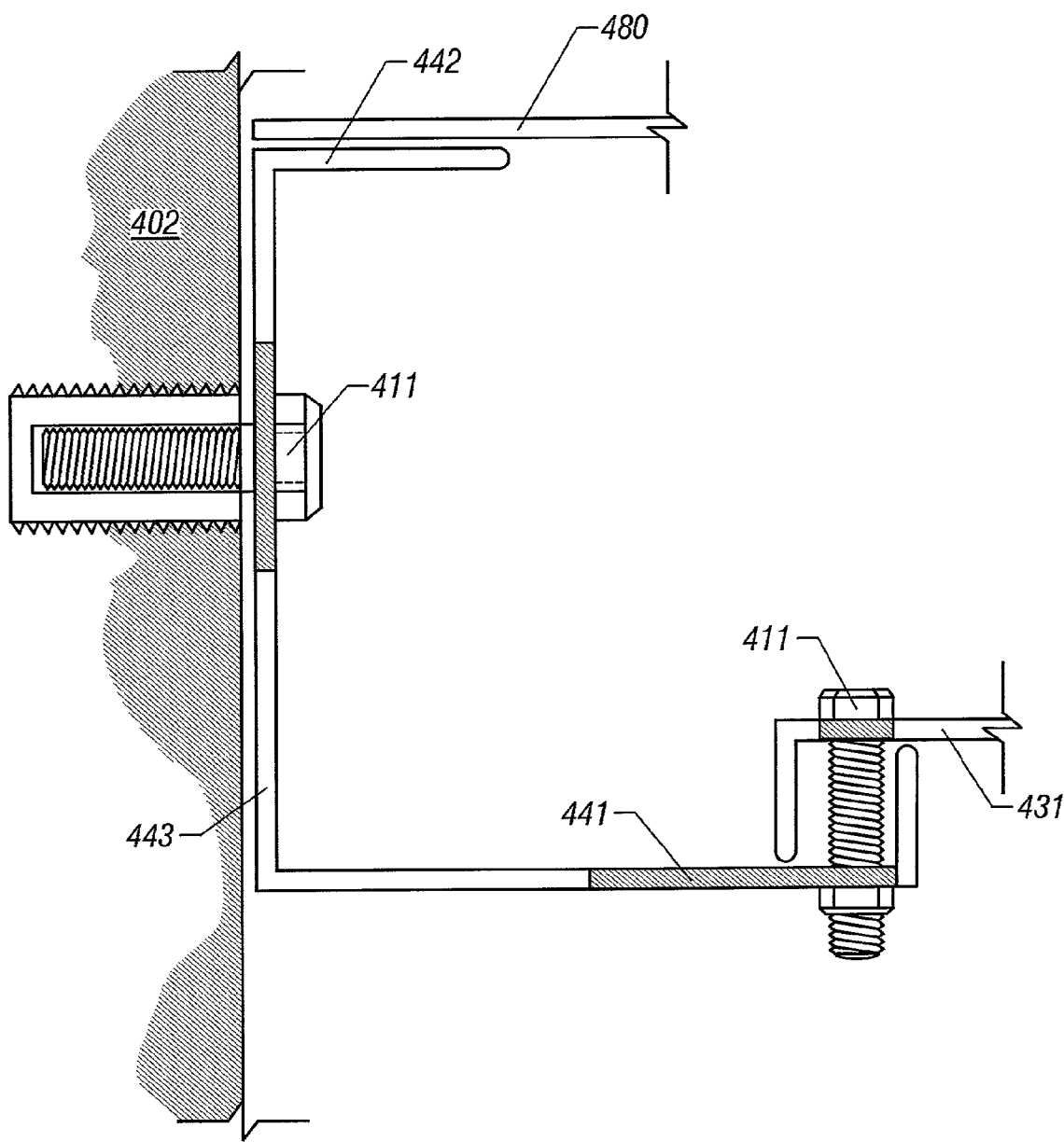

In a simplified alternative embodiment, filter body support bracket 343 and retainer clip 348 may be eliminated or combined with wall support bracket 343 to form a simplified adjustable bracket system that is easier and less costly to manufacture and ship. Wall support bracket 343 would remain substantially similar with respect to its upper side containing upper support surface 342, its vertical side containing vertically elongated slots 344, and its lower side. Horizontally elongated slots 345 and right-angled edge segment 349, however, would be optional in this simplified alternative embodiment, with the inclusion of these aspects depending in part on how the remainder of the filtration system connects to the bracket. A preferred method for connecting the filtration system to this simplified bracket involves attaching or affixing to the lower side of the simplified bracket one or more flanges that are in turn connected or affixed to an upper frame or support ring of the filtration system. Alternatively, one or more of these flanges could also rest atop the lower side of the simplified bracket or brackets. An example of this simplified alternative bracket system is illustrated in FIG. 51c, wherein wall support bracket 443 is firmly attached in inner catch basin wall 402. Upper support surface 442 is adapted to support an adjustable deflector ring as in the primary embodiment, and lower portion 441 is adapted to support flanges 431, which in turn are affixed to the upper frame or support ring 430. Although bolts 411 are shown as the means for attaching the wall support bracket to the support flanges, any other attaching means would also be suitable for this purpose. In fact, it is also contemplated that the support flanges may simply rest atop lower portion 441 of the wall support bracket. It should be noted that while each of the simplified alternatives presented in FIGS. 51a through 51c are ideally combined to result in a filtration system embodiment that is simplified in several aspects, each of these alternatives may be made individually to the primary embodiment as would be readily understood to one skilled in the art.

Figure 50:
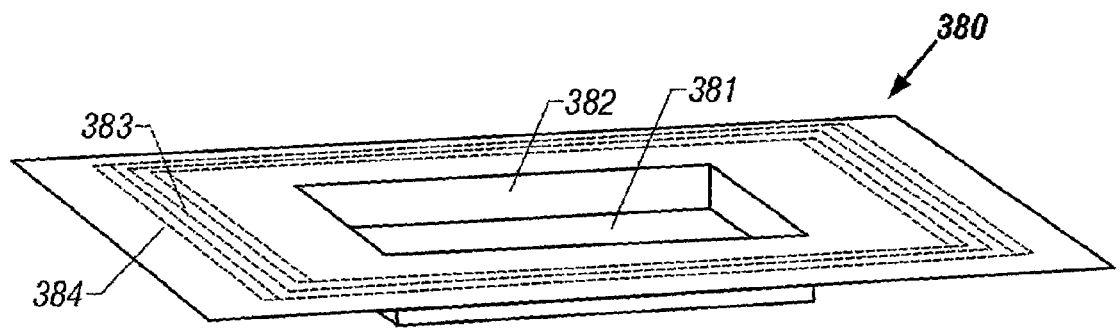
FIG. 50 is a perspective view of a preferred embodiment of the adjustable deflector ring shown in FIGS. 42 and 43.

Referring back to the primary embodiment and now referencing FIG. 50, a particularly preferred embodiment of adjustable deflector ring 380 is illustrated. Adjustable deflector ring 380 is positioned between the drain inlet and the upper edge of the upper body, and rests atop the upper support surface of one or more wall support brackets, preferably each wall support bracket in the system. Deflector ring 380 comprises a center hole 381 with descending flanges 382 dimensioned and situated such that incoming fluid is directed into the filtration system. This deflector ring preferably functions to channel most or all fluid entering the catch basin into the filtration system by extending in all directions to substantially meet each inner wall of the catch basin. In addition, adjustable deflector ring 380 is positioned a sufficient distance above the upper body and debris trap such that operation of the secondary bypass beneath the deflector ring is unimpeded.

Due to the wide variety of dimensions in catch basins, planar surface 384 of adjustable deflector ring 380 is preferably oversized such that the outer perimeter of the surface can be trimmed as needed to fit the inside perimeter of a particular catch basin. In a particular preferred embodiment, the length of planar surface 384 extends at least as far as the length of the longest common catch basin, while the width of this planar surface is at least as broad as the width of the widest common catch basin. Accordingly, adjustable deflector ring 380 can be readily trimmed to an appropriate size during installation into any common catch basin, regardless of the actual catch basin dimensions. Custom sized deflector rings may also be formulated for irregular or unusually large catch basins, as will readily be understood by those skilled in the art. A series of etched grooves 383 etched into adjustable deflector ring 380 facilitates the custom resizing or trimming of the deflector ring during installation such that the adjusted deflector ring substantially extends to all inner walls of the catch basin. Grooves 383 in planar surface 384 are sufficiently shallow such that substantial weakening of the planar surface does not occur, but sufficiently deep so that trimming or breaking off of excess material is facilitated. Each set or sets of grooves 383 are preferably made at locations corresponding to the inner dimensions of common catch basin variations, such that the adjustable deflector ring can be more conveniently resized in most instances.

In an another particularly preferred embodiment, adjustable deflector ring 380 is still located above and functions to direct fluid flow into the filtration system, but differs in several details. Instead of remaining planar, surface 384 is stepped at regular intervals to provide structural rigidity, to assist in directing fluid toward the center hole and to further facilitate the trimming or breaking off of excess material as desired at or near the point of installation. Descending flanges 382 slope downward at a reduced angle rather than perpendicularly from surface 384. In addition, a flow control wall rises from the edge of deflector ring 380 and runs along some or all of its perimeter. As in the foregoing alternative embodiments, this alternative embodiment of the adjustable deflector ring may be utilized with either the primary or the fully simplified alternative embodiments described above, or any combination thereof incorporating only some of the simplified features.

Figure 52:
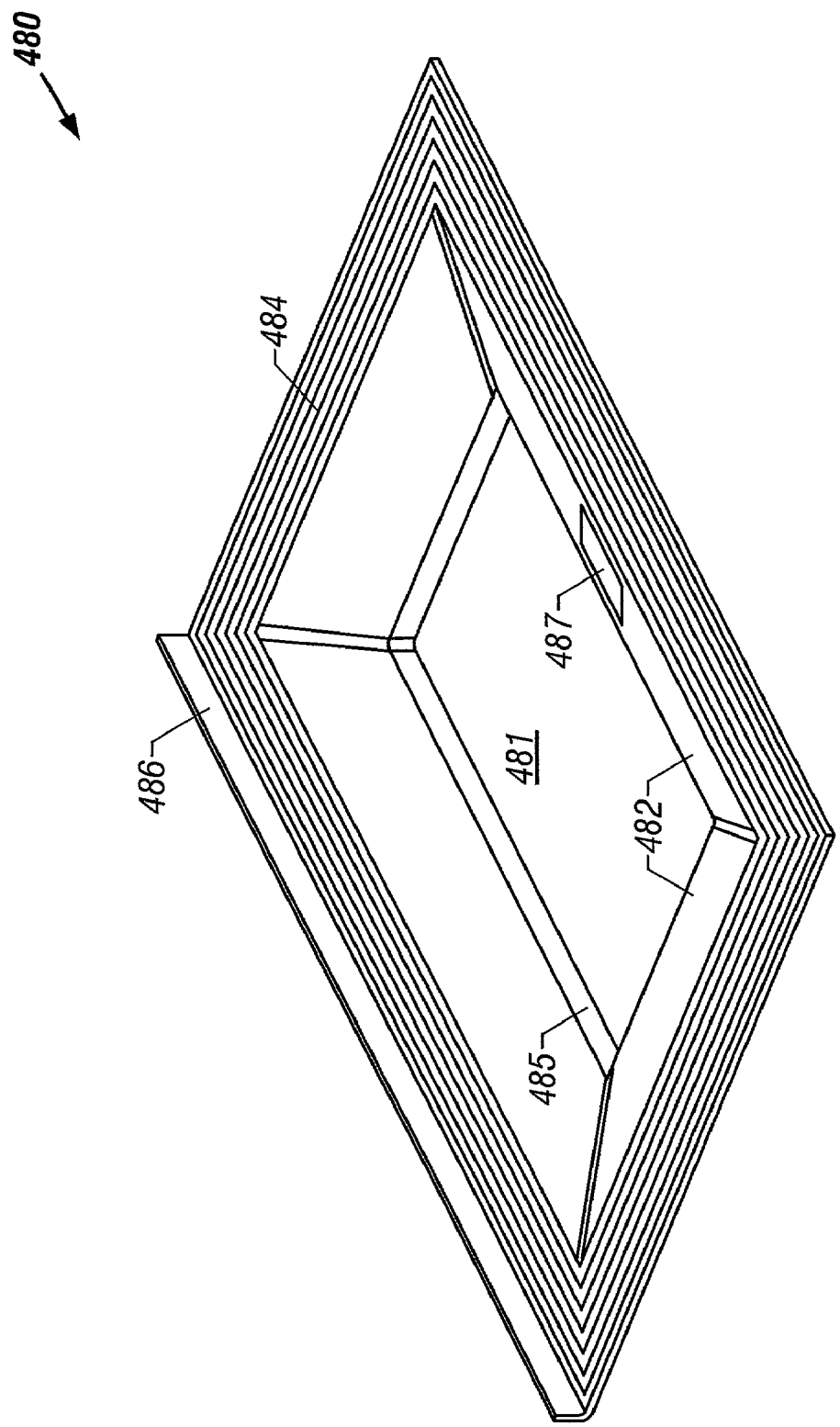
FIG. 52 is a perspective view of a preferred alternative embodiment for the adjustable deflector ring having a flow control wall.

Referring now to FIG. 52, this alternative embodiment of the adjustable deflector ring 480 can be seen in detail. Horizontal stepped surface 484 is adapted to rest atop the upper support surface of the wall support bracket, and is stepped downward toward center hole 481. This stepped surface directs incoming fluid in the proper direction, provides greater rigidity and resistance to torsional forces on the adjustable deflector ring, and also facilitates the trimming or breaking off of excess material as desired to fit a particular catch basin. The stepped surface may contain steps that run repeatedly at, for example, one-half inch horizontally by three-hundredths of an inch vertically, or at any other convenient distances that would facilitate the removal of excess material. The stepped surface ends at descending flanges 482, which may descend at a sharp vertical angle as in the prior embodiment or at a slope as illustrated in FIG. 52. Descending flanges 482 may optionally end at a vertical lip 485, which would also provide rigidity to the adjustable deflector ring if used. Moving in an outward direction, stepped surface 484 ends at a flow control wall 486 at one or more of its upper and outer edges. Although a flow control wall is depicted along only one outer edge in FIG. 52, such a wall may also be formed at all outer edges.

Figure 53:
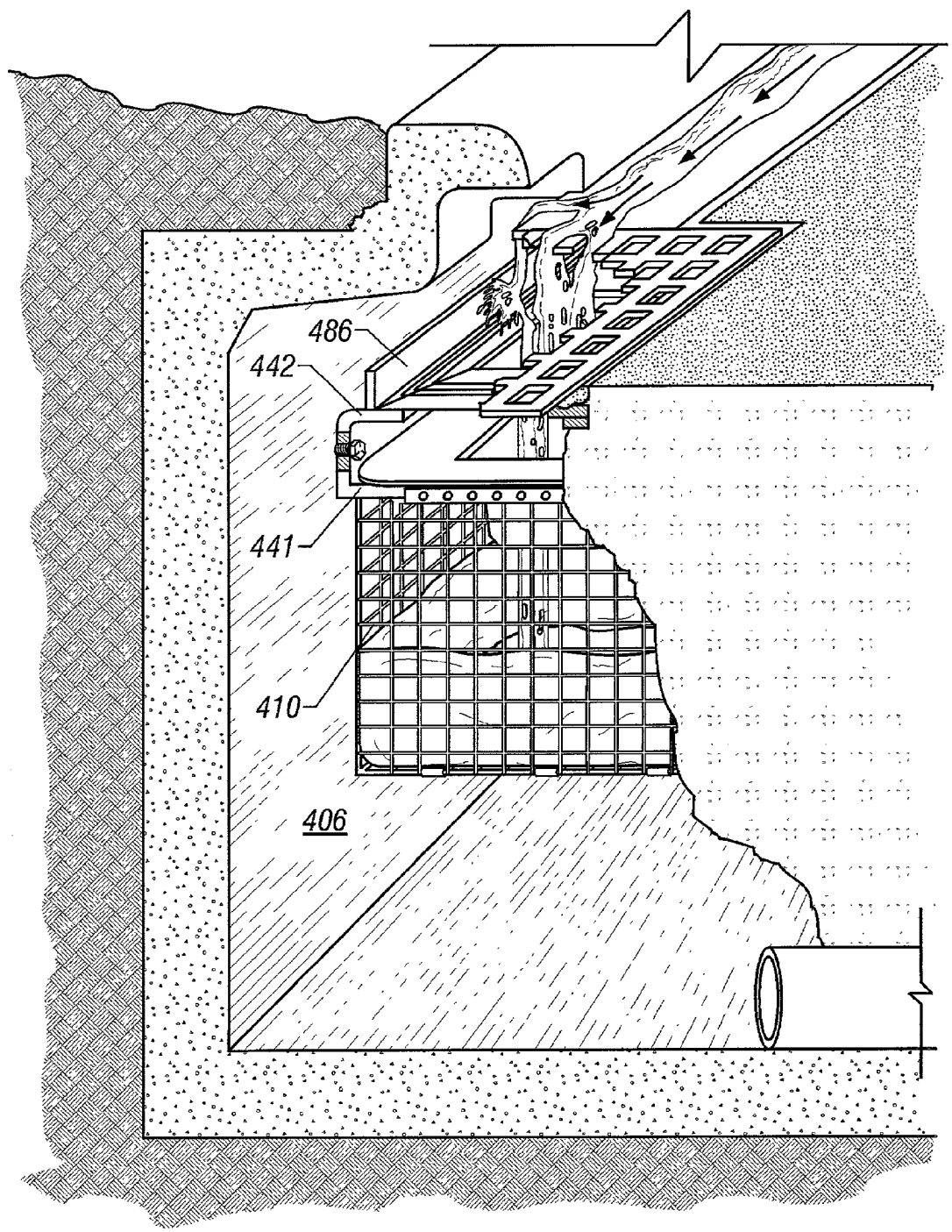
FIG. 53 is a cutaway partial perspective view of a high capacity catch basin filtration system employing the adjustable deflector ring of FIG. 52, and installed in a curbside catch basin.

Although it will not be able to assist in controlling fluid flow in every type of catch basin, flow control wall 486 becomes a useful means for directing fluid flow in some catch basins, particularly those with curbside grates and inlets. Such an instance is illustrated in FIG. 53, which shows a high capacity filtration system having an adjustable deflector ring with a flow control wall installed into a curbside catch basin. In such an instance, most fluid runoff typically enters the catch basin after traveling along a street curb or gutter. Varying conditions may cause the general flow of fluid to enter the catch basin at any one of a variety of angles, and at times this fluid flow may spray, splash or generally tend toward the back wall 406 of the catch basin. Although gaskets may be placed around the outer edges of the adjustable adapter ring to form a substantial seal against the catch basin wall, similarly to gasket 239 which is described in the soft-body embodiment above, a fluid control wall is preferable. Such a wall is more rigid than a gasket and is generally more able to weather the long term effects of repeated exposure to fluid flows. Although not necessary, a gasket (not shown) could be placed along the upper edge of flow control wall 486 where the control wall is near the catch basin wall and if so desired. In the event that the outer edge of the adjustable deflector ring cannot reach the catch basin wall, a gasket cannot be used and a flow control wall becomes even more critical, as depicted in FIG. 53.

To ensure adequate control of fluid flow, the fluid flow control wall or walls must be of a sufficient height, for example one to two inches, although additional height may be desired in some instances. Although a flow control wall is likely to be needed at only one or two edges of the adjustable deflector ring in most cases, it is likely easier and more cost effective to manufacture an adjustable deflector ring with a flow control wall at every edge, such that the flow control wall runs along the outer perimeter of the adjustable deflector ring. This is especially true in the event that the adjustable deflector ring is fabricated from a hard molded plastic, although metal, fiberglass or any other suitable material may also be used. Should the adjustable deflector ring need to be downsized to fit a particular catch basin, the removal of material from one or more sides of the adjustable deflector ring will invariably remove the flow control wall from that side as well. As a practical matter, however, a flow control wall is only likely to be needed at one or two edges, such that material can typically be removed from only one or two adjacent sides of the adjustable deflector ring, leaving the flow control walls on the opposing sides intact.

In addition to providing the ability to control and redirect fluid flow, the flow control wall or walls on the adjustable deflector ring are also preferably of a sufficient height and size to place or affix markings, advertisements or promotional materials. For example, a "bumper sticker" containing an advertisement or a corporate logo and contact information may be placed on a fluid control wall, preferably one that will be prominent after installation of the filtration system and will be visible to the naked eye. Such a marking or advertisement may target those who deal with installation or maintenance of the filtration system, or may be directed toward passersby who might chance to look into the catch basin and see the displayed item. Referring again to FIG. 53, which involves a curbside catch basin, such a sticker or advertisement 487 may be seen as placed at a conspicuous location along fluid control wall 486. Alternatively, such a sticker or advertisement may be placed at other locations on the adjustable deflector ring or filtration system. Referring back to FIG. 52, another example can be seen whereby sticker or advertisement 487 is placed along a descending flange 482. Such an instance may typically occur in strict vertical catch basins where the fluid control wall or walls are less visible than the sloped descending walls.

Numerous other variations and embodiments can be discerned from the above-detailed description of the invention and illustrations thereof. All such variations are encompassed within the scope and spirit of the present invention.

What is claimed is:

1. An apparatus, comprising:
    (a) a filtration device comprising a permeable reservoir comprising a porous material with an open top, said filtration device dimensioned to fit within an inlet and obstructing at least a portion of said inlet;
    (b) a filtration device support dimensioned and adapted to cooperatively engage with said inlet and with said filtration device to substantially maintain said filtration device in a pre-selected position within said inlet; and
    (c) an adjustable deflector ring connected to said filtration device support, said adjustable deflector ring containing at least one flow control wall along at least one outer edge, whereby dimensions of said adjustable deflector ring may be easily adjusted to fit within a particular catch basin and said adjustable deflector ring is adjusted via the permanent removal of material.

2. The apparatus of claim 1 wherein said permanent removal of material includes the removal of one or more flow control walls.

3. The apparatus of claim 2 wherein at least one flow control wall remains on said adjustable deflector ring after the removal of one or more flow control walls.

4. The apparatus of claim 1, wherein said filtration device comprises a basket.

\* \* \* \* \*